United States Patent
Takada et al.

[11] Patent Number: 6,163,148
[45] Date of Patent: Dec. 19, 2000

[54] SENSOR, DRIVE FORCE AUXILIARY DEVICE USING THE SENSOR, AND TORQUE SENSOR ZERO POINT ADJUSTING MECHANISM OF THE DRIVE FORCE AUXILIARY DEVICE

[75] Inventors: Yutaka Takada; Hiroshi Miyazawa; Akihito Uetake; Kuniaki Tanaka; Hiroshi Nakazato; Katsumi Shinkai, all of Suwa, Japan

[73] Assignee: Seiko Epson Corporation, Tokyo, Japan

[21] Appl. No.: 08/849,833

[22] PCT Filed: Oct. 16, 1996

[86] PCT No.: PCT/JP96/02988

§ 371 Date: Jun. 12, 1997

§ 102(e) Date: Jun. 12, 1997

[87] PCT Pub. No.: WO97/14608

PCT Pub. Date: Apr. 24, 1997

[30] Foreign Application Priority Data

Oct. 17, 1995 [JP] Japan .................... 7-268903
Oct. 26, 1995 [JP] Japan .................... 7-279237
Dec. 25, 1995 [JP] Japan .................... 7-337390
Mar. 13, 1996 [JP] Japan .................... 8-056477

[51] Int. Cl.[7] ................ G01B 7/30; B62M 23/02; G01L 3/14; G01R 33/00
[52] U.S. Cl. ................ 324/226; 324/207.25; 180/206
[58] Field of Search ............ 324/207.15, 207.2, 324/207.21, 207.22, 207.25, 226; 180/206

[56] References Cited

U.S. PATENT DOCUMENTS 3,366,909  1/1968  Hini et al. .................. 338/32 R
5,523,679  6/1996  Kalb ........................... 324/165

Primary Examiner—Walter Show
Attorney, Agent, or Firm—Kanesaka & Takeuchi

[57] ABSTRACT

The invention relates to a sensor provided with a magnet (52) and a magnetic detecting element (53) comprising a detection shaft (38a), a detection disc (59a) which is fixed to the detection shaft, a magnetic piece (59b) which is fixed to the outer circumference edge of the detection disc, a yoke (59c) which is disposed to hold the magnetic piece in a predetermined shaped gap, and the magnet and the magnetic detecting element both fixed to the yoke. The sensor is used for a drive force auxiliary device which combines a human power drive force and a motor drive force. The drive force auxiliary device comprises a torque sensor (30), a vehicle speed detecting means (40) for detecting a running speed of the drive force auxiliary device, and an auxiliary power means using a motor (M). The vehicle speed detecting means (40) detects a running speed by virtue of the drive force auxiliary device based on a rotation position signal obtained from a rotor rotation position detector. The torque sensor (30) includes a mechanism for automatically making a zero point adjustment by compensating an output voltage.

22 Claims, 52 Drawing Sheets

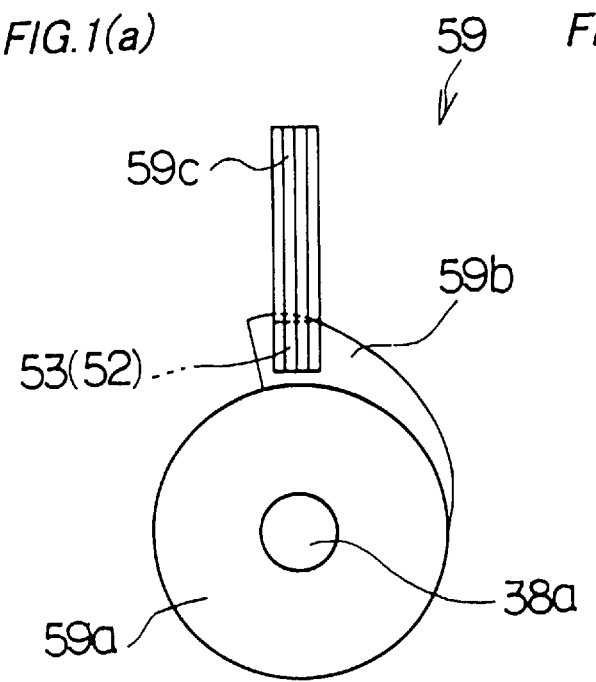
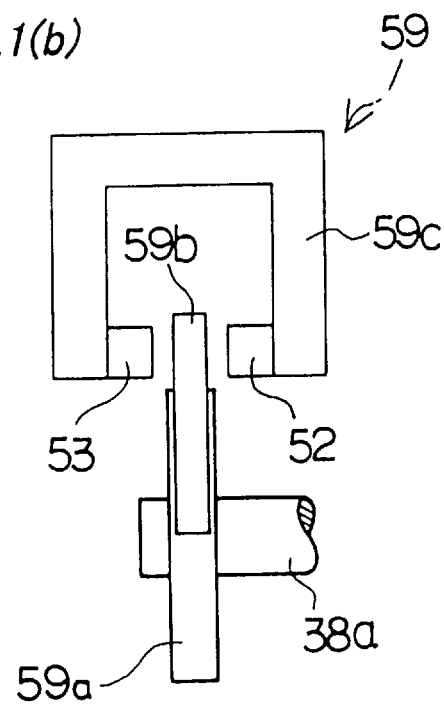
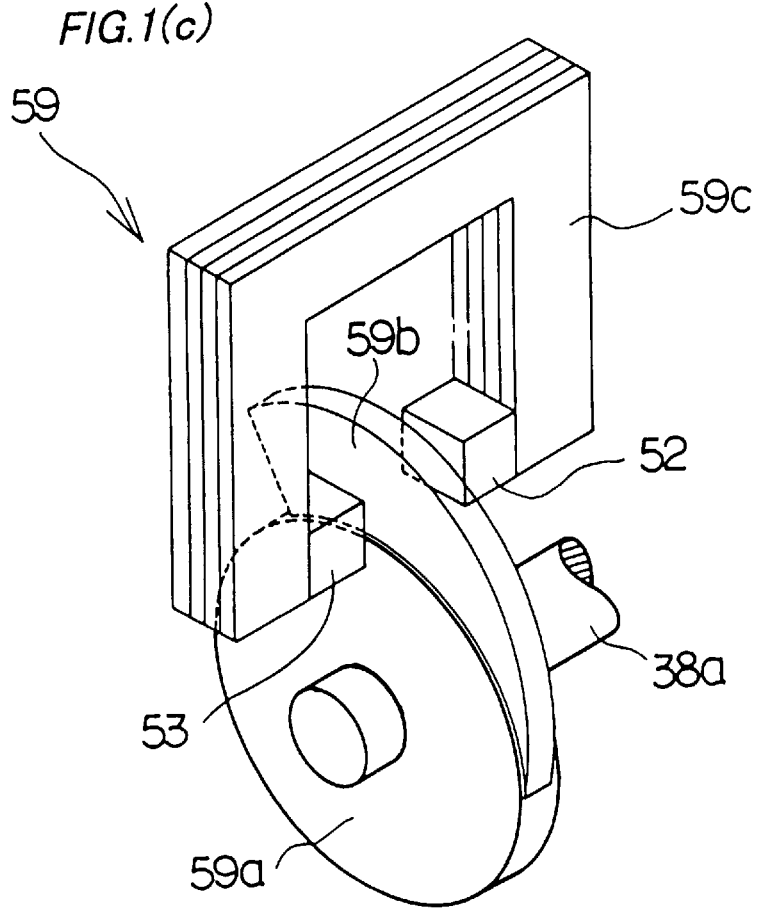

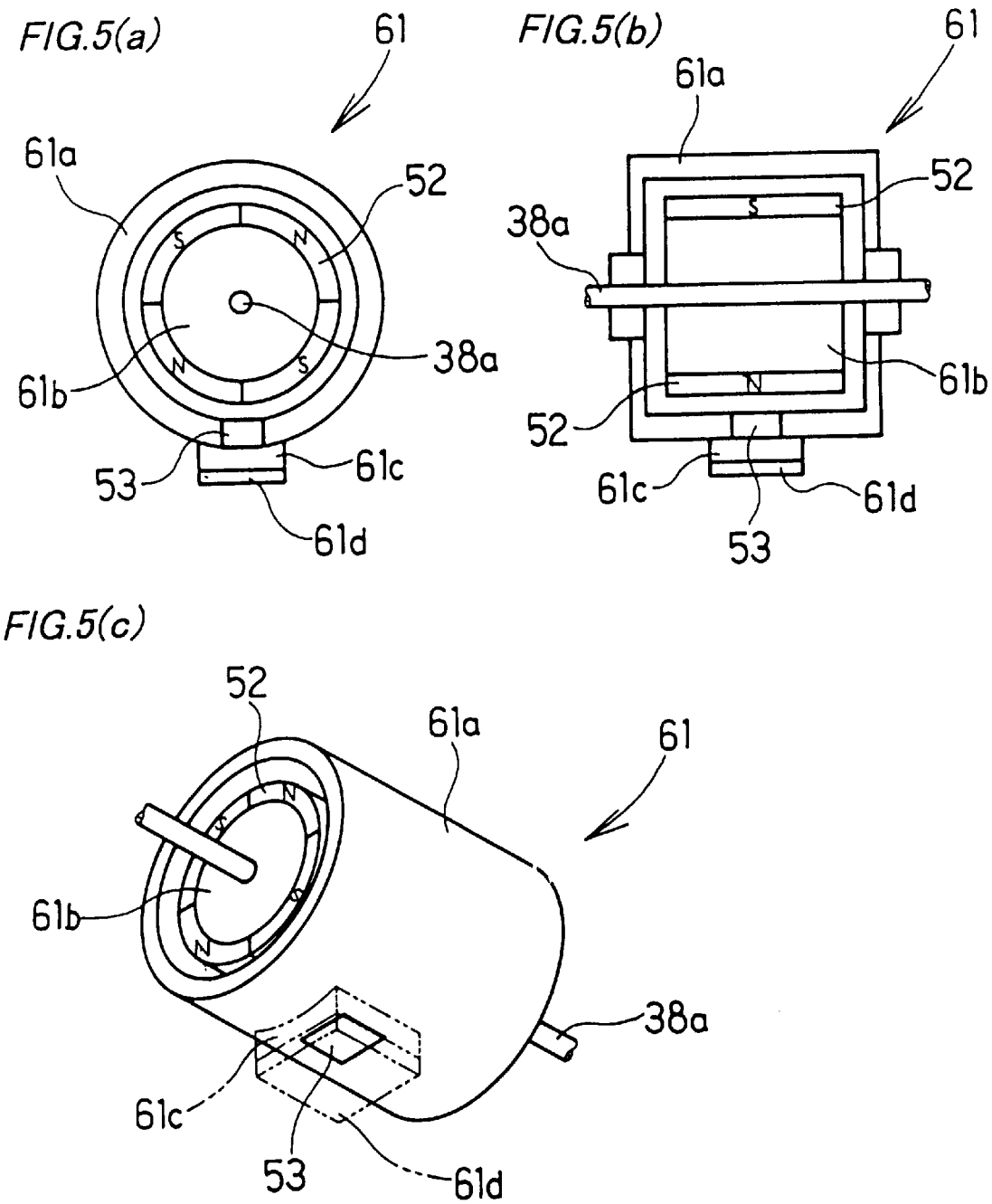

FIG.37

| | | | | | | |
|---|---|---|---|---|---|---|
| OUTPUT OF EACH HALL ELEMENT X | L | L → H | H | H | H → L | L |
| Y | H → L | L | L | L → H | H | H |
| Z | H | H | H → L | L | L | L → H |
| I/O OF EACH OR LOGICAL ELEMENT A | H )D H<br>L | H   H<br>  )D ↓<br>L→H   L | H→L   L<br>   )D ↓<br>H   H | L )D H<br>H | L   H<br>  )D ↓<br>H→L   L | L→H   L<br>   )D ↓<br>L   H |
| B | L   H<br>  )D ↓<br>H→L   L | L→H   L<br>   )D ↓<br>L   H | H )D H<br>L | H   H<br>  )D ↓<br>L→H   L | H→L   L<br>   )D ↓<br>H   H | L )D H<br>H |
| C | H→L   L<br>   )D ↓<br>H   H | H )D H<br>L | L )D H<br>H→L | L→H   L<br>   )D ↓<br>L   H | H )D H<br>L | H   H<br>  )D ↓<br>L→H   L |

SENSOR, DRIVE FORCE AUXILIARY DEVICE USING THE SENSOR, AND TORQUE SENSOR ZERO POINT ADJUSTING MECHANISM OF THE DRIVE FORCE AUXILIARY DEVICE

TECHNICAL FIELD

The invention relates to a sensor which is provided with a magnet and a magnetic detecting element to detect the rotation angle of a measuring object, a drive force auxiliary device using this sensor for an electric bicycle or the like, and a torque sensor zero point adjusting mechanism of the drive force auxiliary device.

BACKGROUND ART

A generally known sensor for detecting a rotation angle uses a potentiometer.

A sensor using the potentiometer is a contact type sensor, and therefore, the device suffers from a shortened life because of friction.

With the development of remarkable magnets in these years, non-contact type sensors utilizing a magnetic detecting element are being used in various ways. Since the sensor utilizing a magnet and a magnetic detecting element is a non-contact type, its life can be made long, and a potentiometer which is expensive is not needed. Therefore, the sensor can be produced inexpensively.

To detect a rotation angle by a non-contact type sensor using a magnetic detecting element, it is desired that the angle is magnetically detected by the magnetic detecting element. At this time, an air gap is secured between the magnet and the magnetic detecting element without fail, magnetic flux of a magnetic circuit is guided in a predetermined direction to configure a stable magnetic circuit. Besides, this type of sensor is demanded to prevent accuracy from being degraded due to performance of parts or an error in production, thus improving reliability.

In view of above, the present invention aims to provide a sensor which secures an air gap between the magnet and the magnetic detecting element without fail, guides magnetic flux of a magnetic circuit in a predetermined direction to configure a stable magnetic circuit, and improves reliability.

Lately, attention is being attracted by an electric bicycle provided with an electric motor for assisting human power. This type of electric bicycle is structured by mounting an electric motor and a battery power source for supplying power to the motor on an ordinary bicycle to add a predetermined motor auxiliary power depending on a human power driving force, thereby reducing a load on a human power drive force. And, the auxiliary drive force by a motor is legally limited not to exceed the human power drive force in Japan, and when a running speed does not exceed 15 Km/h, assistance by the motor is 100%, and when the running speed exceeds 15 Km/h, assistance is decreased gradually, then when the speed is 24 Km/h or more, control is made to stop the assistance by the motor. Thus, a human power assisting ratio is restricted to be variable in accordance with the running speed.

As shown in FIG. 54, such an electric bicycle 1 is basically formed of an ordinary bicycle which is provided with a front wheel 4 and a rear wheel 5 at the front and rear of its frame, and driven by leg power via the rear wheel 5. According to the Japanese Industrial Standards (JIS), the member indicated by reference numeral 2 is called a main pipe and the member indicated by reference numeral 2*d* is called a seat pipe, and the same designation by the JIS standards is used in this specification.

This auxiliary drive means J comprises a motor M which is disposed at right angles with the axle and in the neighborhood of the middle in the breadth direction of the vehicle body, a power transmission (not shown) which changes the rotating drive force of the motor towards a direction that the axles are rotated and also decrease the speed, and a combining mechanism (not shown) which combines the decelerated rotating drive force of the motor with an ordinary drive system of the human power drive force and separates the motor drive system from the ordinary drive system when the bicycle is driven by the human power drive force only.

The motor drive system is driven to rotate by the power transmission device with the motor M as the drive source, and the Motor M is supplied with electric power by an electric power device. Specifically, this electric power device comprises a battery power source using a plurality of storage batteries, an electric power circuit which stabilizes and supplies electric power, a motor for running, a motor drive circuit which directly controls the rotations of the motor, and a control circuit which outputs a speed command value and the like to the motor drive circuit. And, the rotation drive force of the motor is added to a conventional drive system and transmitted to the running wheel through the transmission device, thereby running the bicycle.

And, as a method for detecting the human power drive force, it is known to detect the magnitude of a human power drive force in view of a reaction force which is applied to the gears of a planetary gear (e.g., Japanese Patent Laid-Open Publication No. Hei 4-358987).

But, the electric bicycle described above detects the human power drive force at a position where the human power drive force is applied. And, it is disadvantageous that the device itself becomes large and heavy because its structure needs to withstand the human power drive force.

And, when the conventional electric bicycle uses a potentiometer as the sensor, a contact's life is shortened due to a frictional resistance, looseness or the like of respective gears. As a result, there is a disadvantage that satisfactory accuracy of measuring human power torque can not be secured.

In view of above, the present invention proposes a drive force auxiliary device which can improve detection performance and durability, applies the above-described sensor to this auxiliary device, thus its zero point can be compensated without fail; respective gears can be prevented from getting loose, and satisfactory accuracy of measuring human power torque can be secured.

The motor for the drive force auxiliary device is an ordinary brush DC motor, which is formed, for example, by accommodating in a motor case having a predetermined shape a rotor core having a plurality of exciting coils and formed in a cylindrical shape and a stator core disposed on the outer periphery of the rotor core; the rotor itself is fixed to a motor shaft which is rotatably supported in the case, and the brush is fixed to the motor case side to supply a drive electric current to the exciting coils of the rotor through the motor shaft. Therefore, with the rotations of the rotor, the contact point of the motor shaft is variable with respect to the brush, and the drive electric current is supplied to the exciting coils of the rotor according to the rotation condition. Specifically, by the brush which is a mechanical contact switch mechanism, electric current continuously supplied to the respective exciting coils is switched with the rotations of the rotor, and the direction of electric current is changed, thereby producing a rotation magnetic field to continue the electromagnetic rotation drive of the rotor.

Besides, this motor drive system has the motor output controlled based on the human power entered into the human power drive means by the rider and the running speed of the vehicle.

Specifically, there are disposed a torque sensor (the leg power detection means for the bicycle) for detecting the drive force by the human power of the rider and a vehicle speed detecting means for detecting the running speed of the bicycle, and their output terminals are connected to the control circuit through wiring.

Known detection methods used for the torque sensor include a method that an exclusive detection member is disposed on the transmission route of the human power to detect a torsion angle of the detection member according to the human power torque and expansion in the longitudinal direction, and a method that an elastic member is mounted between an input side rotor to which leg power is transmitted and an output side rotor, and the magnitude of a human power drive force between the input side rotor and the output side rotor is detected in view of a reaction force applied to the gears of a planetary gear (e.g., Japanese Patent Laid-Open Publication No. Hei 4-358987).

And, the vehicle speed detection means is formed of an exclusive rotating speed sensor which is connected to the pedal shaft via a gear mechanism because an ordinary brush DC motor is used as the auxiliary drive motor. Therefore, a running speed of the bicycle is obtained from the rotating speed of the pedal shaft.

And, by this control circuit, the above-described ratio of human power assistance is determined based on the running speed detected by the vehicle speed detection means at that time. This ratio is multiplied with the human power detected by the torque sensor to calculate an actually needed assisting output, and a motor output command value which satisfies the assisting output is outputted to the motor drive circuit. And, setting of this output value is effected by stepwisely calculating from both detection values by a calculation formula provided in the control means or by directly cross-referring both values from a predetermined table.

As described above, the motor is an ordinary brush DC motor, which is structured by accommodating a rectifier for commutation, a brush, a brush holder and the like in the axial direction, resulting in a disadvantage that the motor is long in the axial direction. Besides, there are disadvantages that the life of the motor is short because the brush is abraded and the bearing member such as a bearing is damaged by abraded dust produced.

On the other hand, when the torque sensor for detecting the human power drive force is exposed outside the vehicle body, it may be damaged or suffer from a heavy impact even if it is not damaged when the bicycle falls, thus the sensor may fail, and reliability is lowered. And, since it is directly exposed to effects from external natural atmosphere such as rain and wind or those such as dust and mud arising while the vehicle is running, reliability in view of error detection may be lost or the life of the device may be shortened. Besides, although such disadvantages can be solved by accommodating the torque sensor within a casing, the torque sensor is required to be made small in order to be disposed in the neighborhood of the crank shaft in the casing. But, it is hard to make the torque sensor small while keeping the needed detection accuracy.

Besides, since the exclusive vehicle speed sensor is disposed to obtain a vehicle speed to control the auxiliary drive, there is a disadvantage that the cost cannot be reduced sufficiently.

Specifically, the exclusive speed sensor and a space for it are needed, and wiring for it limits and complicates the design by the layout of wiring, assembling needs lots of labor, making it difficult to reduce the cost. Particularly, the running speed is needed to decide the human power assisting ratio of the electric bicycle and inevitable for the drive force assisting control. Therefore, the sensor is required to have satisfactory reliability in detecting the speed. And, to obtain a highly reliable speed sensor, expensive parts are used, and the speed sensor is required to be accommodated into a casing which is shielded from the external environments. Thus, cost reduction is inhibited.

Therefore, the present invention uses a brushless DC motor to configure a drive force assisting means, and accommodates its power assisting unit into a single casing as a unit to save space. And, a rotor rotation position detection means previously disposed on the brushless DC motor is also used as a running speed sensor. Thus, the invention aims to provide a drive force auxiliary device which can be very reliable and inexpensive.

The conventional electric bicycle described above uses the torque sensor to detect the human power drive force. This type of torque sensor always needs to match the torque sensor detection value when human power has not been entered by the user with a predetermined value indicating that the human power torque is zero. Therefore, a mechanism for mechanically making zero adjustment or an electrically adjusting element is generally disposed on the torque sensor.

Specifically, if this mechanism or adjusting element is not disposed, the detection value of the torque sensor includes an error, and the electric bicycle cannot be controlled properly. And, a comfortable human power assisting feeling cannot be obtained, and even when human power is not entered, the torque sensor detects an erroneous torque value, the electric bicycle may run by itself, concept of human power assistance is not satisfied, and it is not desirable in view of safety. Especially, in the electric bicycle which effects motor assistance according to the detected human power, it is essential that the motor auxiliary output is not effected when human power is not entered, namely the bicycle does not run by itself. And, the operation state of the torque sensor when human power is not entered is required as a standard point of zero for calibration of measuring accuracy.

This torque sensor is generally structured that human power torque entered through the pedals is converted by a mechanical structure into a physically displaced quantity such as a rotation angle according to the human power torque, and the displaced quantity (rotation angle) is measured by a displaced quantity sensor (rotation angle sensor). Specifically, the displaced quantity sensor converts into an electrical signal having a voltage or current volume proportional to the displaced quantity, and the detected human power detection value is electrically entered into the control means. Therefore, when human power torque is not entered, the movable detection part of the torque sensor is in the initial position. And, when the human power torque is entered, the movable detection part of the torque sensor moved from its initial position to follow in proportion to the entered human power torque up to the maximum position.

Therefore, the mechanism which performs the zero point adjustment of the torque sensor by the electrical adjusting element has a torque sensor which outputs the detected human power torque signal as a voltage value, adds an offset voltage to the output voltage to perform zero point adjustment, and dispose on a circuit board a control knob for adjusting the offset voltage.

A mechanism for mechanically adjusting zero point is often configured with an adjusting screw disposed in the neighborhood of the movable detection part of the torque sensor, this adjusting screw is used to adjust in order to decide the initial position which is the mechanical zero point of the torque sensor.

For example, Japanese Patent Laid-Open Publication No. Hei 5-246377 and Japanese Patent Laid-Open Publication No. Hei 5-310177 indicate a torque sensor 565 having the structure as shown in FIG. 55 as an example of the torque sensor structure.

This torque sensor 565 is structured that when the user applies leg power to the pedals of a bicycle as the human power drive force, a leg power detection lever 564 is accordingly rotated in a counterclockwise direction which is a forward direction. And, this leg power detection lever 564 has two projections 564a, 564b formed at a predetermined interval in the circumferential direction, the projection 564b is always in contact with a second lever 568, the projection 564a comes in contact with a stopper 566 when the leg power detection lever 564 comes in a predetermined angle position.

Therefore, when the leg power detection lever 564 rotates in the counterclockwise direction according to the human power torque, the projection 564b rotates the second lever 568 in the clockwise direction. And, since a potentiometer 572 which is a rotation angle sensor is connected with the rotating shaft of the second lever 568, a rotation angle of the lever 568 is measured by the potentiometer 572 to detect the human power torque as a current or voltage value and to output from the torque sensor 565.

On the other hand, when leg power is not entered, the second lever 568 is rotated counterclockwise by a return spring 570 which is in contact with the second lever 568 the leg power detection lever 564 is rotated clockwise in an opposite direction. And, when the leg power detection lever 564 comes to a certain rotation angle position, the projection 564a of the leg power detection lever 564 comes in contact with the leading end of the stopper 566, so that the leg power detection lever 564 is prevented from moving further in the clockwise direction and stopped in the rotation position where it is.

Thus, the rotation angle position where the projection 564a of the leg power detection lever 564 comes in contact with the stopper 566 and stops is the zero point position of the torque sensor 565, and a rotation quantity detection value at the rotation angle position by the potentiometer 572 is a zero point correction value. And, although the above-mentioned patent applications do not describe, this zero point adjustment in actually used products is performed by adjusting the protruded level of the stopper 566 towards the leg power detection lever 564.

However, according to the torque sensor zero point adjusting mechanism described above, since the exclusive mechanical mechanism and the electrical adjusting element are required for the torque sensor zero point adjustment, the structure is made complex and the number of parts is increased, the part cost is increased, it is necessary to provide a step of setting the zero point of the adjusting mechanism in the assembling process, the assembling cost becomes high, and the production cost of the torque sensor as a whole increases.

Besides, in the conventional structure, when the adjustment is made once, the set zero point value is not reset, and if the torque sensor properties may change with time, zero point is deviated, and the human power detection value includes always a large error, causing an problem in human power assisting controlling. Furthermore, depending on the used conditions such as external temperature atmospheres for example, the torque sensor properties may be varied.

Therefore, in such a case, even if the user enters the same human power torque for each pedal input cycle, the human power torque value detected by the torque sensor changes to be higher or lower than its actual level, proper motor assistance is not effected, and a comfortable human power assisting feeling can not be obtained for the electric bicycle.

In addition, the torque sensor and the zero point adjusting mechanism are precision equipment for detecting torque with high accuracy and making adjustment, mounted deep in a motor and transmission mechanism, and accommodated into a casing for satisfactory protection, thereby preventing an erroneous detection due to external interference. When the user makes readjustment, it takes time and labors for disassembling and reassembling, and adjusting operation itself is required to be made delicately. Therefore, it is very hard for the user to make readjustment.

In view of above, the present invention aims to provide a zero point adjusting mechanism for a torque sensor which allows the sensor performance change with time and can be provided with improved reliability and safety without the necessity of using the mechanical structure and the electrical adjusting element for the zero point adjustment and the zero point adjusting operation in assembling for the drive force auxiliary device which is provided with the above-described sensor, to eliminate the zero point adjusting operation in assembling, and to make the zero point adjustment automatically at every use.

SUMMARY OF THE INVENTION

The invention relates to a sensor provided with a magnet and a magnetic detecting element comprising a detection shaft, a detection disc which is fixed to the detection shaft, a magnetic piece which is fixed to the outer circumference edge of the detection disc, a yoke which is disposed to hold the magnetic piece in a predetermined shaped gap, and the magnet and the magnetic detecting element both fixed to the yoke.

In this invention, the magnetic piece fixed to the outer circumference edge of the detection disc is preferably disposed to have its radius increased or decreased gradually or its thickness increased or decreased gradually.

The invention relates to a sensor provided with a magnet and a magnetic detecting element comprising a cylindrical case, a detection shaft both ends of which are rotatably supported by the end faces of the case, a split magnet disposed around the detection shaft, and the magnetic detecting element fixed to the case; wherein the case is partly formed of a yoke which guides to focus magnetic flux generated by the magnet onto the magnetic detecting element, and the yoke is formed in a shape to have its width in the direction of the detection shaft decreased in the direction of the magnetic detecting element.

The invention relates to a sensor provided with a magnet and a magnetic detecting element comprising a detection shaft; a magnet disc or magnet semicircular disc which is fixed to the detection shaft and has its projections, which are intermittently formed on the periphery, alternately magnetized to N and S; a yoke having a substantially C-shaped form which has the leading ends opposed to a rotation initial position of the magnet disc or magnet semicircular disc and fixed to a case side; and the magnetic detecting element disposed on the yoke.

The invention relates to a sensor provided with a magnet and a magnetic detecting element comprising a detection shaft; a semicircular disc which is fixed to the detection shaft, formed of a material having high magnetic permeability or a soft magnetic material into the shape of an arc and has its projections at both ends in the circumferential direction; a yoke having a substantially C-shaped form which has both ends opposed to a rotation initial position of the semicircular disc; a magnet which is disposed on one end of the yoke; and the magnetic detecting element disposed on the other end of the yoke.

And the invention relates to a drive force auxiliary device having the sensor described above, wherein the drive force auxiliary device has a human power drive means, an auxiliary drive means and a torque sensor; the human power drive means is configured by disposing a drive force transmitting mechanism having first and second rotors on the outer periphery of a crank shaft to which leg power is transmitted, and the drive force transmitting mechanism has a first one-way clutch and an elastic member for transmitting human power drive force; the auxiliary drive means is configured by disposing a motor and a speed decreasing mechanism, and the drive force from the motor is added to the drive force transmitting mechanism on the outer periphery of the crank shaft through a second one-way clutch; and the torque sensor detects a difference of rotations of the first and second rotors, which are disposed at the front and rear of a drive force transmitting route of the elastic member, by a rotation angle sensor.

In the drive force auxiliary device, an elastic member for rotational energizing is preferably disposed to push to rotate a detection shaft of the rotation angle sensor in a direction that the rotation angle sensor shows zero value.

In this drive force auxiliary device, the rotationally energizing elastic member has preferably a pre-pressure value which is at least larger than a total frictional torque of the torque sensor mechanism and the rotation angle sensor.

In this drive force auxiliary device, the rotation angle sensor has preferably a magnet disposed on a rotor which produces a difference in rotations and a magnetic detecting element disposed at an appropriate position on the side of a stator in the neighborhood of the magnet.

In this drive force auxiliary device, the magnetic detecting element is preferably a Hall element, and the Hall element is connected to a temperature compensating circuit for compensating an output voltage of the Hall element.

In this drive force auxiliary device, the magnetic detecting element is preferably a Hall element, a Hall IC, or an MR element.

In the drive force auxiliary device, the rotation angle sensor comprises preferably a detection disc which is fixed to the detection shaft, a magnetic piece which is fixed to the outer circumference edge of the detection disc, a yoke which is disposed to hold the magnetic piece in a square C-shaped gap open downwards, and a magnet and a magnetic detecting element respectively fixed to opposed ends of the yoke.

In this drive force auxiliary device, the rotation angle sensor is preferably accommodated in a case provided with a magnetic shield.

In the drive force auxiliary device, the torque sensor is preferably configured to detect a difference of rotations between the first rotor and the second rotor which are disposed at the front and rear of the drive force transmitting route of the elastic member; and a speed sensor is configured by embedding a magnet on the side and in the neighborhood of the outer periphery of the rotor member of the human power drive means or the torque sensor and fixing a magnetic detecting element to a position in the neighborhood of the side corresponding to this magnet.

In this drive force auxiliary device, the torque sensor is preferably configured to detect by a sensor a difference of rotations between the first rotor and the second rotor which are disposed at the front and rear of the drive force transmitting route of the elastic member; and the motor is a brushless motor which has a magnet piece to be detected for determining the rotation position of the rotor on the end face of the rotor to detect the rotation position of the rotor to control the flow of current to exciting coils of various phases, a magnetic detecting element is disposed in the neighborhood of a rotating track of the magnet piece to be detected, and the magnetic of the magnet piece to be detected is detected by the magnetic detecting element to determine the rotation position of the rotor; and a speed sensor is configured by connecting the input terminal of an amplifier to one of output terminals of the magnetic detecting element and connecting the output terminal of the amplifier to a control circuit.

The drive force auxiliary device comprises preferably a torque sensor for detecting human power entered, a vehicle speed detecting means for detecting a running speed of the drive force auxiliary device, and an auxiliary power means using a motor; and the torque sensor, the vehicle speed detecting means and the auxiliary power means are accommodated in a single case.

The drive force auxiliary device comprises preferably a torque sensor for detecting human power entered, a vehicle speed detecting means for detecting a running speed of the drive force auxiliary device, and an auxiliary power means using a motor; the motor is provided with a rotor rotation position detecting means which detects a rotation position of the rotor to control commutation; and the vehicle speed detecting means detects a running speed of the drive force auxiliary device based on a rotation position signal obtained from the rotor rotation position detecting means.

In the vehicle speed detecting mechanism, the vehicle speed detecting means detects preferably a running speed based on a time interval of the occurrences of a rotor position signal obtained from the rotor rotation position detecting means.

In this vehicle speed detecting mechanism, the vehicle speed detecting means detects preferably a running speed based on the number of rotor position signals obtained from the rotor rotation position detecting means in a predetermined period.

In this vehicle speed detecting mechanism, the rotor rotation position detecting means has preferably a magnet piece to be detected for determining the rotation position of the rotor on the end face of the rotor, and a single magnetic detecting element or a plurality of magnetic detecting elements disposed at predetermined angled intervals in the neighborhood of the rotating track of the magnet piece to be detected; and the magnetic of the magnet piece to be detected is detected by the magnetic detecting element, thereby detecting the rotation position of the rotor.

And, the drive force auxiliary device comprises preferably a torque sensor which is connected to a human power transmission system to detect human power entered and a zero point adjusting mechanism which corrects the human power detection value of the torque sensor by a zero point value; the zero point adjusting mechanism comprises a holding means for holding an output value of the torque sensor and a subtraction means for subtracting a value held by the holding means from the output value of the torque sensor; and the output value for the first time from the torque sensor is held by the holding means when operation is made to start the drive force auxiliary device, the held value is determined as the zero point of the torque sensor, and the held value is always deducted from the torque sensor output value by the deducting means to obtain output after the zero point adjustment.

In the torque sensor zero point adjusting mechanism of the drive force auxiliary device, it is preferable that after the operation of starting the drive force auxiliary device, when the output value from the torque sensor is smaller than the zero point value held by the holding means, the output value is adopted as a new zero point value.

In the torque sensor zero point adjusting mechanism of the drive force auxiliary device, it is preferable that when the output value from the torque sensor is smaller than the zero point value held by the holding means in a predetermined period after the operation of starting the drive force auxiliary device, a plurality of minimum values are stored and held, the average value of the plurality of minimum values, and the average value is adopted as a new zero point value.

In the torque sensor zero point adjusting mechanism of the drive force auxiliary device, it is preferable that when the output value from the torque sensor is smaller than the zero point value held by the holding means and larger than a previously determined threshold value after the operation of starting the drive force auxiliary device, the output value is adopted as a new zero point value.

In the torque sensor zero point adjusting mechanism of the drive force auxiliary device, it is preferable that the holding means or the subtraction means is made of hardware such as an analog circuit.

In the torque sensor zero point adjusting mechanism of the drive force auxiliary device, it is preferable that the holding means or the subtraction means is achieved by a software program using a microprocessor and a memory.

BRIEF DESCRIPTION OF THE DRAWINGS

FIG. 1 illustrates an embodiment of the rotation angle sensor according to the invention, wherein (a) is a side view, (b) is a front view, and (c) is a schematic general perspective view.

FIG. 5 illustrates another embodiment of the rotation angle sensor according to the invention, wherein (a) is a side view, (b) is a front view, and (c) is a schematic general perspective view.

FIG. 37 is a conversion corresponding table of I/O signals for illustrating the operation of the circuit of the embodiment.

BEST MODE FOR CARRYING OUT THE INVENTION

Figure 2A:
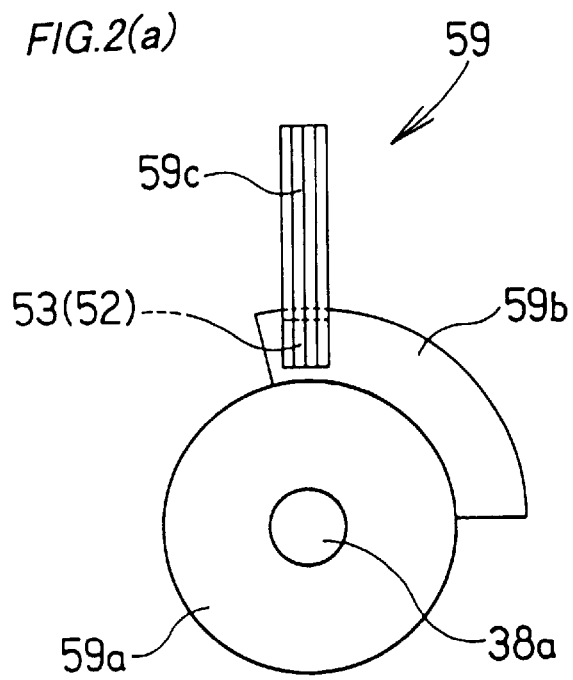
FIG. 2 illustrates another embodiment of the rotation angle sensor according to the invention, wherein (a) is a side view, (b) is a front view, and (c) is a schematic general perspective view.

Descriptions will be made of a sensor, a drive force auxiliary device employing the sensor, and a torque sensor zero adjusting mechanism of the drive force auxiliary device successively.

As shown in FIGS. 1(a) to (c), a rotation angle sensor 59 as the sensor in this embodiment comprises a detection disc 59a fixed to a detection shaft 38a, a magnetic piece 59b having a predetermined shape fixed to the outer circumference of the detection disc 59a, a yoke 59c which is disposed with the magnetic piece 59b positioned in a square C-shaped gap open downwards, and a magnet 52 and a magnetic detecting element 53 respectively fixed to opposed ends of the yoke 59c.

The magnetic piece 59b is formed of a material having high magnetic permeability or a soft magnetic material in the shape of an arc with a radius decreased in the circumferential direction of the detection disc 59a. When the detection disc 59a is in a state of the initial rotational position, a part of the magnetic piece 59b having the maximum radius is positioned in the gap of the yoke 59c.

Therefore, a quantity of magnetic flux reaching from the magnet 52 to the magnetic detecting element 53 through the gap becomes maximum by being guided by the magnetic piece 59b. And, as the detection disc 59a rotates from the initial position, the radius of the magnetic piece 59b is gradually decreased, and the area of the magnetic piece 59b crossing between the magnet 52 and the magnetic detecting element 53 is decreased. Accordingly, a flux induction effect in the gap of the yoke 59c is lowered to decrease the quantity of magnetic flux reaching the magnetic detecting element 53.

Thus, the magnetic flux from the magnet 52 involves a change in quantity of magnetic flux reaching the magnetic detecting element 53 depending on the rotation angle of the detection shaft 38a, namely the rotation angle of the detection disc 59a, so that a change in rotation angle of the detection shaft can be measured in view of the quantity of magnetic flux.

Since the magnet 52 and the magnetic detecting element 53 are attached to the yoke 59c, magnetic flux generated by the magnet 52 is used to make a magnetic circuit having higher stability. Specifically, the yoke 59c is formed of a magnetic permeable material with a gap having a predetermined distance formed between both ends. Therefore, magnetic flux generated from pole N of the magnet 52 is passed through the air gap to reach the opposed magnetic detecting element 53, guided through the yoke 59c, and returned to pole S of the magnet 52. As a result, the air gap is kept filled by the stable flux.

Besides, the magnetic detecting element 53 is a Hall element which has a detection part of a gallium arsenide type having a good temperature characteristics. And, the magnet 52 is a samarium cobalt type having good temperature characteristic. These configurations are also applied to the rotation angle sensors in respective embodiments to be described afterwards.

And, the magnetic detecting element 53 may be an MR (magneto-resistance effect) element.

By accommodating such a configuration into a magnetic shielding case, magnetic noise resistance can be enhanced to improve accuracy higher. The same is also applied to the rotation angle sensors in respective embodiments to be described afterwards.

The magnetic piece in this embodiment is formed so that the maximum radius at the initial position is gradually decreased. But, it may be designed to increase from the minimum radius and to measure a rotation angle to be detected in view of an increase in the quantity of magnetic flux.

As described above, in the sensor according to the embodiment, the magnetic gap is fixed by the yoke and does not vary, and problems due to the gap are not many, while setting of the gap between the magnet and the magnetic detecting element was very delicate and hard for a conventional sensor.

And, by forming a magnetic circuit with a yoke disposed, this magnetic circuit serves as cushion to relieve or absorb various dispersions due to a difference in performances of respective magnets, variations of tolerance in production of respective parts, or temperatures at use. Thus, the sensor can be provided with stable performance.

Description will be made of a second embodiment of the sensor.

The sensor in this embodiment also has a yoke for guiding the magnetic flux of a magnetic circuit to form a stable magnetic circuit in the same manner as in the first embodiment, secures the air gap between the magnet and the magnetic detecting element with reliability, and also disposes a magnetic piece which is variable according to a rotation angle to change the quantity of magnetic flux reaching the magnetic detecting element, thereby measuring a rotation angle.

Figure 2B:
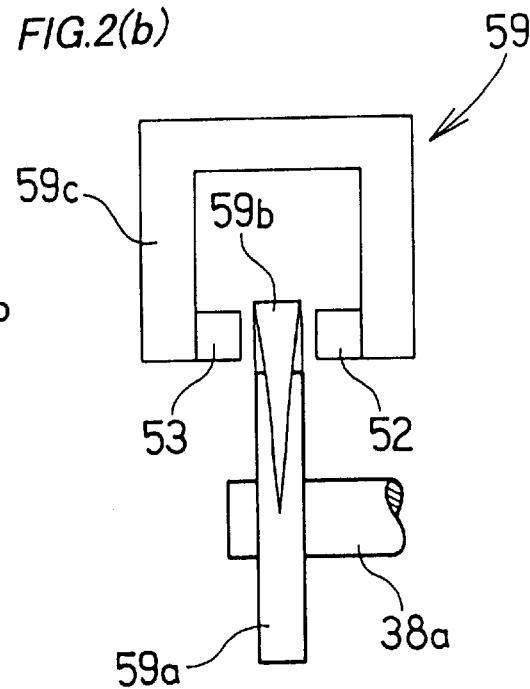
Figure 2C:
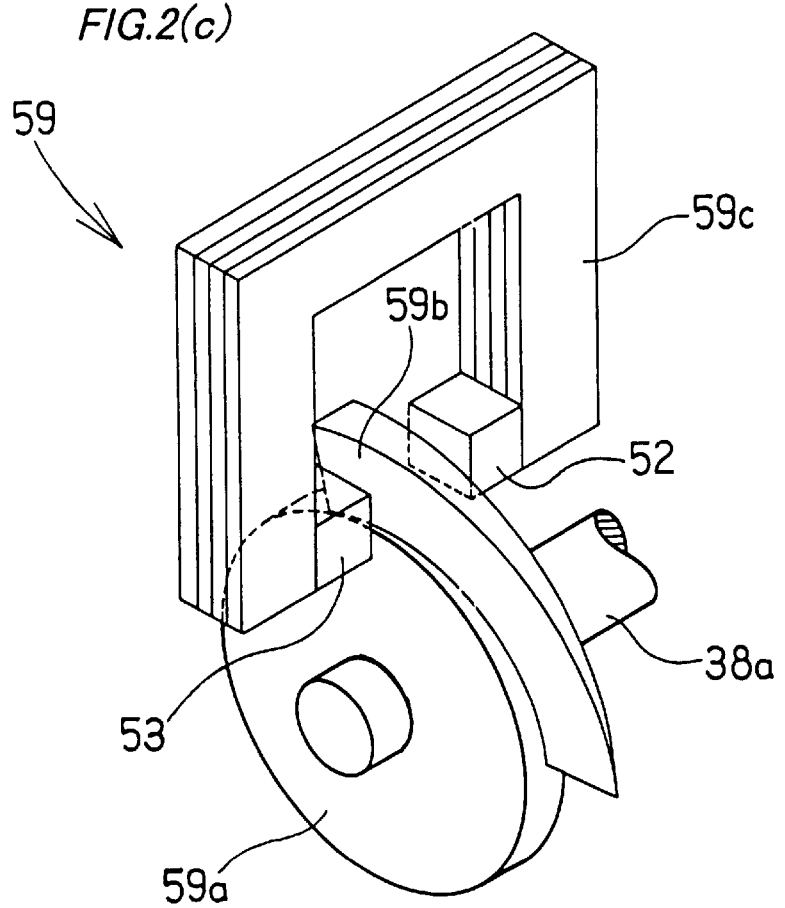

Specifically, as shown in FIGS. 2(a) to (c), a rotation angle sensor 59 in this embodiment comprises, in the same way as in the first embodiment, a detection disc 59a fixed to a detection shaft 38a, a magnetic piece 59b having a predetermined shape fixed to the outer circumference of the detection disc 59a, a yoke 59c which is disposed with the magnetic piece 59b positioned in a square C-shaped gap open downwards, and a magnet 52 and a magnetic detecting element 53 respectively fixed to opposed ends of the yoke 59c.

The magnetic piece 59b is formed of a material having high magnetic permeability or a soft magnetic material in the shape of an arc with its thickness in the axial direction decreased gradually in the circumferential direction of the detection disc 59a. When the detection disc 59a is in a state of the initial rotational position, a part having the maximum thickness of the magnetic piece 59b is positioned in the gap of the yoke 59c.

Therefore, a quantity of magnetic flux reaching from the magnet 52 to the magnetic detecting element 53 through the gap becomes maximum owing to the presence of the thickest part of the magnetic piece 59b. And, as the detection disc 59a rotates from the initial position, the thickness of the magnetic piece 59b is gradually decreased, and the thickness of the magnetic piece 59b crossing between the magnet 52 and the magnetic detecting element 53 is decreased. Accordingly, a flux induction effect by the magnetic piece 59b is lowered to decrease the quantity of magnetic flux reaching the magnetic detecting element 53.

Thus, the magnetic flux from the magnet 52 involves a change in quantity of magnetic flux reaching the magnetic detecting element 53 depending on the rotation angle of the detection shaft 38a, namely the rotation angle of the detection disc 59a, so that a change in rotation angle of the detection shaft can be measured in view of the quantity of magnetic flux.

Therefore, when the detection disc rotates to the rotation angle corresponding to a measuring object, the volume of the magnetic piece 59b in the gap of the magnetic circuit is decreased, and the distance of the air gap where the magnetic flux passes through is varied, and a quantity of magnetic flux reaching the magnetic detecting element 53 is varied. And, by detecting the changed quantity of magnetic flux by the magnetic detecting element 53, a rotation angle can be measured accurately.

The magnetic piece was formed so that the maximum thickness in the initial position is gradually decreased in the same way as in the first embodiment, but it may be formed so that the minimum thickness is gradually increased, and a rotation angle to be detected is measured in view of an increase in quantity of magnetic flux.

Besides, the magnetic piece may be formed to have a shape incorporating the shapes in the first and second embodiments.

Now, description will be made of a third embodiment of the sensor.

The sensor in this embodiment secures an air gap between a magnet and a magnetic detecting element by rotatably supporting a detection cylinder having a magnet and decreasing friction torque during the rotating operation.

Figure 3A:
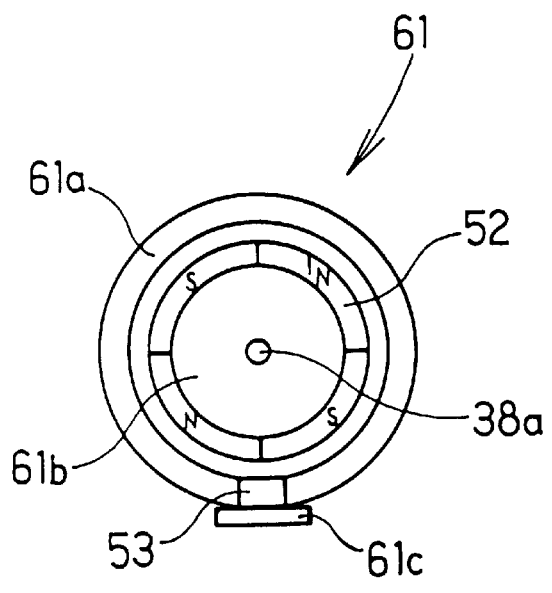
FIG. 3 illustrates another embodiment of the rotation angle sensor according to the invention, wherein (a) is a side view, (b) is a front view, and (c) is a schematic general perspective view.
Figure 3B:
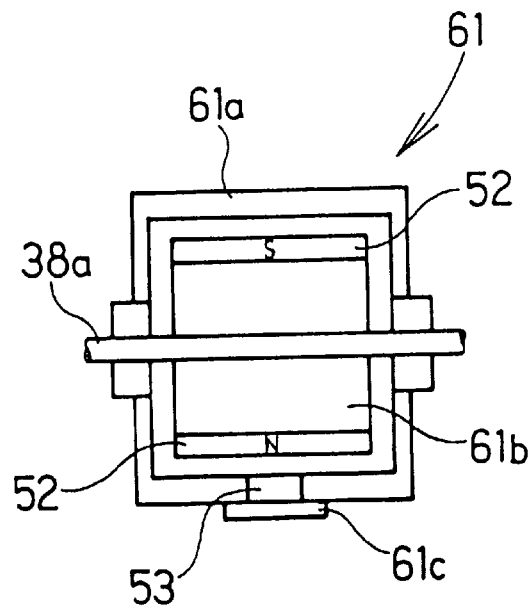
Figure 3C:
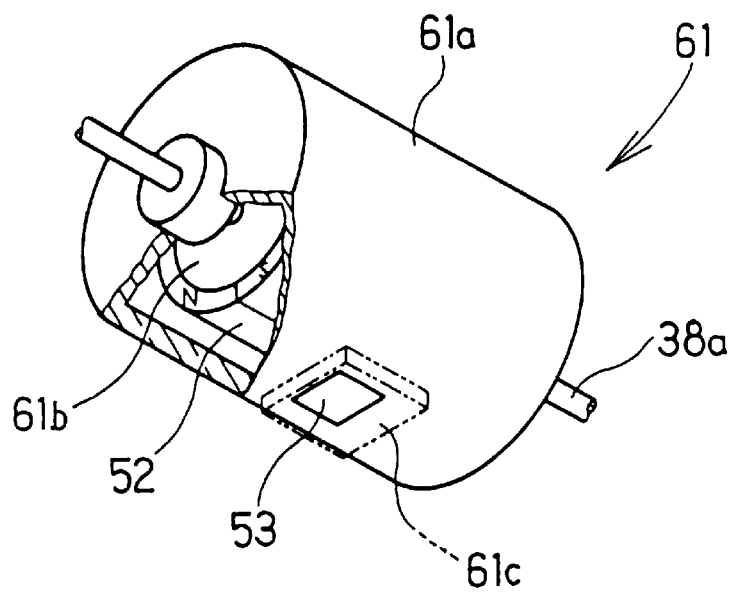

Specifically, a rotation angle sensor 61 in this embodiment comprises a detection cylinder 61b which is accommodated in a cylindrical case 61a and fixed to a detection shaft 38a both ends of which are rotatably supported by the case 61a, a magnet 52 which is fixed to the outer periphery of the detection cylinder 61b and magnetizes the outer periphery as four equally divided portions, and a magnetic detecting element 53 which is fixed to a predetermined position on the case 61a positioned in the neighborhood of the outside of the magnet 52 as shown in FIG. 3(a) to FIG. 3(c).

This detection cylinder 61b is formed to have a cylindrical shape by a non-magnetic material and fixed to the detection shaft 38*a* both ends of which are rotatably supported by the case 61*a*. And, the magnet 52 in the form of a ring is fixed to the outer periphery of the detection cylinder 61*b* and equally divided into four parts in the circumferential direction and alternately magnetized into N and S.

The magnetic detecting element 53 is fixed together with a substrate 61*c*, and positioned to oppose the boundary of N and S poles of the detection cylinder 61*b* magnetized by the magnet 52 when the detection cylinder 61*b* into which human power torque is not entered is in a state of the initial rotational position.

Figure 4:
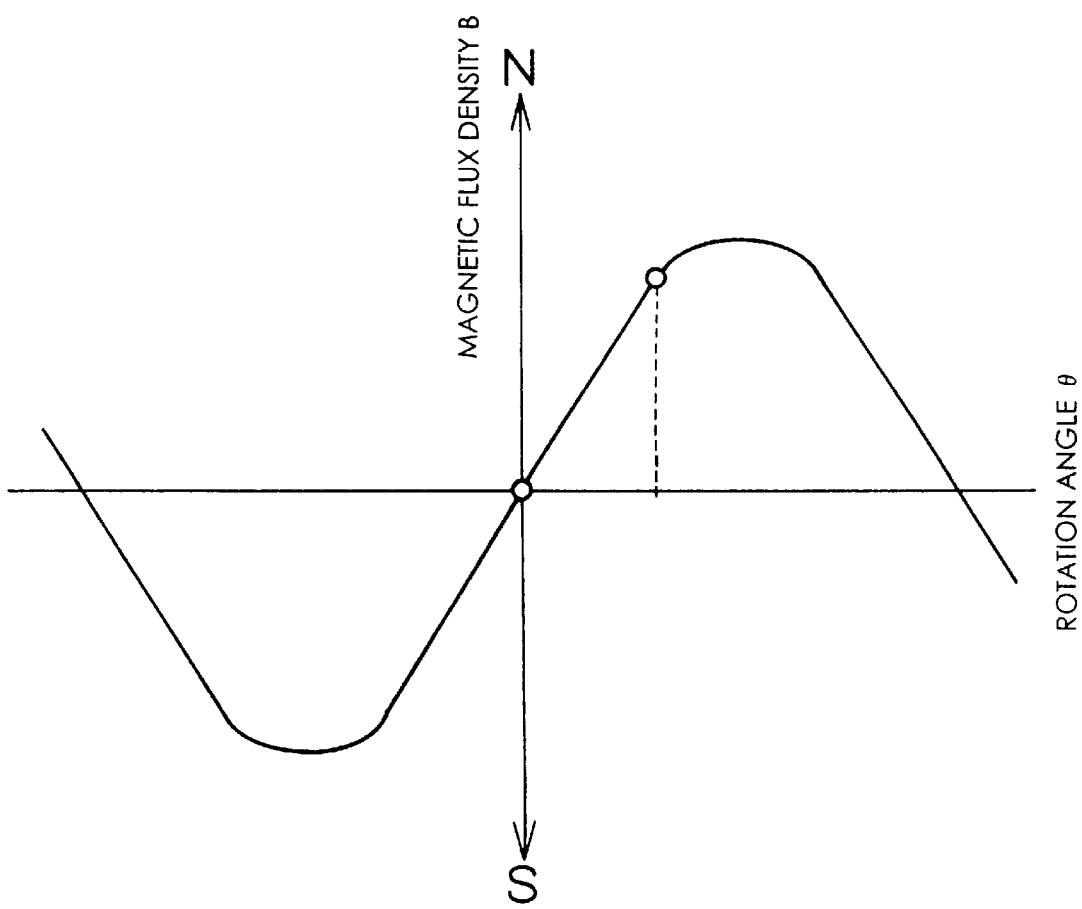
FIG. 4 is a graph illustrating the relation between a rotation angle and a magnetic density by the rotation angle sensor in the same embodiment.

Therefore, in the state of the initial rotational position, flux density B which is generated by the magnet 52 and reaches the magnetic detecting element 53 is zero as shown as zero point in FIG. 4. And, when the detection shaft 38*a* and accordingly the detection cylinder 61*b* rotate according to the human power's driving force, the relative positional relation between the magnet 52 and the magnetic detecting element 53 is varied, and the flux density B detected increases according to rotation angle $\theta$. And, the rotation angle $\theta$ is measured by utilizing the linearly proportional relation between the rotation angle $\theta$ and the flux density B.

And, magnetic flux generated by the magnet is self-stabilized in the neighborhood of the boundary between the N and S poles, so that a pre-load can be given in a direction of zero point.

In this embodiment, by using a magnetic detecting element which can identify the N or S polarity of the detected magnetic flux, the rotation angle to be detected can be applied not only to one direction from the initial position but also to both directions.

As described above, since both ends of the shaft is supported in this embodiment, the rotating operation is stable, deviations of an air gap or loosening can be decreased, and performance can be stabilized. Besides, friction torque during operation can be decreased.

Description will be made of a fourth embodiment of the sensor.

The sensor in this embodiment rotatably supports both ends of a detection cylinder provided with the magnet which rotates according to the detected human power drive force to secure an air gap between a magnet and a magnetic detecting element and to decrease the friction torque during the rotation operation, and has a magnetic collection member on a face opposed to the magnet of the magnetic detecting element.

As shown in FIG. 5(*a*) to FIG. 5(*c*), a rotation angle sensor 61 in this embodiment comprises, in the same way as the third embodiment, a detection cylinder 61*b* fixed to a detection shaft 38*a* both ends of which are rotatably supported in a case 61*a*, a magnet 52 which is fixed to the outer periphery of the detection cylinder 61*b* and magnetizes the outer periphery as four equally divided portions, and a magnetic detecting element 53 which is fixed to a predetermined position in the neighborhood of the outside of the magnet 52. In addition, a magnetic collection member 61*d* made of a highly magnetic permeable material or a soft magnetic material is disposed on the back face of the magnetic detecting element 53 with respect to the magnet 52.

Therefore, since the magnetic flux generated by the magnet 52 can be concentrated on the magnetic detecting element 53 by means of the magnetic collection member 61*d*, the sensibility of the magnetic detecting element 53 can be improved.

As described above, this embodiment provides the same effects as the third embodiment and can improve the sensibility of the magnetic detecting element because the magnetic flux generated by the magnet is concentrated on the magnetic detecting element by the magnetic collection member.

Description will be made of a fifth embodiment of the sensor.

A rotation angle sensor in this embodiment secures an air gap between a magnet and a magnetic detecting element and decreases the friction torque during the rotation operation, and is provided with a yoke which guides by enhancing the concentration of the magnetic flux generated by the magnet to the magnetic detecting element.

Figure 6A:
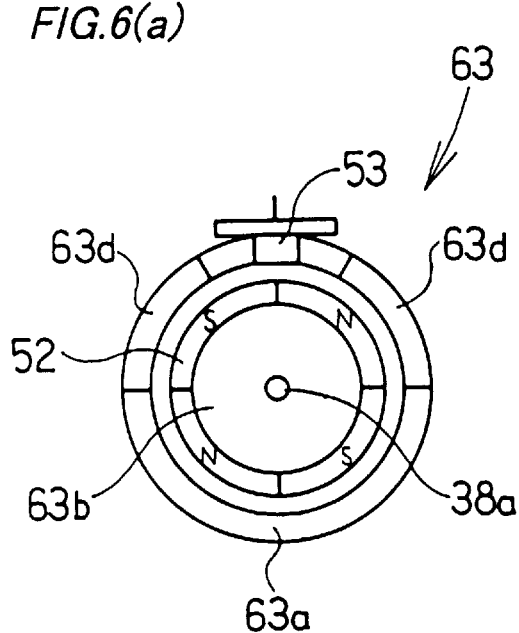
FIG. 6 illustrates another embodiment of the rotation angle sensor according to the invention, wherein (a) is a side view, (b) is a front view, and (c) is a schematic general perspective view.
Figure 6B:
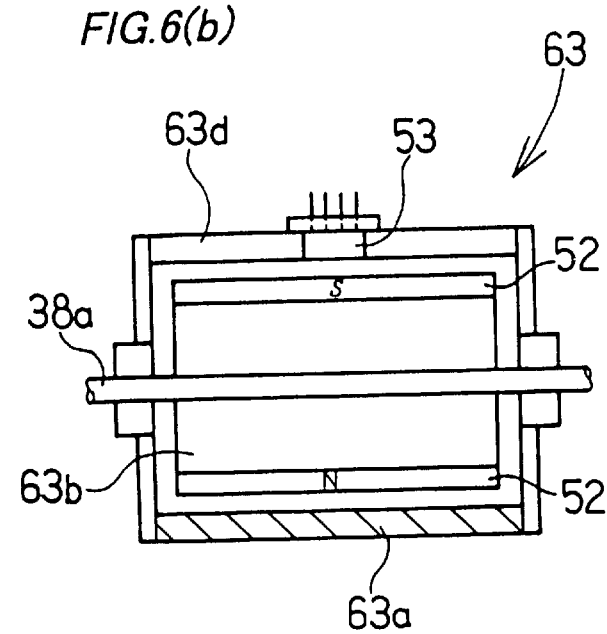
Figure 6C:
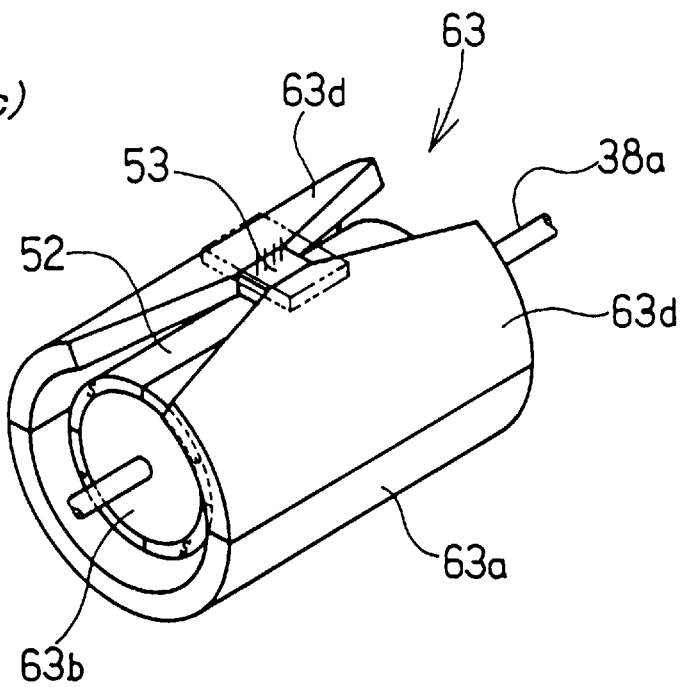
Figure 7A:
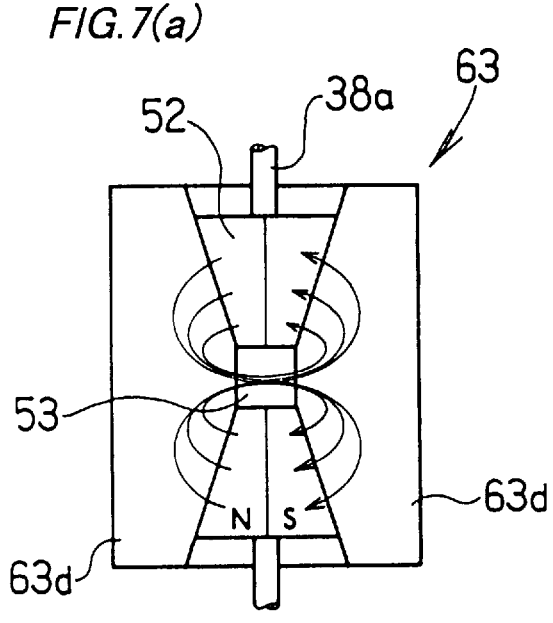
FIG. 7 illustrates another embodiment of the rotation angle sensor according to the invention, wherein (a) is a plan view, (b) is a side view, (c) is a plan view, and (d) is a side view.
Figure 7C:
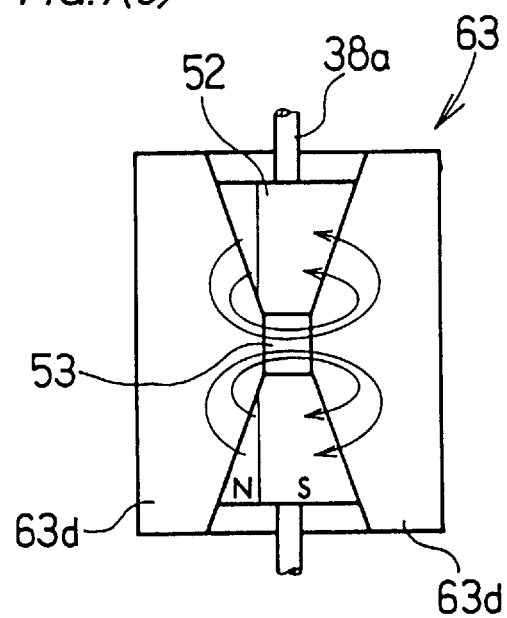
Figure 7B:
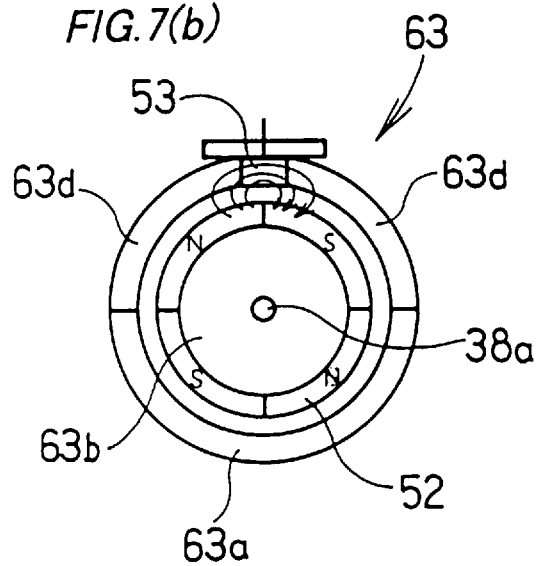
Figure 7D:
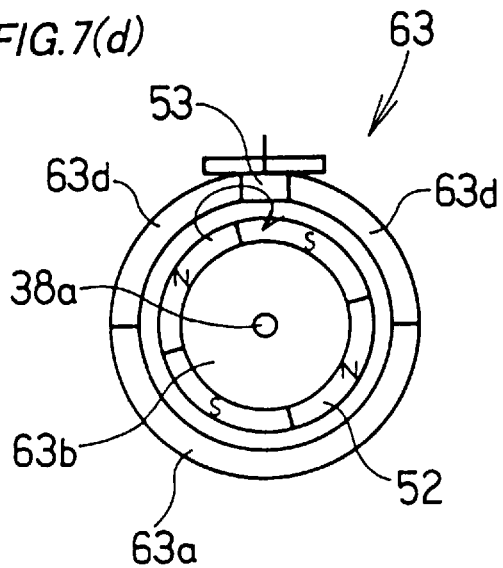

As shown in FIG. 6(*a*) to FIG. 6(*c*), a rotation angle sensor 63 in this embodiment comprises a detection cylinder 63*b* fixed to a detection shaft 38*a* both ends of which are rotatably supported by a cylindrical case 63*a*, a magnet 52 which is fixed to the outer periphery of the detection cylinder 63*b* and magnetizes the outer periphery into four divided portions, and a magnetic detecting element 53 fixed to a predetermined position in the neighborhood of the outside of the magnet 52. In addition, the case 63*a* is partly formed of a yoke 63*d* which guides by concentrating the magnetic flux generated by the magnet 52 to the magnetic detecting element 53.

The yoke 63*d* is formed so that its breadth in the direction of the detection shaft 38*a* decreases towards the magnetic detecting element 53.

Therefore, the magnetic flux generated by the magnet can be guided concentrically to the magnetic detecting element by the yoke 63*d*, and the magnetic flux to be detected is enhanced. Thus, the sensibility of the magnetic detecting element 53 can be improved. Specifically, as shown in FIG. 7(*a*) to FIG. 7(*b*), the magnetic flux generated by the magnet 52 at the initial rotation position is guided by the yoke 63*d* and enhanced to concentrate on the magnetic detecting element 53. And, when the detection shaft 38*a* rotates from the initial rotation position, the magnetic flux decreases substantially as shown in FIG. 7(*c*) to FIG. 7(*d*).

The yoke 63 may also be formed so that its thickness in the radial direction decreases towards the magnetic detecting element 53 to improve the enhancement of concentration of the magnetic flux.

As described above, since both ends of the shaft is supported in this embodiment, the rotating operation is stable, deviations of an air gap or loosening can be decreased, and performance can be stabilized. Besides, friction torque during operation can be decreased. Furthermore, the yoke is formed so that its breadth in the axial direction decreases towards the magnetic detecting element, the magnetic flux generated by the magnet is concentrated on the magnetic detecting element to improve the sensibility of the magnetic detecting element.

Description will be made of a sixth embodiment of the sensor.

The rotation angle sensor in this embodiment is formed to be thinner than in the previous respective embodiments.

Figure 8A:
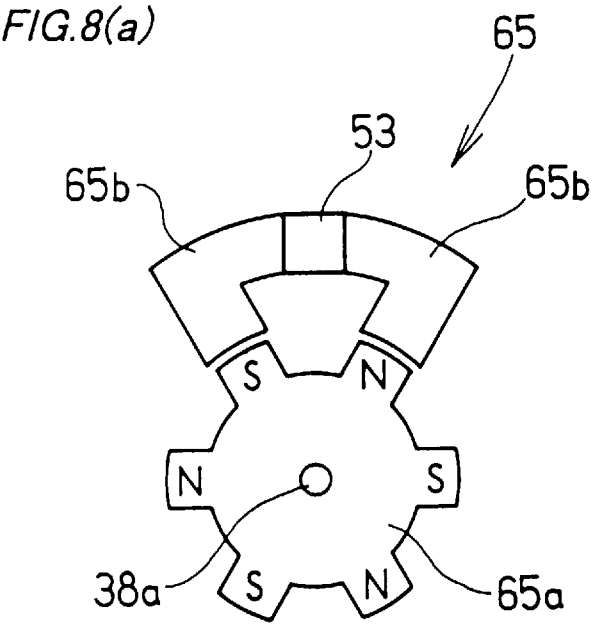
FIG. 8 is illustrates another embodiment of the rotation angle sensor according to the invention, wherein (a) is a side view, (b) is a front view, and (c) is a schematic general perspective view.
Figure 8B:
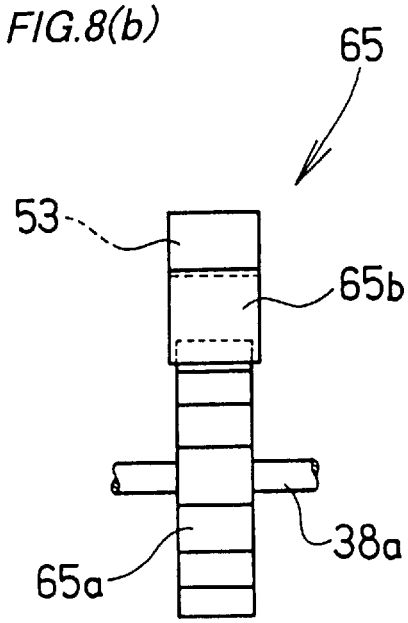
Figure 8C:
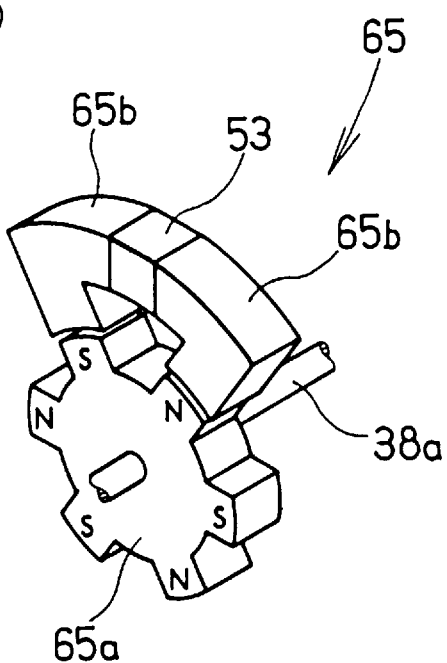

As shown in FIG. 8(*a*) to FIG. 8(*c*), a rotation angle sensor 65 in this embodiment comprises a magnet disc 65*a* which is fixed to a detection shaft 38*a* and has its projections formed at certain intervals on the periphery alternately magnetized into N and S, a substantially C-shaped yoke 65*b* which is fixed to a case (not shown) with both ends opposed to the rotation initial position of the magnet disc 65*a*, and a magnetic detecting element 53 which is disposed at the middle of the yoke 65*b*.

Therefore, by the rotation operation of the detection shaft 38a and the magnet disc 65a according to a measuring object, the mutual positional relation between the magnet disc 65a and the yoke 65b is changed, and a quantity of magnetic flux flowing through the yoke 65b is decreased. By detecting a change in quantity of magnetic flux by the magnetic detecting element 53, a rotation angle can be measured.

As described above, this embodiment provides the same effects as the previous respective embodiments and can decrease a required space to make a thin sensor.

Description will be made of a seventh embodiment of the sensor.

The rotation angle sensor in this embodiment is made compact.

Figure 9A:
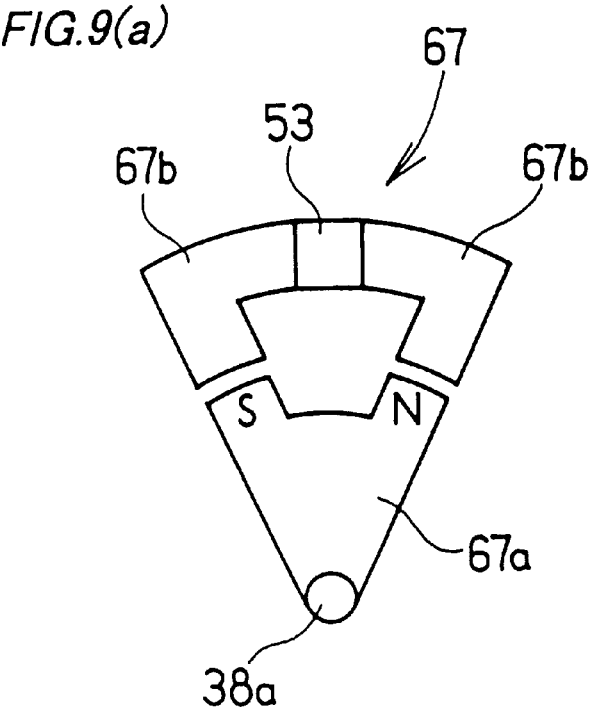
FIG. 9 illustrates another embodiment of the rotation angle sensor according to the invention, wherein (a) is a side view, (b) is a front view, and (c) is a schematic general perspective view.
Figure 9B:
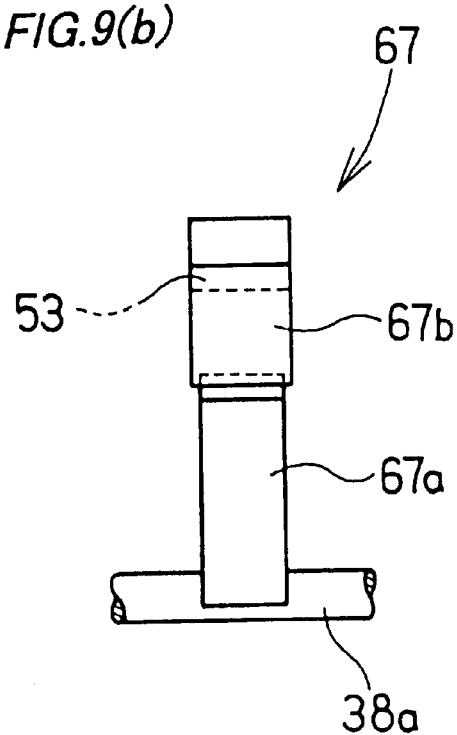
Figure 9C:
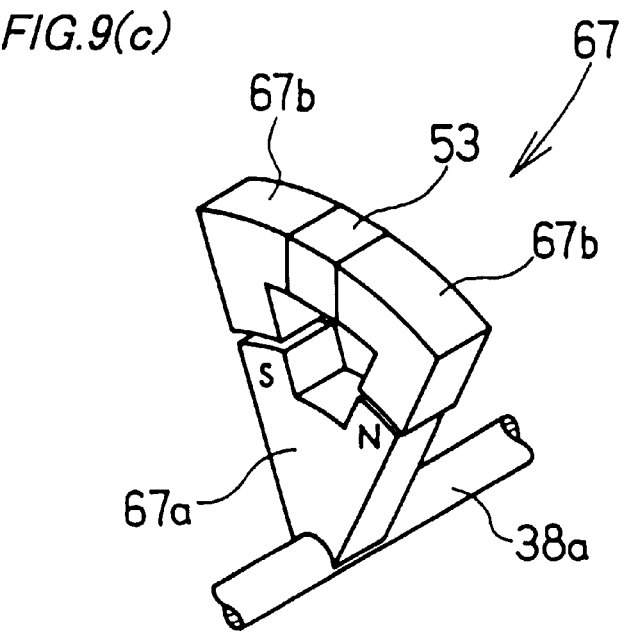

As shown in FIG. 9(a) to FIG. 9(c), a rotation angle sensor 67 in this embodiment comprises a magnet semicircular disc 67a which is fixed to a detection shaft 38a, formed in the form of a circular arc and has its projections at both ends in the circumferential direction magnetized to N and S, a substantially C-shaped yoke 67b which is fixed to a case (not shown) with both ends opposed to the rotation initial position of the magnet semicircular disc 67a, and a magnetic detecting element 53 which is disposed at the middle of the yoke 67b.

Therefore, in the same way as in the sixth embodiment, by the rotation operation of the detection shaft 38a and the magnet semicircular disc 67a according to a measuring object, the mutual positional relation between the magnet semicircular disc 67a and the yoke 67b is changed, and a quantity of magnetic flux flowing through the yoke 67b is decreased. By detecting a change in quantity of magnetic flux by the magnetic detecting element 53, a rotation angle can be measured.

As described above, this embodiment provides the same effects as the previous respective embodiments and can make a sensor compact in addition to thinning.

Description will be made of an eighth embodiment of the sensor.

The rotation angle sensor in this embodiment is made compact in a similar way as in the seventh embodiment.

Figure 10A:
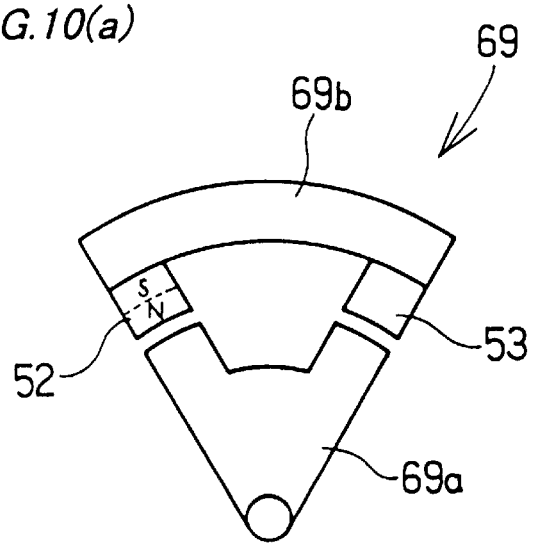
FIG. 10 illustrates another embodiment of the rotation angle sensor according to the invention, wherein (a) is a side view, (b) is a front view, and (c) is a schematic general perspective view.
Figure 10B:
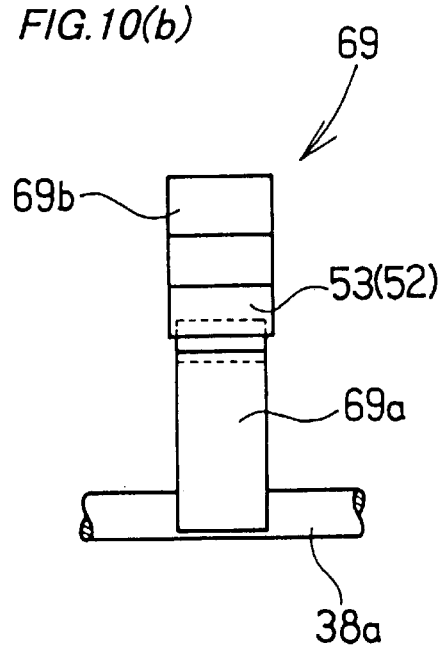
Figure 10C:
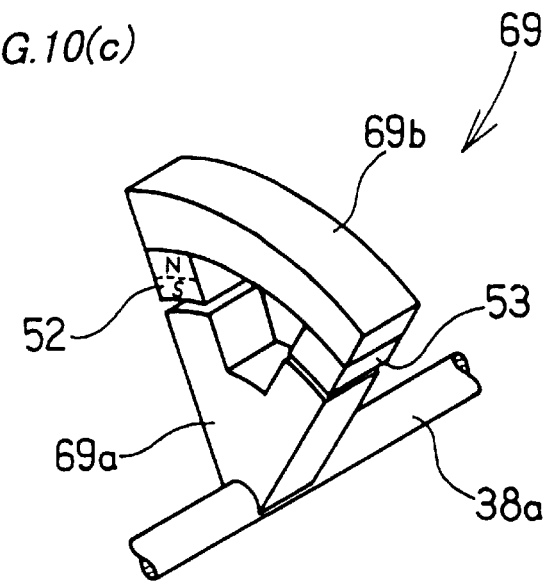

As shown in FIG. 10(a) to FIG. 10(c), a rotation angle sensor 69 in this embodiment comprises a semicircular disc 69a which is fixed to a detection shaft 38a, made of a highly magnetic permeable material or a soft magnetic material in the form of a circular arc and has its projections at both ends in the circumferential direction, a yoke 69b formed in the form of a circular arc which is fixed to a case (not shown) with both ends opposed to the rotation initial position of the semicircular disc 69a, a magnet 52 which is disposed on one end of the yoke 69b, and a magnetic detecting element 53 disposed on the other end.

Therefore, in the same way as in the seventh embodiment, by the rotation operation of the detection shaft 38a and the semicircular disc 69a according to a measuring object, the mutual positional relation between the semicircular disc 69a and the yoke 69b is changed, and a quantity of magnetic flux flowing through the yoke 69b is decreased. By detecting a change in quantity of magnetic flux by the magnetic detecting element 53, a rotation angle can be measured.

As described above, this embodiment provides the same effects as the previous respective embodiments and can make a sensor compact in addition to thinning.

Besides, by accommodating the structure indicated in the previous each embodiment into a case provided with a magnetic shield, a magnetic noise from other substances can be inhibited, so that the reliability of the sensor can be improved.

Description will be made of a drive force auxiliary device.

Figure 11:
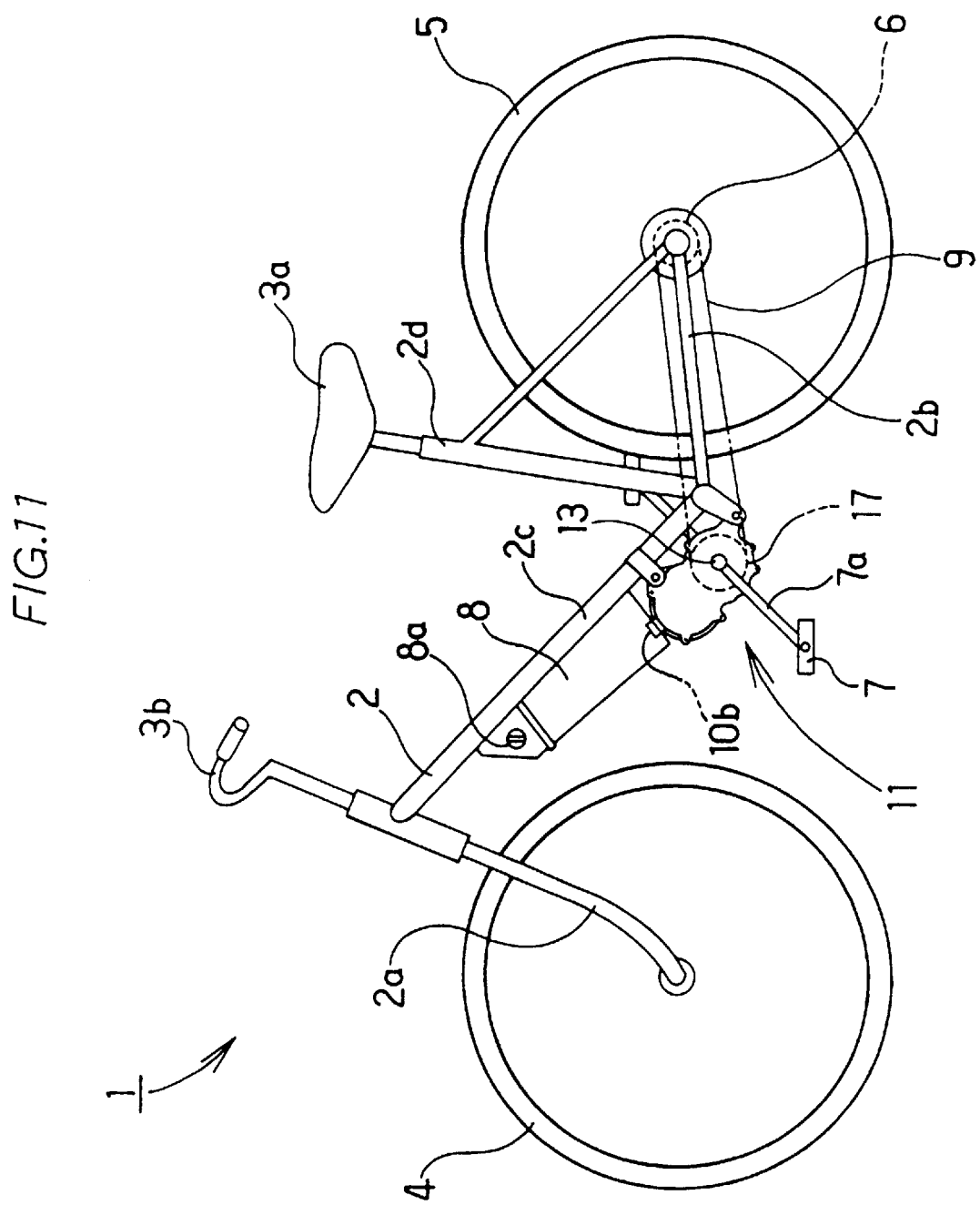
FIG. 11 is a side view showing a general schematic structure of the electric bicycle according to the invention.

As shown in FIG. 11, the light vehicle driven by human power in respective embodiments indicates a bicycle. This bicycle is an electric two-wheeler which assists human power by a motor which is driven by an onboard battery as the power source (hereinafter called the electric bicycle). The bicycle in this embodiment has a basic structure which is common in respective embodiments to be described afterwards.

In the same manner as a conventional bicycle, an electric bicycle 1 in this embodiment has wheels 4, 5 fitted at the front and rear of a frame 2 which is configured by assembling a plurality of pipe members. The frame 2 comprises front forks 2a for rotatably supporting the front wheel 4, rear forks 2b for rotatably supporting the rear wheel 5, a main pipe 2c which supports the forks 2a, 2b, and a seat pipe 2d which is disposed to stand from the main pipe 2c. And, at the top end of the seat pipe 2d is mounted a saddle 3a where a rider is seated, and a handle 3b is mounted to the top end of the front fork 2a. And, a power unit 11 provided with a crank shaft 13 rotatably supported horizontally is mounted below the main pipe 2c, a pedal arm 7a is fitted to both ends of the crank shaft 13, and a pedal 7 is rotatably fitted to the leading end of each pedal arm 7a. Besides, a battery unit 8 which supplies electric power to the power unit 11 is mounted below the main pipe 2c and in front of the power unit 11.

The battery unit 8 has on its case side a power switch 8a which starts the operation of the electric bicycle 1, and accommodates a group of storage batteries for supplying electric power, a control circuit and appendaged circuits. These storage batteries are connected as predetermined to output a predetermined voltage, e.g., 24V for the motor. And, the electric power from the battery unit 8 is supplied to, for example, the motor of the power unit 11, and the sensor and respective appendaged circuits, to operate the respective equipment.

And, the power unit 11 accommodates an electric motor M, a reduction gear, a human power/motor driving force combining mechanism, a torque sensor 30 (a leg-power detecting means for detecting the leg power of a rider because a bicycle is cited in this embodiment), and a speed detection means 40. The crank shaft 13 to which the pedals 7 are connected via the pedal arms 7a is connected to the combining mechanism, and output of the combining mechanism is connected to an output gear (a driving sprocket in this embodiment) 17. And, the driving sprocket 17 and a driven sprocket 6 coaxially fixed to the rear wheel 5 are connected by a drive chain 9 running between them. Though some members are not illustrated, brake levers mounted on the handle 3a, a brake mechanism, a head light for night running and the like are basically the same as those of a conventional bicycle.

In this electric bicycle 1, the front wheel 4 is steered by means of the handle 3a mounted on the front forks 2a, and the rear wheel 5 is driven to rotate by the rider who pushes the pedals 7, so that the electric bicycle 1 is driven by human power in the same way as an ordinary bicycle. Specifically, when the pedals 7 are pushed by human power of the rider, the driving sprocket 17 is driven to rotate via the combining mechanism, and the driving force of the driving sprocket 17 is transmitted to the driven sprocket 6 of the rear wheel 5 through the drive chain 9 to drive to rotate the rear wheel 5. Thus, the electric bicycle 1 is driven forward by the human power.

And, when the power switch 8a is turned on by a rider, electric power is supplied to the respective mounted equipment from the battery unit 8, the human power assisting operation of the electric bicycle 1 is activated to reduce a load on the rider, and a predetermined motor assisting output can be obtained from the electric motor M of the power unit 11.

Figure 12:
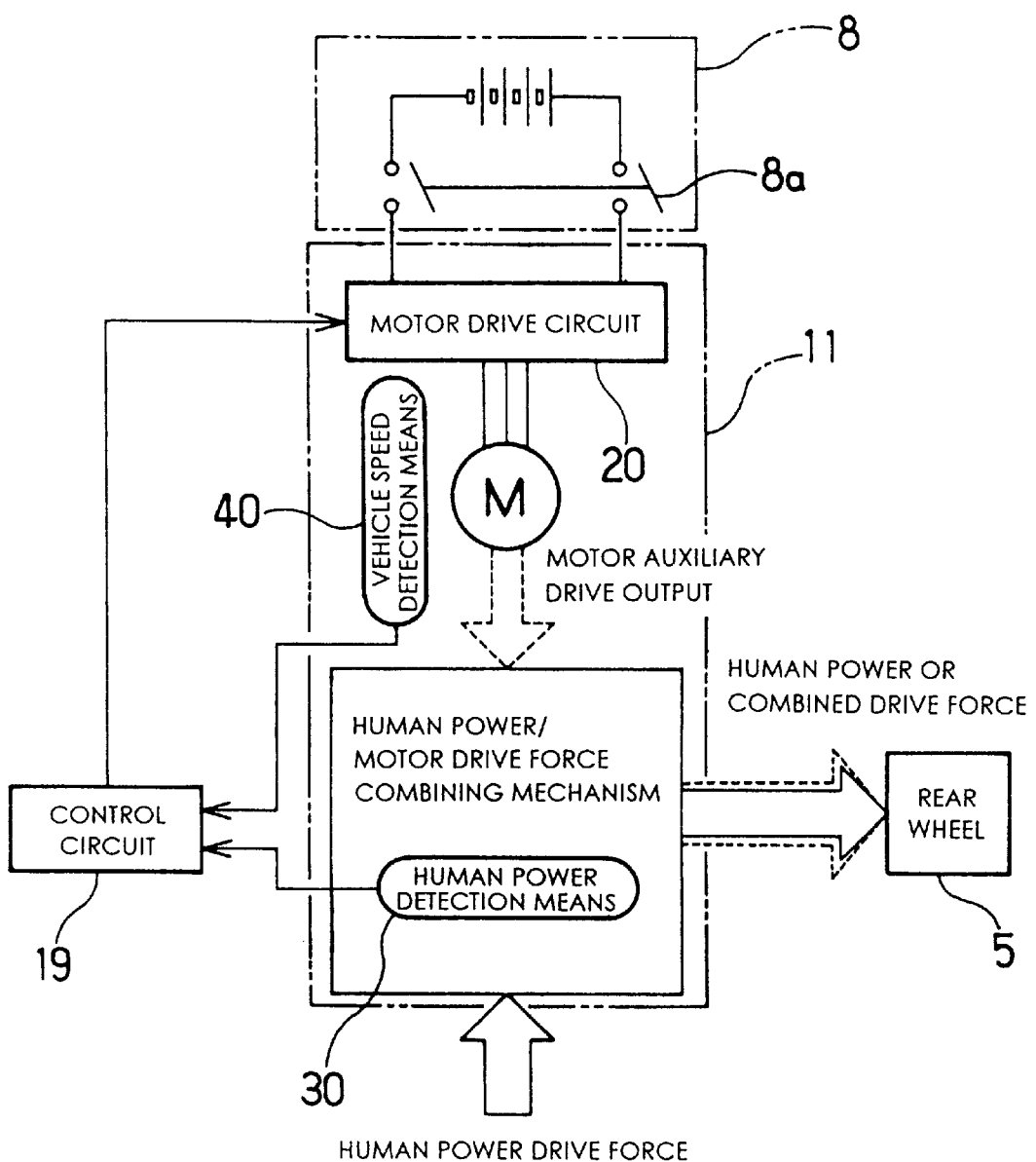
FIG. 12 is a block diagram illustrating schematically general control of human power drive and motor-assisted drive of the electric bicycle of the same embodiment.

Specifically, in this human power-assisting operation mode, when the pedals 7 of the electric bicycle 1 in this embodiment are pushed by the human power of the rider, the human power entered through the pedals is detected by a torque sensor 30 and at the same time the running speed of the bicycle 1 is detected by a vehicle speed detecting means 40 as shown in FIG. 12. Then, based on the values detected above, a control circuit 19 determines an appropriate motor output command value in accordance with a predetermined program. In other words, based on the running speed value read from the vehicle speed detecting means 40, the control circuit 19 calculates an assisting ratio for assisting the above-mentioned predetermined human power, and multiplies the assisting ratio with the human power detection value from the torque sensor 30 to determine an actually required motor output value. And, based on the command value, a motor drive circuit 20 operates to increase or decrease the electric power to be supplied from the battery unit 8 to the motor M, and the motor M receiving the electric power outputs a predetermined assisting drive force. Lastly, the motor assisting output is added to the human power by the human power/motor driving force combining mechanism, and the rear wheel 5 is driven to rotate by the combined drive force. Thus, the electric bicycle 1 is assisted by the motor power predetermined and can be driven forward comfortably with a load of human power reduced.

And, the output of the motor M is determined by the electrifying control by the motor drive circuit 20, so that the motor M is efficiently operated to change its speed. Specifically, a direct current of a constant voltage supplied from the battery unit 8 is supplied to the motor M for driving which is a DC motor through the motor drive circuit 20 for controlling electrifying, the motor drive circuit 20 performs the electrifying control such as chopper control to increase or decrease the motor supply current. And, the motor supply current is determined by the motor drive circuit 20 based on the motor output command from the control circuit 19, and the motor output command value is decided by the control circuit 19 based on the detected human power and running speed.

This control circuit 19 comprises a microcomputer which receives the detected signals from the torque sensor 30 which detects the human power entered into the power unit 11, the vehicle speed detecting means 40 which detects the vehicle's running speed and external environment sensors, and outputs a signal to command the operation to the motor drive circuit 20. Specifically, this microcomputer includes an A/D converter which converts respective input signals into digital signals, an I/O port which reads these digital signals in or out a memory space, a CPU which performs predetermined processing and decision based on the various data signals which were read, and memories. Thus, the control circuit 19 processes the detection signal data from the various sensors according to the program stored in the microcomputer memory to output an appropriate operation command such as a motor output command signal to the motor drive circuit 20.

The power unit 11 which is the drive force auxiliary device in this embodiment comprises a human power transmission system which transmits the rotating drive force entered by the rider pushing the pedals 7 to the driving sprocket which is the output gear 17 via the crank shaft 13, an assisting drive system which assists the rotation of the crank shaft 13 by the output of the motor M, the torque sensor 30 which determines a giving quantity of assisting drive force by the assisting drive system, and the vehicle speed detecting means 40 which detects the running speed of the electric bicycle 1.

Specifically, as shown in FIG. 13 to FIG. 17, this power unit 11 has within a three-division case 12 (12a, 12b, 12c) the crank shaft 13 to which the pedal arms 7a fixed to be rotatable, the combining mechanism which is disposed on the outer periphery of the crank shaft 13 and adds the motor drive force to the human power, the torque sensor 30 which is disposed on a power transmission route of the combining mechanism, the DC motor M for assisting the human power, and a reduction gear mechanism of the motor M. And, this combining mechanism is provided with a first one-way crutch mechanism which rotates the crutch shaft 13 freely from the transmission route to prevent the bicycle 1 from moving backwards when the crank shaft 13 is rotated backwards, and a second one-way crutch mechanism which rotates the motor drive system freely with respect to the crank shaft 13 when the motor M is suspended. And, roller bearings or slide bearings are disposed to rotate the respective shafts smoothly.

This case 12 is made of a heat-conducting and light-weight material such as aluminum and comprises a main case 12a which directly accommodates the motor M and cases 12b, 12c which cover both sides of them; they are assembled to form the case 12 as one body and to tightly close the case 12. And, when the motor M is operating, heat generated from the motor M and the motor drive circuit 20 involved in the motor operation is efficiently discharged to air through the case 12, so that the motor and the motor drive circuit 20 can keep operating stably. And, the case 12 is integrally provided with fins 12d in a lengthwise direction to enhance a radiating effect. Fixtures may be disposed on the case in the neighborhood of the motor to mount on the frame of the electric bicycle 1 to let the generated heat escape to the frame of the bicycle through the case.

Figure 13:
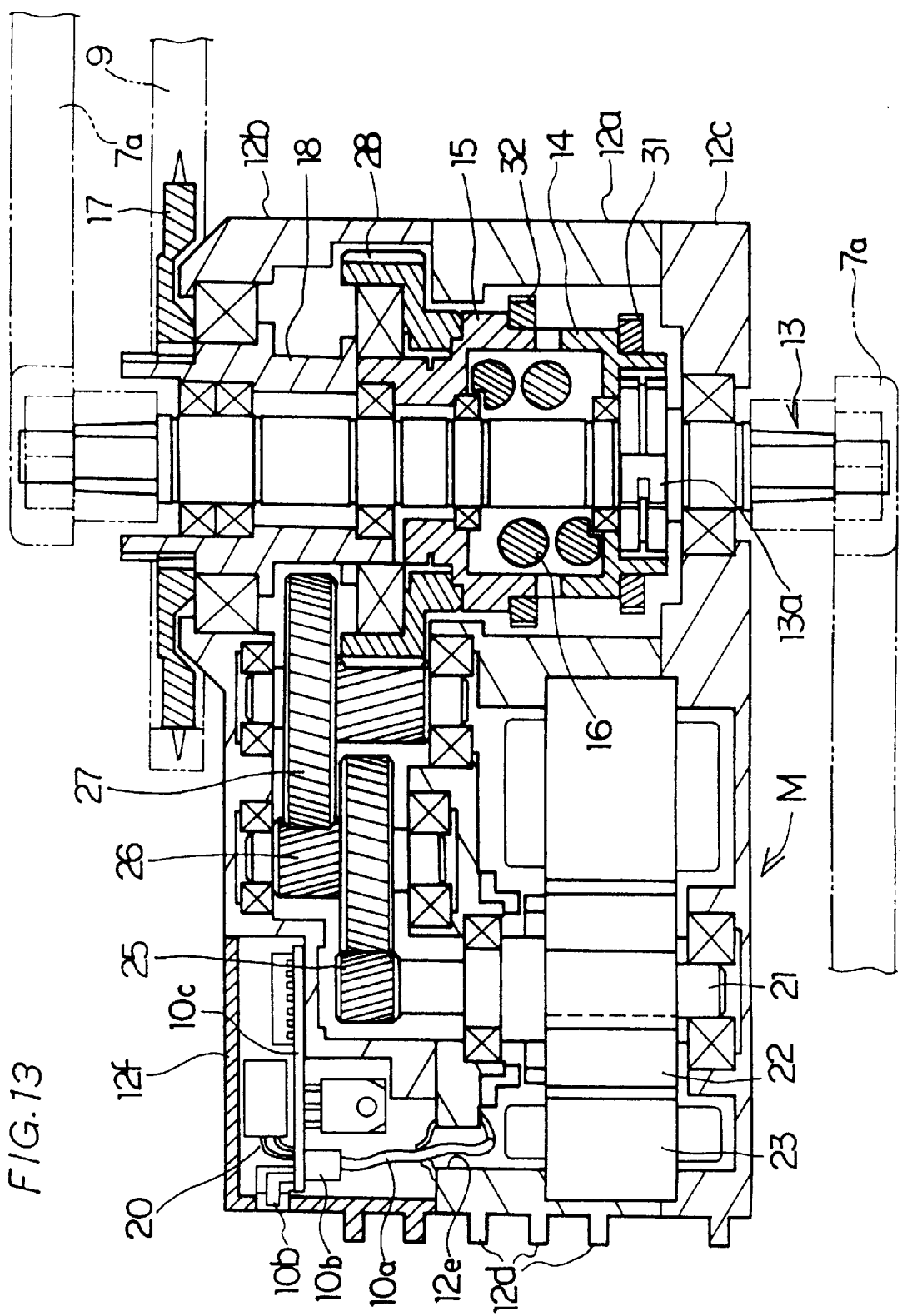
FIG. 13 is a plan view showing a power unit with its case partly cut off for the electric bicycle of the embodiment.
Figure 14:
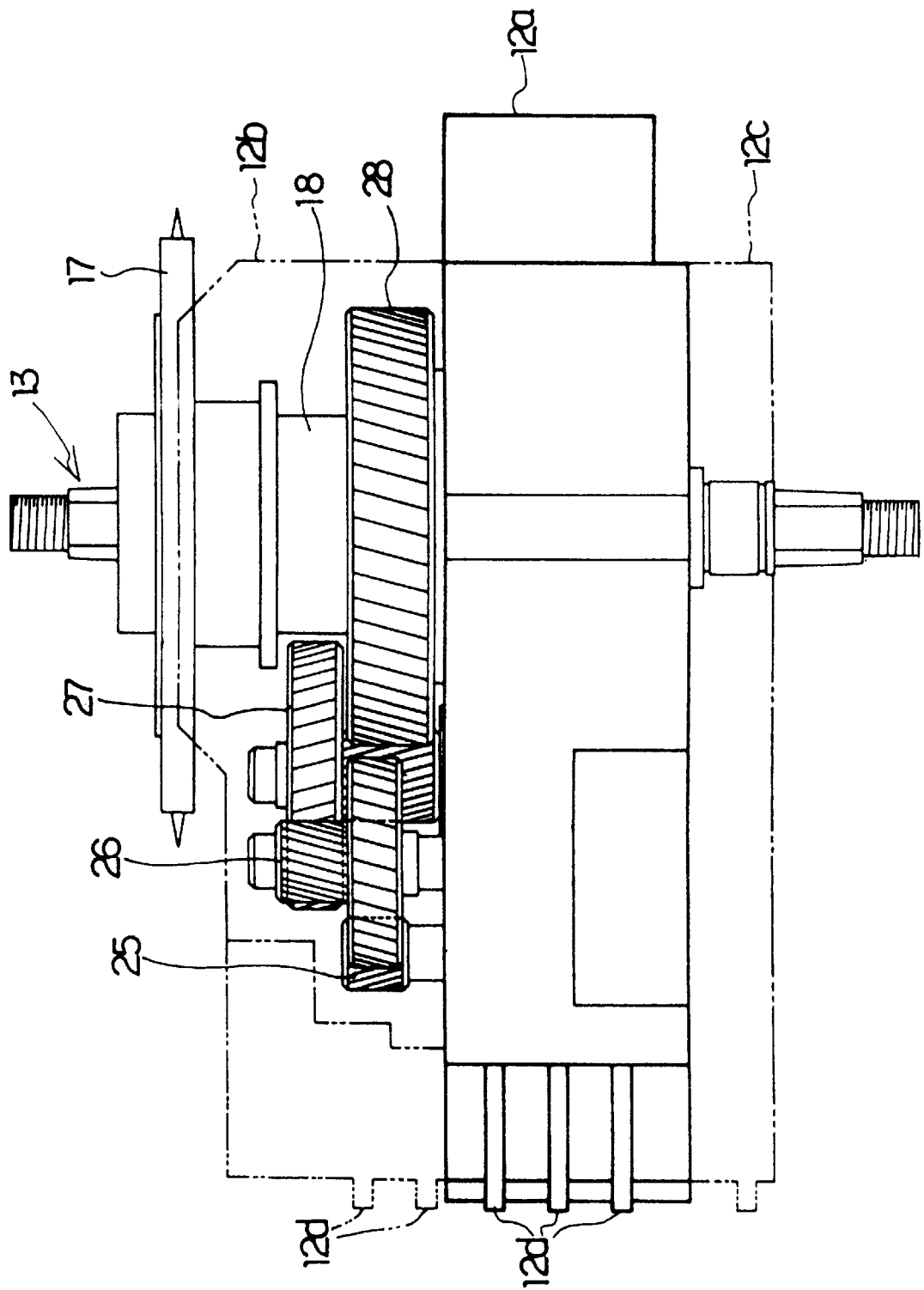
FIG. 14 is a plan view showing the power unit of the embodiment with its case on both sides removed.
Figure 15:
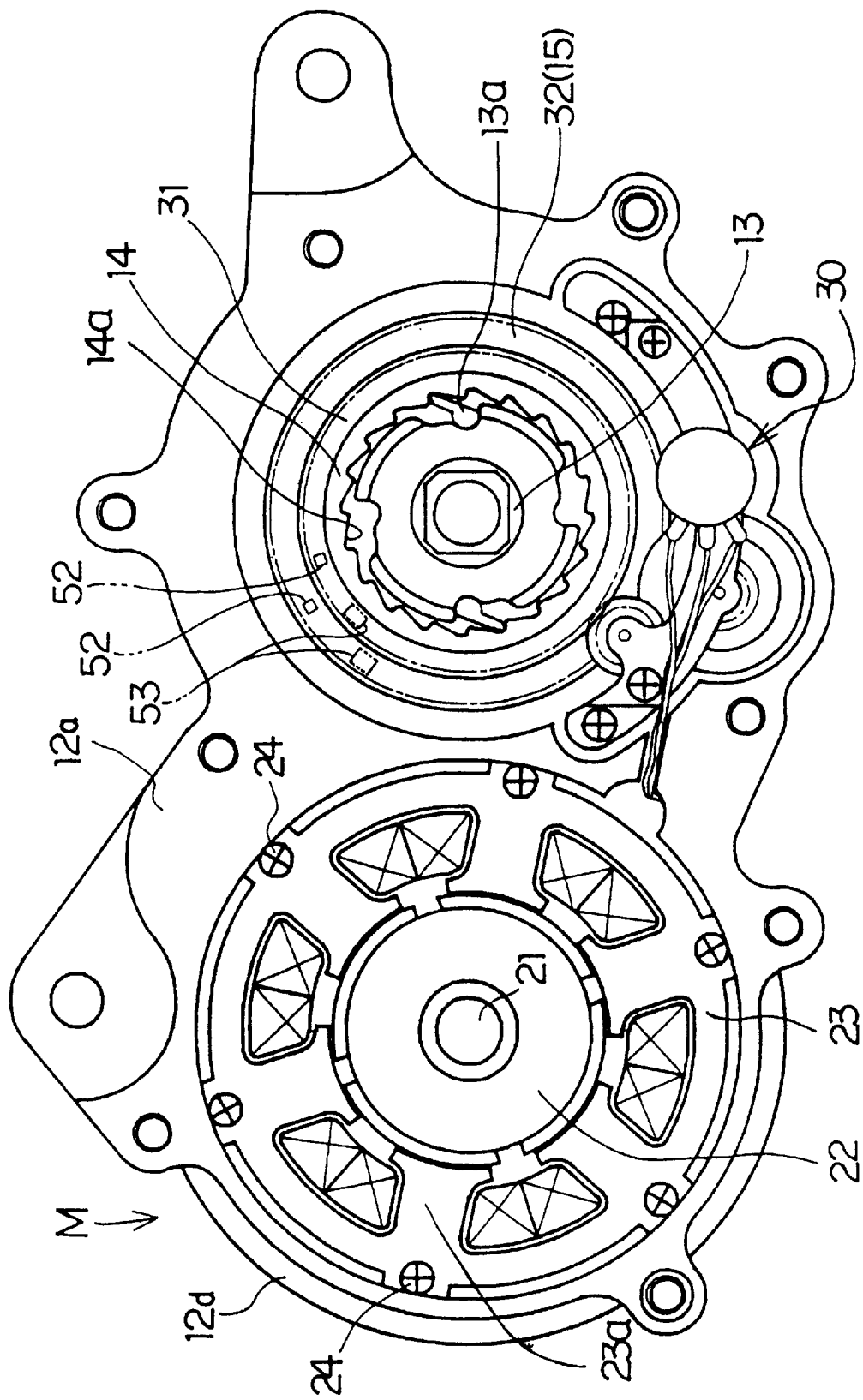
FIG. 15 is a front view showing the power unit of the invention with its case partly removed.
Figure 16:
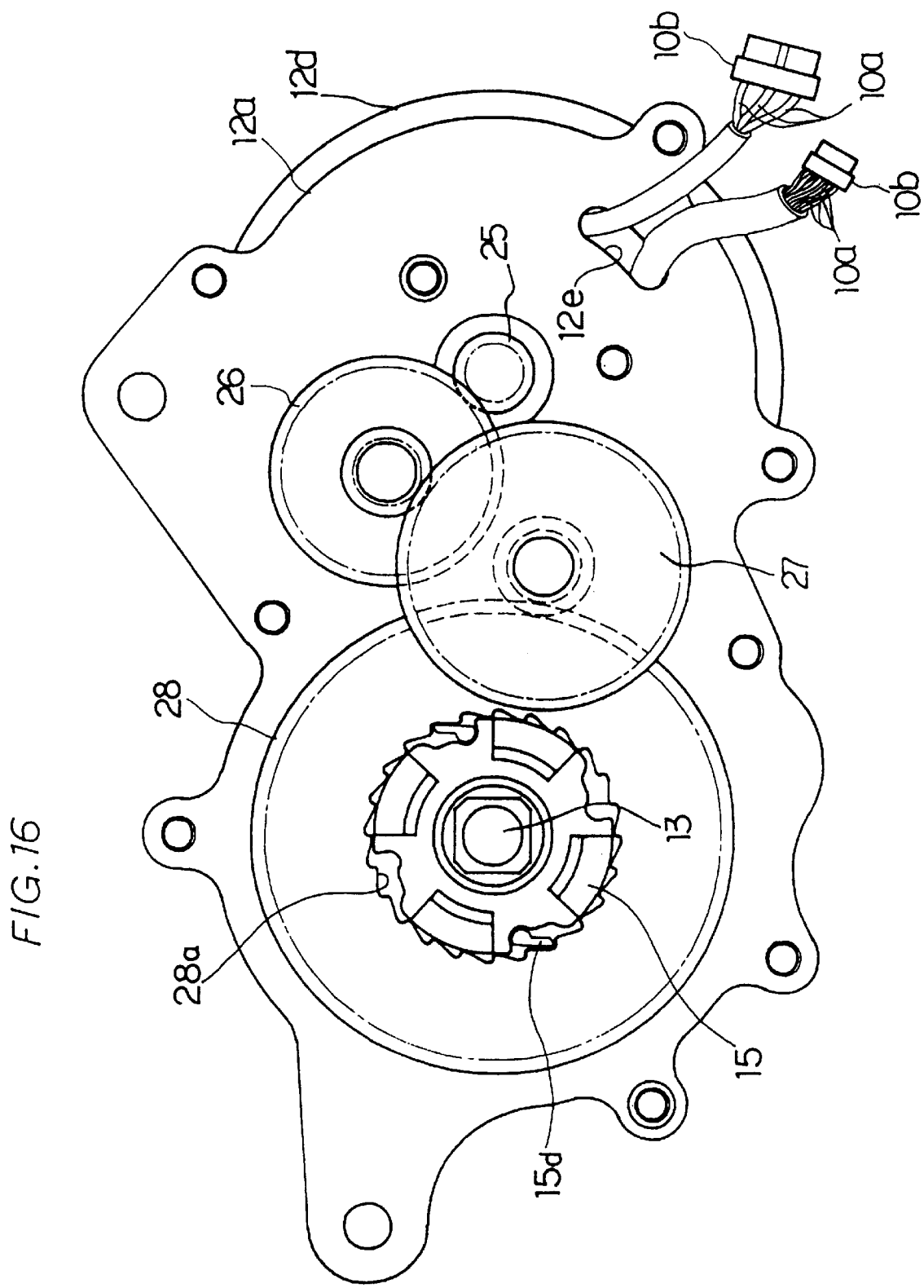
FIG. 16 is a back view showing the power unit of the invention with its case partly removed.

In FIG. 13, reference numeral 10a denotes the power cable of the motor M and various sensor and circuit connection cords (hereinafter simply called the wiring 10a), 10b denotes connectors of the wiring 10, 12e denotes an opening formed on the main case 12a to allow the wiring 10a to pass through, 10c denotes a circuit board which is disposed in the neighborhood of the motor and on the side of the reduction gear mechanism in the case 12 and has the motor drive circuit 20 and appendaged circuit for the sensors mounted. And, reference numeral 12f denotes a case lid which externally seals the circuit board 10c on which various circuits are mounted.

The power unit 11 which is the drive force auxiliary device in this embodiment comprises a human power drive means which transmits the rotation of the crank shaft 13 by the rider pushing the pedals to the driving sprocket which is the output gear 17, an auxiliary drive means which assists the rotation of the crank shaft 13 by driving the motor M, and a torque sensor which decides the addition of power by the auxiliary drive means.

Description will be made of the human power drive means.

The human power drive means is provided with a first rotor 14 which is disposed around the crank shaft 13 to be coaxial with the crank shaft 13, a second rotor 15 which is disposed coaxially on the outer periphery of the crank shaft 13 so as to rotate freely, an elastic member 16 which is mounted between the first rotor 14 and the second rotor 15 to transmit the rotating force of the first rotor to the second rotor, and an output gear 17 to which the rotation force of the second rotor 15 is transmitted. In this embodiment, a cylindrical coupler 18 is disposed between the second rotor 15 and the output gear 17 to connect the second rotor 15 and the output gear 17.

In this embodiment, the coupler 18 is a single independent member, but may be formed into one body with the second rotor 15 or the output gear 17.

And, the first rotor 14 is provided with the first one-way clutch to receive only the rotating force in the forward direction of the crank shaft. This first one-way clutch is provided with a feed pawl 13a which is protruded externally of the crank shaft 13. And, an inner periphery gear 14a having a sloped surface in a reverse rotating direction is notched on the inner periphery of the first rotor 14. Therefore, when the crank shaft 13 rotates in the forward direction, namely in a direction to move the vehicle forward, the feed pawl 13a of the crank shaft 13 engages with the inner periphery gear 14a of the first rotor 14 to transmit the drive force from the crank shaft 13 to the first rotor 14. On the other hand, when the crank shaft 13 is rotated in a direction that the motor for running rotates in a reverse direction, namely in the direction to move the vehicle backwards, the feed pawl 13a moves beyond the sloped surface of the inner periphery gear 14a and does not engage with it, the crank shaft 13 is rotated freely, the drive force for the reverse rotation is not transmitted to the first rotor 14, and the rear wheel 5 is not rotated backwards.

Figure 18:
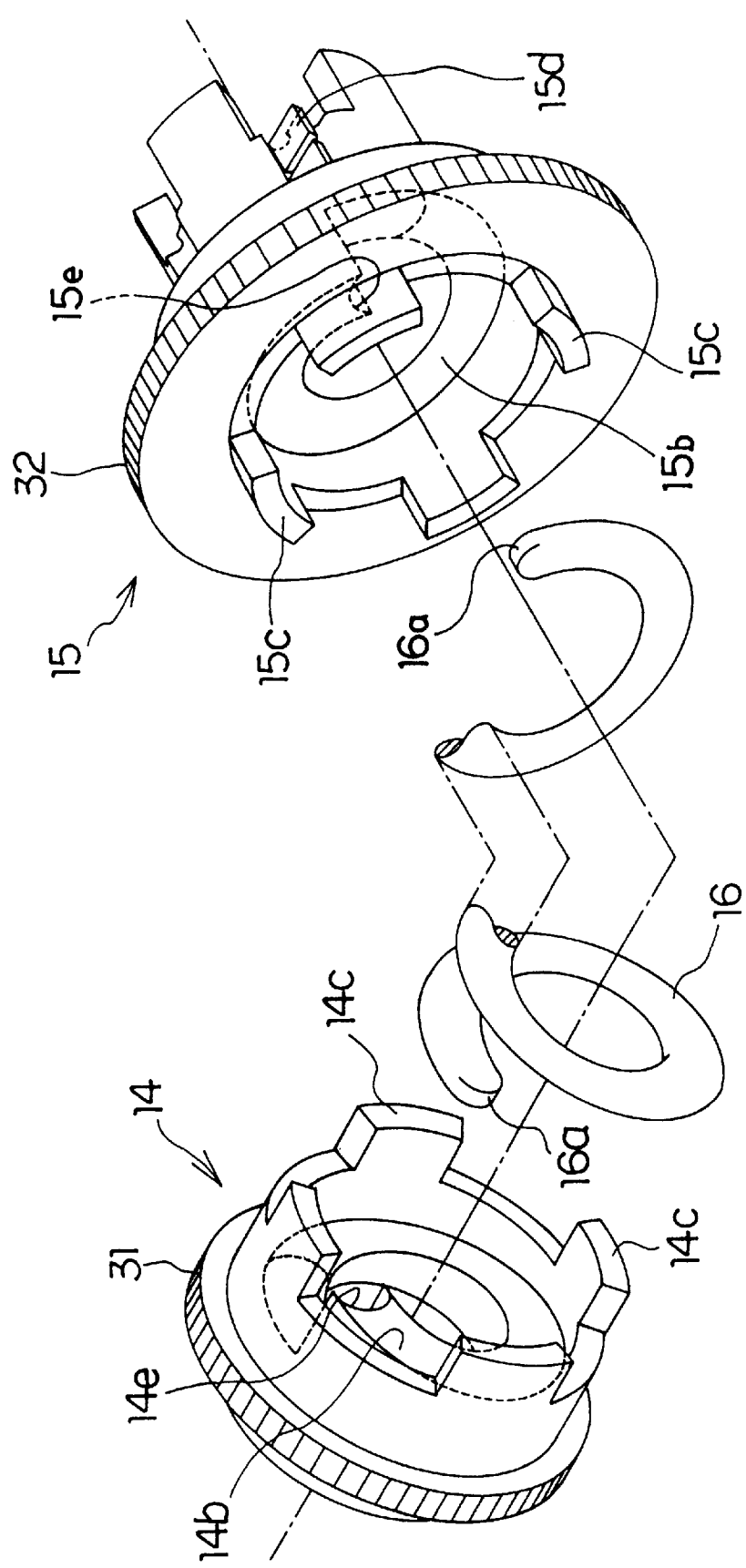
FIG. 18 is a perspective view showing a first rotor, an elastic body and a second rotor used for the power unit of the invention.

As shown in FIG. 18, the first rotor 14 and the second rotor 15 are connected with the elastic member 16, a torsion coil spring in this embodiment, therebetween. This torsion coil spring is formed of a predetermined material into a spiral shape with a predetermined size to provide a prescribed spring constant. Therefore, it is elastically deformed as predetermined according to the human power torque applied to the first rotor 14 to produce a difference in rotation angle between the first and second rotors 14, 15.

Specifically, this coil spring has its either end face 16a radiused, and portions 14e, 15e are formed in a curved shape to receive respective end faces of the first and second rotors 14, 15. Therefore, the end faces 16a of the coil spring can be stably brought into contact with these portions 14e, 15e for receiving the end faces of the coil spring.

In addition, in this embodiment, it is devised to keep the posture of the torsion coil spring when it is elastically deformed so as to prevent it from being deformed exceeding a proper level. Namely, there is disposed a member which retains the posture of the coil spring so as to have an ideal deformation and prevents it from being deformed exceeding a proper level when the torsion coil spring is elastically deformed by the force exerted. In this embodiment, the deformation of the coil spring is restricted by spiral grooves 14b, 15b formed on the inner walls of the first and second rotors 14, 15, the inner peripheries of protrusions 14c, 15c to be described afterward, and the outer periphery of the crank shaft 13. Specifically, the spiral grooves 14b, 15b corresponding to the torsion coil spring are formed on the inner end faces in the axial direction of the first rotor 14 and the second rotor 15; when the torsion coil spring or the elastic member 16 is elastically deformed, deformation in the axial direction is restricted by its entire side contacting to the spiral grooves 14b, 15b, and outward deformation is restricted to appropriate deformation by the outer periphery of the elastic body 16 which comes in contact with the inner peripheries of the protrusions 14c, 15c, and inward deformation is restricted to appropriate deformation by the inner part of the elastic member which comes into contact with the outer periphery of the crank shaft 13.

Therefore, at the time of transmitting the manpower drive force to be described afterward, this torsion coil spring is elastically deformed to transmit the driving force of manpower. since the coil spring is in contact with the spiral grooves 14b, 15b or in contact with the inner peripheries of the protrusions 14c, 15c or in contact with the outer periphery of the crank shaft 13, it is prevented from falling in the axial direction or being deformed in an odd shape and held in a good balanced spiral shape, thereby securing a prescribed spring constant.

Figure 17:
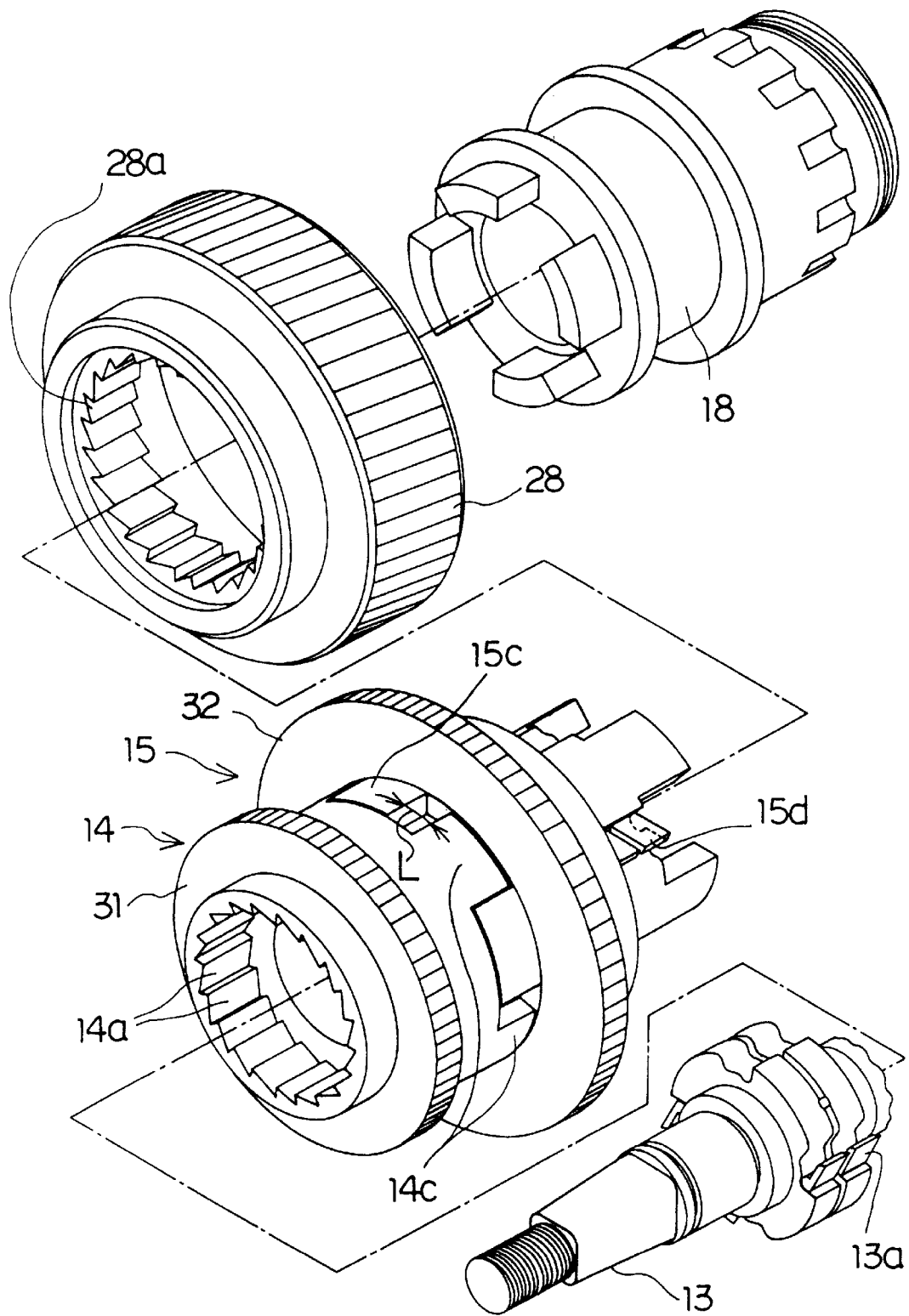
FIG. 17 is an exploded perspective view showing the major members for transmitting a drive force used for the power unit of the invention.

And, as shown in FIG. 17, the protrusions 14c, 15c are circularly disposed at prescribed intervals to oppose mutually on the first and second rotors 14, 15 to secure a prescribed clearance L when a leg power is small and the elastic body 16 is not deformed. Thus, it is designed that if an excess driving force is applied by manpower or the like, the side faces of the protrusions 14c, 15c come in contact mutually, and the first rotor 14 is directly connected with the second rotor 15 in order to prevent the torsion coil spring from being broken.

This embodiment is configured to transmit the manpower drive force by pushing the end face of one torsion coil spring, namely by elastically deforming to reduce a spiral route angle like a lead angle from one end to the other end of the coil spring, but may be configured to transmit by pulling the end face to elastically deform so as to increase the route angle. Besides, the elastic member 16 is not limited to the torsion coil spring but may be any type if it can produce torque corresponding to the rotation angle.

And, in this embodiment, the maximum torsion angle of the torsion spring is determined to be 20 degrees or below, preferably 10 degrees or below so that the rider does not have an unusual feeling.

Thus, in response to the driving torque applied to the first rotor 14, the torsion coil spring is elastically deformed according to its spring constant to transmit the driving force to the second rotor 15. As a result, according to the torque, the turning angles of both rotors 14, 15 which have a differential motion are detected by a torque sensor 30 to be described afterward to detect manpower torque or leg power. First and second rotor members 31, 32 having a different diameter are fixed onto the outer peripheries of the first and second rotors 14, 15 respectively and engaged with input gears 41, 42 of the torque sensor 30.

In this embodiment, the first and second rotor members 31, 32 are gears having teeth on their outer peripheries as shown in the drawings. But, these first and second rotor members 31, 32 are not limited to the gear but may be any member which can transmit desired rotation, such as a roller which can transmit a rotating force.

Description will be made of the auxiliary drive means.

The auxiliary drive means comprises the motor M, a reduction gear train for reducing the driving force of the motor, and a third rotor 28 which is coaxially disposed to freely rotate on the outer periphery of the crank shaft 13 and has its outer periphery teeth engaged with a final gear of the reduction gears and a second one-way crutch disposed on the inner periphery to transmit only the turning force in the forward direction of the final gear to the second rotor 15.

This motor M is a common brushless DC motor and its output is controlled by the motor drive circuit which controls the flow of current.

Specifically, this motor M is a general brushless DC motor which is excellent in durability and reliability and comprises a cylindrical rotor core 22 and a stator core 23 which is disposed around the outer periphery of the rotor core 22 which are accommodated in a housing formed in the case 12a. And, permanent magnets magnetized to N or S pole are alternately disposed along the outer periphery of the cylindrical rotor core 22, and the rotor 22 itself is connected to a motor shaft 21, which is rotatably supported by the case 12a, by means of a key. Besides, the stator core 23 disposed around the rotor 22 is directly connected to the case and has three-phase exciting coils U, V, W. Specifically, the stator core 23 is radially disposed around the outer periphery of a pole 23a of the stator core 23 and fixed deep in the case by bolts 24 parallel to the motor shaft 21.

And, the motor M is driven to rotate by detecting the rotating position of the rotor 22 and switching to the exciting coils of respective phases to control the flow of current.

In this embodiment, the rotor's rotating position is detected by a non-contact type magnetic detecting method. Specifically, a plurality of magnetic detecting elements (not shown) are disposed in the neighborhood of the outer periphery of the rotor 22; these magnetic detecting elements are three linear-type Hall elements X, Y, Z. According to the detection signals from these Hall elements, the rotating position of the rotor core 22 is detected. And, these Hall elements X, Y, Z are connected in series so as to reduce a wiring cost and a trouble of wiring, and the Hall elements X, Y, Z are driven by a single supply current without separately supplying drive currents.

Thus, the rotating position of the rotor core 22 is detected by these magnetic detecting elements, switching to predetermined exciting coils U, V, W corresponding to the rotating position and the flow of a current is made by the motor drive circuit 20 to excite the exciting coils U, V, W positioned ahead or behind the rotating direction of the rotor core 22, and electromagnetic attraction and repulsion forces are acted on the magnets of the rotor core 22 to give a rotation force to the rotor core 22. Thus, the rotor core 22 keeps its continuous rotation, and its rotation force as the drive force is taken out of the motor M by the motor shaft 21 to which the rotor core 22 is fixed.

And, the motor rotation drive force output from the motor shaft 21 of the motor M is input into the reduction gear train and decreased to a predetermined level by the reduction gear train.

Specifically, the reduction gear train comprises a first gear unit 25 fixed onto the motor shaft 21 of the motor M, and second and third gear units 26, 27 which are sequentially engaged with the first gear unit; these second and third gear units 26, 27 are formed of two-stage small-diameter and large-diameter gears into one body, and the gears 25, 26, 27 including the third rotor 28 are helical gears. Besides, this reduction gear train is configured so that the small-diameter helical gear is engaged with and driven by the large-diameter helical gear, so as to deal with a high-speed rotation and to obtain a prescribed reduction gear ratio.

And, the third rotor 28 is engaged with the third gear unit 27 of the reduction gear train and disposed on the outer periphery of the second rotor 15. The third rotor 28 and the second rotor 15 are connected via the second one-way clutch mechanism to add the motor assisting force to the manpower transmission route that the detection of the manpower torque was completed.

Besides, the turning force in the forward direction of the second rotor 15 of the manpower drive system is prevented from being transmitted to the third rotor 28 on the side of the motor system by the second one-way crutch mechanism.

Specifically, the second one-way clutch comprises inner periphery teeth 28a having a sloped surface in the forward direction formed on the inner periphery of the third rotor 28 and feed pawl 15d which are formed on the outer periphery of the second rotor 15 to protrude externally with the leading ends directed in the reverse rotating direction. The inner periphery teeth 28a are engaged with the feed pawl 15d on the outer periphery of the second rotor 15 only when the third rotor 28 is rotated in the forward direction.

Therefore, when the crank shaft 13 is rotated in the forward direction by the manpower and the motor driving is stopped according to the running speed conditions and the like, the third rotor 28 is freely rotated against the second rotor by the second one-way clutch mechanism, so that the transmission of the driving force by manpower to the motor drive system, namely changing to human power loading, can be prevented.

Since the auxiliary power drive means is configured as described above, output obtained from the motor M can be converted into appropriate torque/rpm by a mechanical reduction mechanism, and this driving force can be transmitted efficiently to the combining mechanism to assist the manpower drive force to drive to rotate the rear wheel 5.

Now, description will be made of the transmission operation of the human power drive force in the power unit of such electric bicycle. Then, description will be made of the transmission operation of the motor drive force for assisting the human power drive force.

When the pedals 7 are pushed in the forward direction by the user, the crank shaft 13 is rotated in the forward direction. The rotating driving force of manpower is transmitted to the first rotor 14 through a ratchet (first one-way crutch) disposed between the crank shaft 13 and the first rotor 14, and the first rotor 14 is rotated forward. At this time, if the pedals 7 are pushed in the reverse direction by the user, the crank shaft 13 is rotated in the reverse direction but the feed pawl 13a of the crank shaft 13 are not engaged with the first rotor 14. Thus, the first rotor 14 is not driven to rotate.

When the first rotor 14 is rotated, the second rotor 15 is rotated via the torsion coil spring (elastic body 16). At this time, a difference in advance delayed due to the elastic torsion of the torsion spring for the torque produced between both rotors is detected by the torque sensor 30, and the auxiliary driving force of the motor is determined based on the leg power and the running speed.

Besides, the second rotor 15 rotates the connected coupler 18 to rotate the motive sprocket (output gear 17) which is connected to the coupler 18. At this time, since the third rotor 28 disposed on the outer periphery of the second rotor 15 does not have the ratchet (second on-way clutch) between them engaged, the driving force of manpower is not transmitted to the motor drive system through the third rotor 28.

Finally, the rear wheel 5 is rotated by the drive chain 9 connected to the motive sprocket (output gear 17), so that the electric bicycle goes forwards.

And, when the manpower is applied as described above and the leg power and the running speed are within a prescribed auxiliary range, a prescribed command is outputted from the control based on the running speed and the driving force of manpower to operate the motor M, thereby supporting the manpower.

Specifically, the motor M is driven, the driving force of the motor is transmitted to the third rotor 28 via the reduction gear train, through which the driving force is converted into an appropriate number of revolutions/torque. And, the inner periphery teeth 28a of the third rotor 28 are engaged with the feed pawl 15d of the second rotor 15, the driving force of the motor with its speed lowered is transmitted to the second rotor 15, and the driving force of the motor is added to supplement the driving force of manpower. And, this state is kept until the manpower driving is stopped or the running speed exceeds a prescribed range.

Description will be made of the torque sensor 30 with reference to the drawings.

Figure 20:
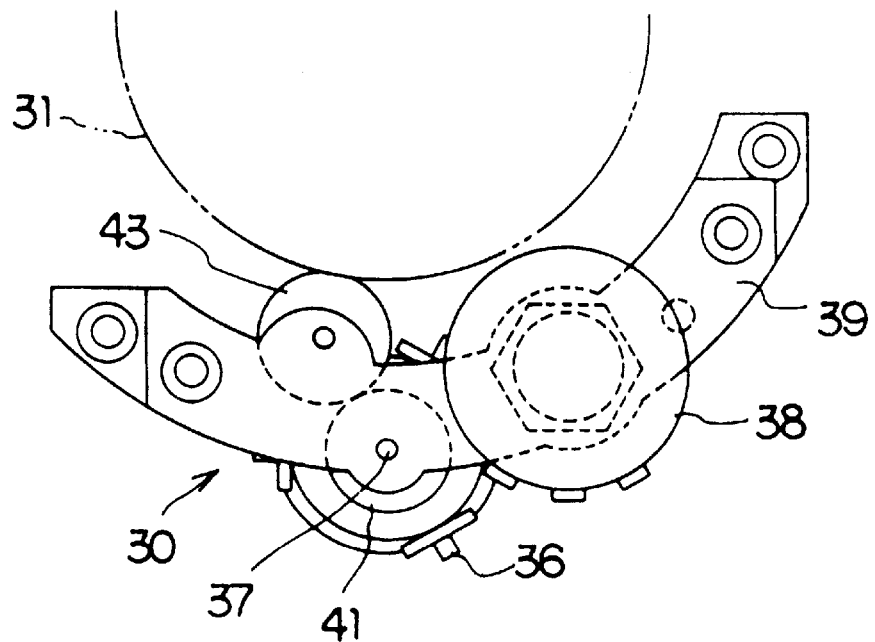
FIG. 20 is a front view showing a torque sensor used for the power unit of the embodiment.
Figure 21:
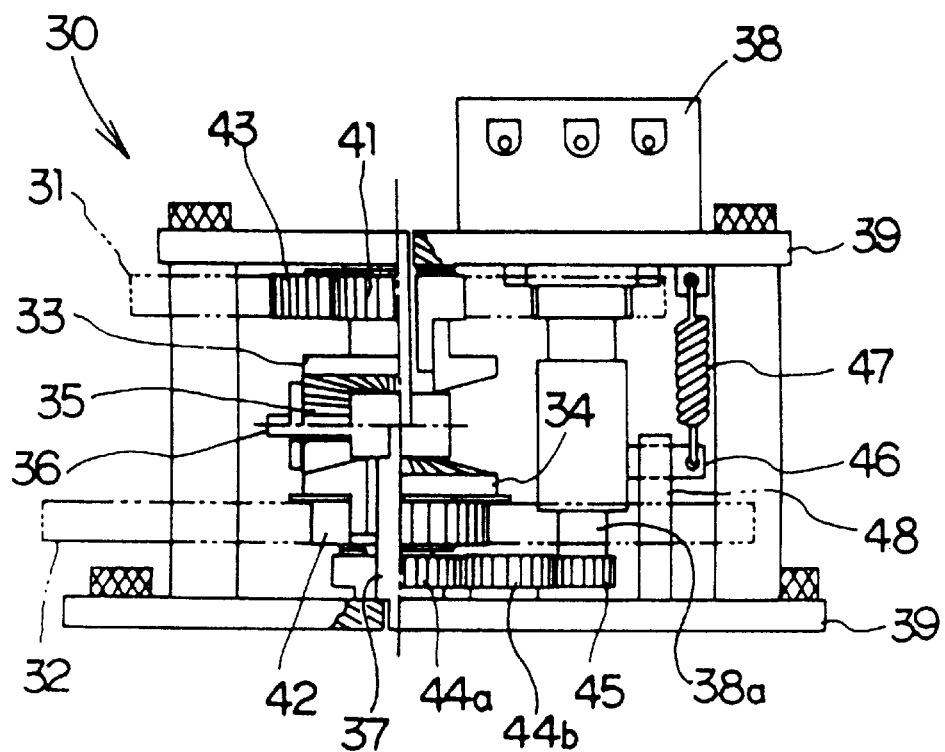
FIG. 21 is a bottom view showing a torque sensor used for the power unit of the embodiment.
Figure 22:
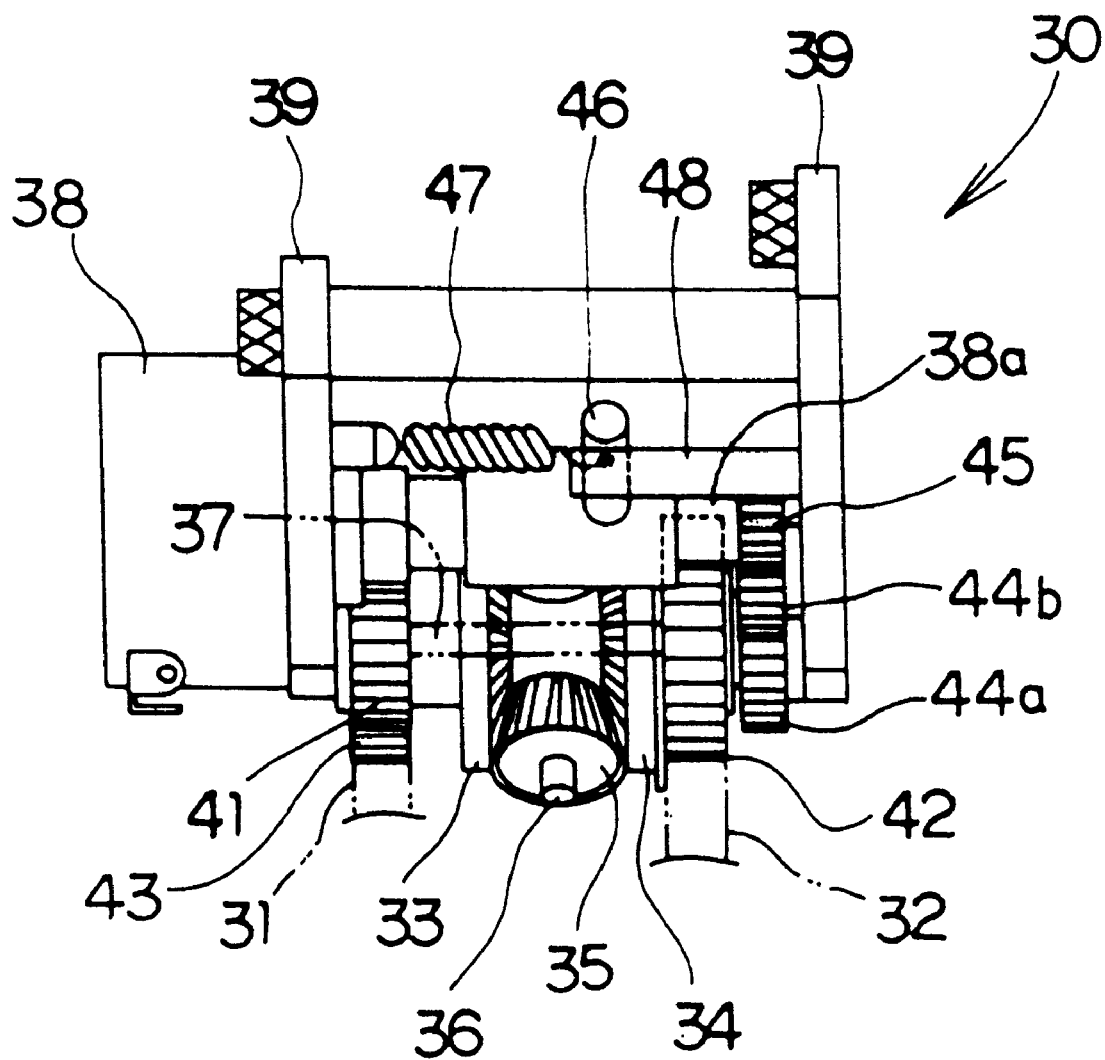
FIG. 22 is a right side view showing a torque sensor used for the power unit of the embodiment.

In this embodiment, the torque sensor 30 judges manpower torque in view of a difference in rotation between the first and second rotors 14, 15 which are mutually connected via the torsion coil spring. As shown in FIG. 20 to FIG. 22, the torque sensor 30 is basically provided with a differential gear mechanism, the first and second rotors 14, 15 are interconnected with two input shafts of the differential gear mechanism, and a third shaft (output shaft 37) of the differential gear mechanism is interconnected with a sensor. As specified in the JIS (Japanese Industrial Standards), the differential gear mechanism is "a gearing in that when two input shafts are driven, the third output shaft is simultaneously driven by these two shafts, and a planetary gearing is used. And, it is often said that to attain differential motion, a sun gear and a planetary gear are used as a bevel gear". And, in this embodiment, a bevel gear is used for the differential gear mechanism as described afterward.

Specifically, the torque sensor 30 comprises the first rotor member 31 (a gear in the embodiment) fixed to the outer periphery of the first rotor 14, the second rotor member 32 (a gear in the embodiment) fixed to the outer periphery of the second rotor 15, a pair of bevel gears 33, 34 which is interconnected with the first and second rotor members 31, 32 respectively, a plurality of bevel gears 35, 35 which are engaged between the above pair of bevel gears, an output shaft 37 which is intersected at right angles with a supporting shaft, and a rotation angle sensor 38 connected to the output shaft 37.

In this embodiment, the output shaft 37, which is the third shaft of the differential gear mechanism, is formed in the shape of an arc and supported between frames 39, 39 which are disposed in parallel with each other, the first input gear 41 is rotatably fitted with play to the output shaft 37, and the supporting shaft 36 is rotated together with the output shaft 37.

The first and second input gears 41, 42 have the bevel gears 33, 34 fixed respectively, and the bevel gears 35, 35 engaged between the bevel gears 33, 34 as described above.

And, the first and second input gears 41, 42 are interconnected with the first and second rotor members 31, 32 which have a different diameter. And, the second input gear 42 is directly engaged with the second rotor member 32, while the first input gear 41 is engaged with the first rotor member 31 via a reversing gear 43 having a small diameter. This configuration is required because it is necessary to rotate the bevel gears 33, 34 at the same rotating speed in a different direction. Specifically, the reversing gear 43 is disposed to reverse either of the rotating directions of the turning forces distributed from the first and second rotor members 31, 32 which are rotated in the same direction, and a space for disposing the reverse gear is secured by giving a different diameter to the first and second rotor members 31, 32.

In addition, the first and second rotor members 31, 32 having a large diameter operate to drive the first and second input gears 41, 42 and the reversing gear 43 having a small diameter, so that the rotating speed of the first and second rotor members 31, 32 are increased and given to the first and second input gears 41, 42. Besides, the output shaft 37 is connected with a detecting gear 45 of the rotation angle sensor 38 having a diameter smaller than that of the gear 44b with gears 44a, 44b disposed in descending order in diameter between them to increase the rotation angle of the output shaft 37 and to enter the rotation angle sensor 38.

Thus, since a mechanism for mechanically increasing the rotation is disposed in the space between the first and second rotors 14, 15 and the differential gear mechanism or in the space between the differential gear mechanism and the rotation angle sensor 38 or in both spaces as in this embodiment, an electrical signal with higher precision can be obtained when the detected change is converted into an electrical signal by the sensor because an absolute quantity of change to be entered into the sensor becomes large. Specifically, the first rotor member 31 of the first rotor 14 having a large diameter operates to drive the first input gear 41 having a small diameter via a middle gear 43 having a small diameter, and in the same manner, the first rotor member 32 of the second rotor 15 having a large diameter drives to rotate the second input gear 42, thereby increasing the rotating speed of the motive side to enter the differential gear mechanism. Then, the rotation angle indicating a difference in rotating speed between them which is converted and output by the differential gear mechanism is multiplied by driving the gear 45 by the gears 44a, 44b of the differential gear mechanism.

In connection with a difference in advance between the first rotor 14 and the second rotor 15 according to the torque produced by the torsion coil spring owing to the manpower, since the engaged and interconnected bevel gear 35 is turned and moved around the output shaft 37, the output shaft 37 is turned for a turning angle corresponding to the difference in advance. Namely, when the first rotor 14 and the second rotor 15 have the same rotating speed, the bevel gear 35 continues to rotate with the output shaft kept at the initial angle position. But, when they have a different rotating speed, it can be assumed that one of them is stopped relatively, while the other is rotated, and according to this difference in rotation, the bevel gear 35 is turned and moved around the output shaft 37 from the initial state of rotation at the same speed, and the supporting shaft 36 of the bevel gear 35 is rotated for an angle corresponding to the difference in rotation. And, the output shaft 37 to which the supporting shaft 36 is fixed at right angles becomes a rotation angle corresponding to the difference in rotation in the same way. And, this rotation angle is increased and transmitted to the gear 45 of the rotation angle sensor 38 through the gear 44a fixed to the output shaft 37 and the gear 44b connected thereto, and this increased human power torque-indicating angle is detected by the rotation angle sensor 38, namely an analog voltage proportional to this rotation angle is obtained, thereby enabling to accurately calculate the drive torque owing to the human power drive force.

It is to be understood that the differential gear mechanism may use a planetary gear instead of the bevel gear.

As shown in FIG. 21 and FIG. 22, an arm member 46 is protruded sideward from the middle of the detecting shaft 38a of the rotation angle sensor 38. The arm member 46 is connected to one end of an energizing spring 47 whose other end is fixed to the frame, and a stopper member 48 is disposed in contact with the arm member 46. Therefore, the detecting shaft 38 of the rotation angle sensor 38 is always kept energized in one direction under a predetermined pre-pressure by the energizing spring 47, and, in case of no input, it can be stopped at a predetermined rotation position by the stopper member 48. As a result, the zero point compensation of the rotation angle sensor 38 can be secured with reliability and the respective gears can be prevented from being loosened. Thus, the manpower torque can be measured with sufficient precision.

Figure 24:
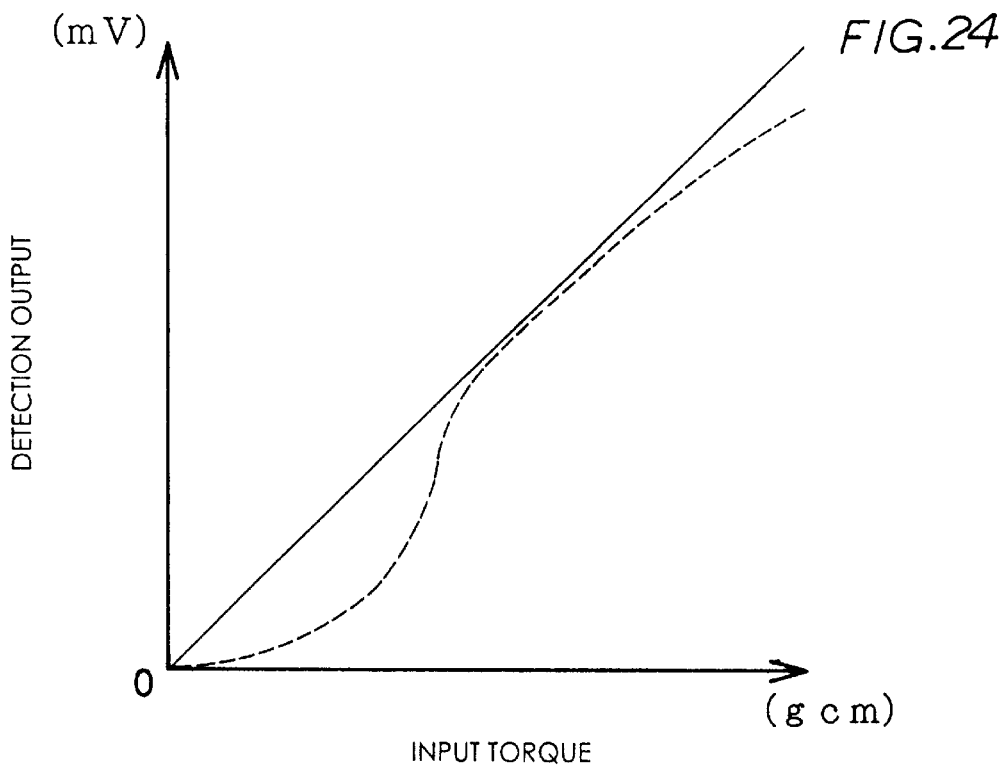
FIG. 24 is a graph showing the relation between human power torque entered the torque sensor of the embodiment and output detected.

Specifically, as indicated by the solid line in FIG. 24, it is desired that detection output to be obtained is directly proportional to the torque entered the torque sensor from the first and second rotor members 31, 32. But, in practice, it does not become a directly proportional linear line as indicated by the broken line in the drawing, and a dead zone of detection where accurate output is not obtained occurs. This is especially remarkable when low torque is entered, such as when running at a low speed. In such a case, torque cannot be detected accurately, resulting in adversely affecting on the control of running. And, this tendency might increase owing to a complex combination of gears in the differential gear mechanism or the high operation torque of the rotation angle sensor 38.

In view of the above, to decrease the dead zone, the detection shaft 38a of the rotation angle sensor 38 is pushed by a pre-pressure predetermined by the energizing spring 47. Specifically, this pre-pressure value is set to a level at least greater than the friction torque totaled from the differential gear mechanism and not giving an excess load to them. (For example, it is set to be 80% or more of a total of friction torque and 400% or less of the friction torque of the differential gear mechanism, preferably 200% or below.)

Figure 25:
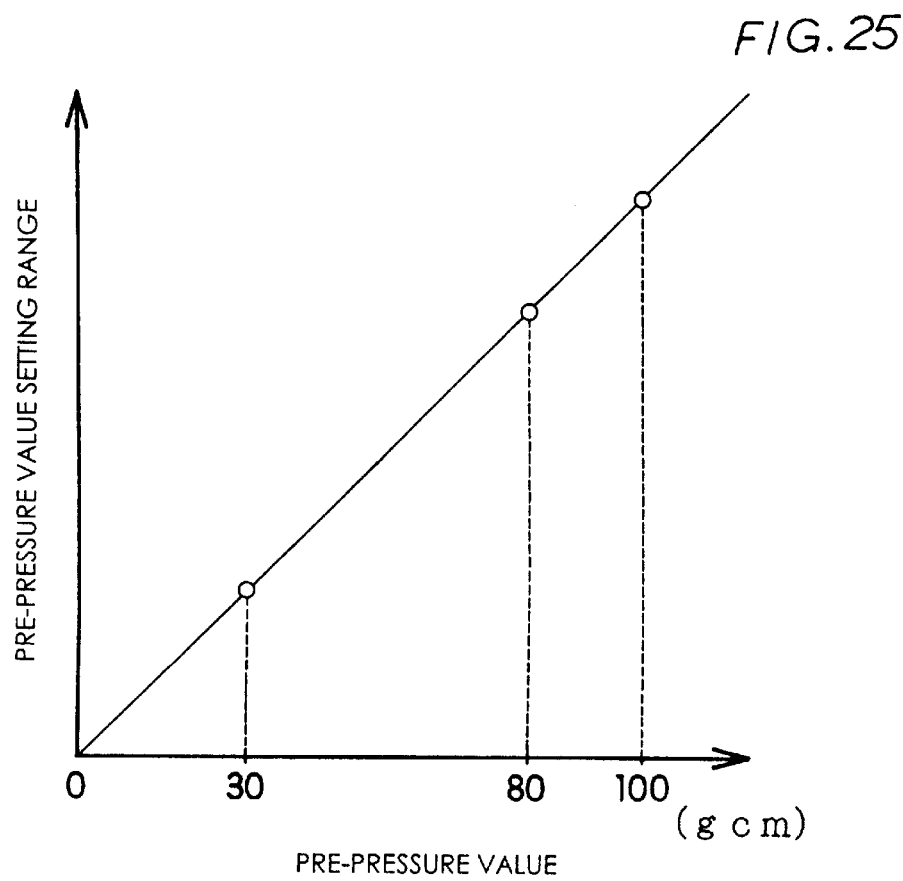
FIG. 25 is a graph illustrating a pre-load value for the torque sensor of the embodiment.

In this embodiment, a total of the friction torque by the respective gears of the differential gear mechanism is 28 gcm, and the rotation torque of the rotation angle sensor 38 is 8 gcm. And, as shown in FIG. 25, the pre-pressure value of this energizing spring is set to a range of at least 30 gcm to 100 gcm. This prepressure value is preferably in a range of 30 gcm to 80 gcm.

As described above, this embodiment can decrease the dead zone, detect the low human power torque when running at a low speed and improve the detection accuracy. Therefore, control performance can be improved.

Now, a second embodiment of the torque sensor will be described.

As a method for detecting a rotation angle according to the final human power torque, the torque sensor in this embodiment is formed of a magnetic type sensor using a non-contact type magnetic detecting element instead of the contact type sensor using a potentiometer, to make its life long. Specifically, a magnetic detecting element which detects a magnetic change is used and it is configured that a quantity of magnetic flux changes according to the rotation angle, and the quantity of change in magnetic flux corresponding to the rotation angle is detected by the magnetic detecting element, to determine the human power torque corresponding to the rotation angle. And, the above-described rotation angle sensor is used basically.

Figure 26:
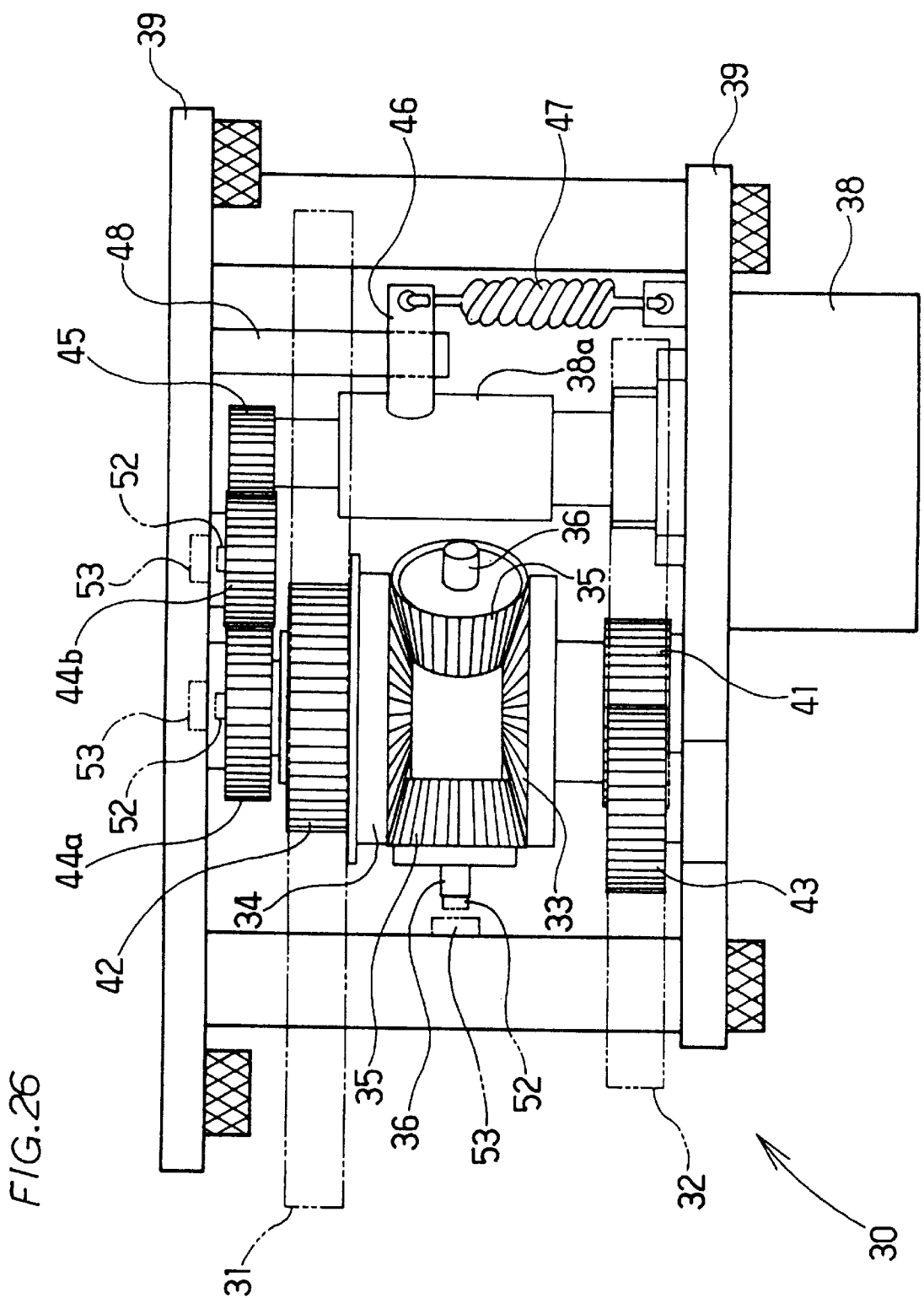
FIG. 26 is a plan view of a torque sensor showing where a magnet and a magnetic detecting element are disposed according to an embodiment of the torque sensor of the invention.

As shown in FIG. 21 or 26, the rotation angle sensor in this embodiment is configured by embedding to fix a single magnet 52 to either the outer periphery on the side of the gears 44a, 44b connected to the output shaft 37 of the differential gear mechanism or the leading end of the supporting shaft 36, and fixing a magnetic detecting element 53 to the frame 39 on the outer periphery and in the neighborhood of the gears 44a, 44b or the supporting shaft 36.

This magnet 52 is a samarium cobalt-based magnet having a good temperature property, and a stable quantity of magnetic flux can be obtained from this magnet 52 regardless of a change in atmosphere temperatures.

And, a Hall element is used for the magnetic detecting element 53. Besides, this magnetic detecting element 53 is fixed at a position corresponding to the position of the magnet which is in a state at the initial rotation angle with no entry of human power torque, and in this initial state, an air gap having a predetermined distance is secured between the magnet 52 and the magnetic detecting element 53.

Therefore, when a rotation angle corresponding to human power torque is converted and output by the differential gear mechanism and the interconnected gears 44a, 44b or the supporting shaft 36 is rotated, the magnet 52 which is fixed to the gears 44a, 44b or the supporting shaft 36 is separated from the magnetic detecting element 53 which is fixed to the frame 39 to increase the distance between them, so that a quantity of magnetic flux reaching from the magnet 52 to the magnetic detecting element 53 is decreased. This changed quantity of magnetic flux can be measured by the magnetic detecting element 53 to determine a rotation angle of the gears 44a, 44b or the supporting shaft 36, namely the human power torque.

Figure 27A:
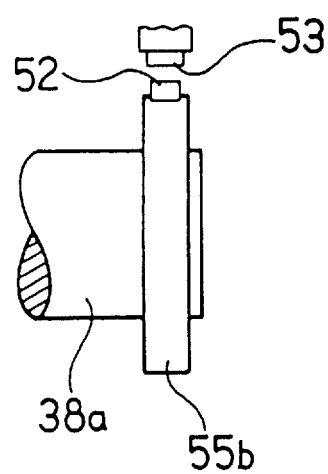
FIG. 27 illustrates another embodiment of the torque sensor according to the embodiment, wherein (a) is a side view, (b) is a front view, and (c) is a schematic perspective view showing a state housed in the case.
Figure 27B:
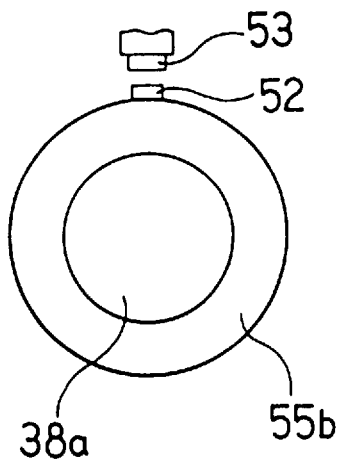
Figure 27C:
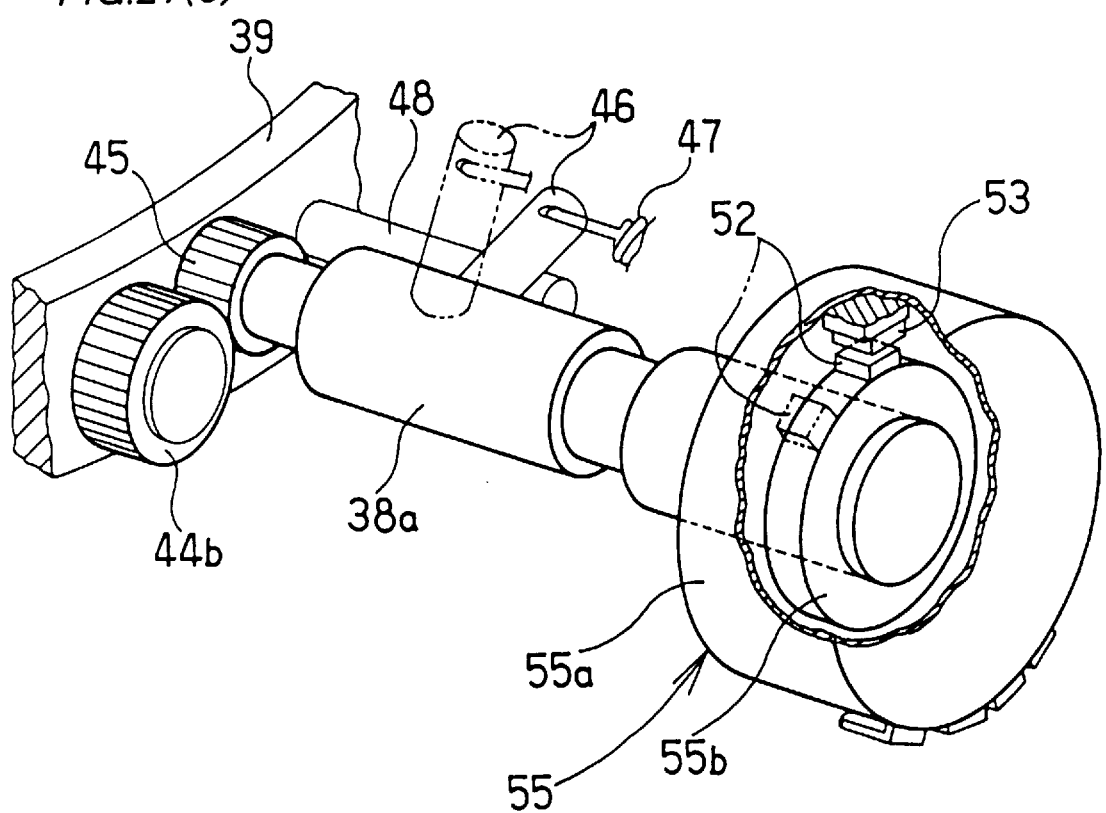

Besides, as shown in FIG. 27(a) to FIG. 27(c), these structures may be put in a case 55a which has substantially the same appearance as a conventional potentiometer to effect magnetic shielding by this case 55a. Thus, there is provided a rotation angle sensor 55 having improved detection accuracy. Specifically, this rotation angle sensor 55 has within the case 55a which is made of a magnetic shielding material a detection disc 55b which is coaxially fixed to the detection shaft 38a, the magnet 52 which is fixed to the outer periphery of the detection disc 55b, and the magnetic detecting element 53 which is fixed on the side of he case 55a and in the neighborhood of the outer periphery corresponding to the rotation angle position of the magnet 52 in the initial state. In this case, effects by magnetic noise from the electric motor can be minimized, and good measuring accuracy can be secured effectively.

Figure 28:
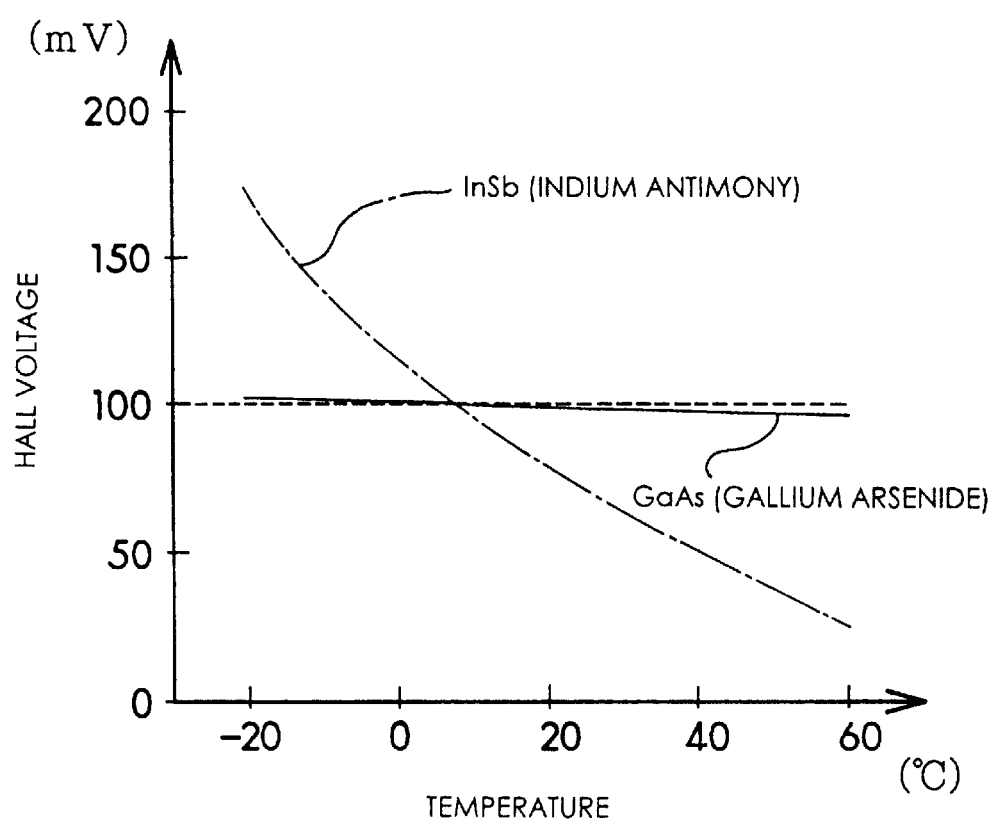
FIG. 28 is a temperature characteristic comparison graph of a Hall element used as the magnetic detecting element of the invention.

In this embodiment, GaAs (gallium arsenide) type having a good temperature property is used as a Hall element. Specifically, it is known that this Hall element has its output voltage characteristic changed according to a temperature where it is used. And, this temperature dependency is variable depending on which Hall element is used. As shown in FIG. 28, where an InSb (indium antimony) type Hall element is driven by a constant current, this Hall constant has a temperature coefficient of −2%/° C. (indicated by a dot-and-dash line in the drawing), while −0.06%/° C. (indicated by the solid line in the drawing) for the GaAs type Hall element.

And, since the detection output is slightly changed depending on a temperature even when the GaAs type Hall element having a good temperature property is used, a temperature compensating circuit is connected in this embodiment to compensate the output voltage of the Hall element, thereby securing the detection accuracy.

Figure 29:
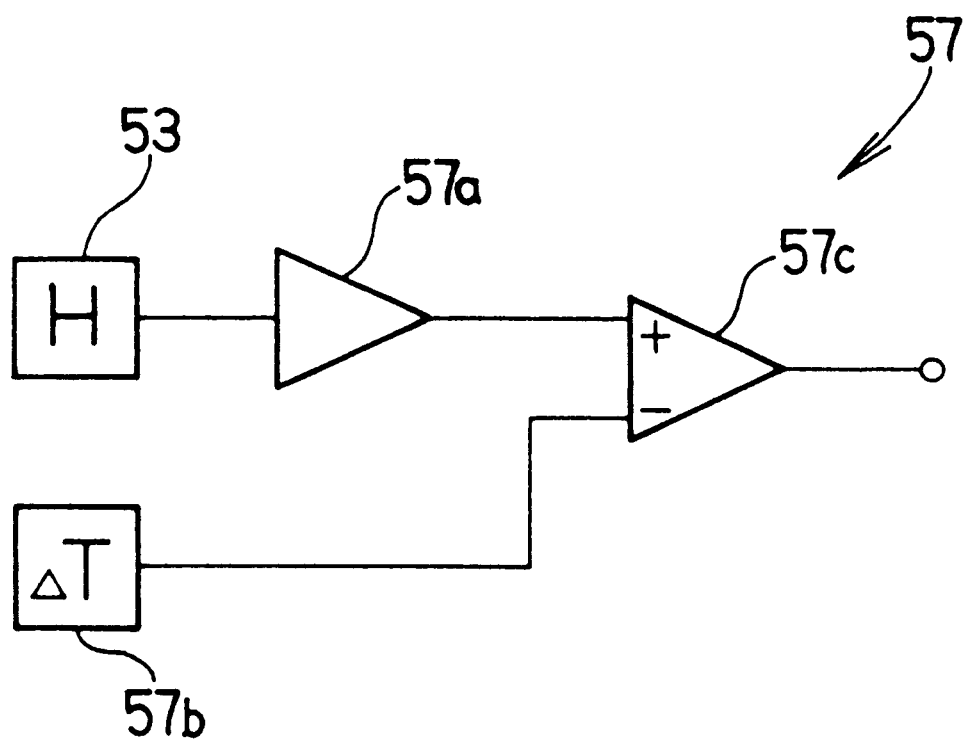
FIG. 29 is a temperature compensating circuit diagram of a Hall element used for the rotation angle sensor of the invention.

Specifically, FIG. 29 shows that a temperature compensating circuit 57 comprises an amplifier 57a to which the output terminal of the Hall element or magnetic detecting element 53 is connected, a temperature compensating element 57b having a property opposite from the temperature property of the Hall element 53, and an op-amp 57c to which their output terminals are connected. The positive terminal on the input side of the op-amp 57c is connected to the amplifier 57a and the negative terminal to the temperature compensating element 57b, and the changed output portion can be corrected according to the temperature coefficient of the above-described Hall element. Therefore, the detection voltage value in excess or short changed according to the temperature coefficient output from the amplifier 57a is subtracted by or added with the output potion by the temperature compensating element 57b, thus an accurate output voltage can be obtained.

A Hall IC may be used as the magnetic detecting element. This Hall IC has a function of detecting a direction of magnetic field by utilizing Hall effect and an amplifier function of amplifying a detection signal mounted into a single IC, and operates to output logically. Specifically, it is generally a detecting element that when N pole is approached to above the Hall IC, output is about 5 (V), when S pole is approached, output is 0 (V), indicating its resistance against an electric noise, and such output can be used to directly drive another IC element. Therefore, to use the Hall IC, it is configured to fix a plurality of magnets 52, 52 at predetermined intervals in the circumferential direction of the rotation detecting disc 55b. And, to measure a rotation angle, the rotation detecting disc 55b rotates according to human power, the respective magnets 52 pass by the Hall IC to obtain a pulsed detection signal from the Hall IC, and counts the pulse signal to determine the rotation angle. Otherwise, a gear train for increasing rotations may be provided on the detecting shaft 38a which rotates the rotation detecting disc 55b to configure so that the rotation detecting disc 55b makes several rotations before reaching the maximum human power torque, and independent magnets pass by the Hall IC for a plurality of times to obtain a pulsed detection signal, thereby decreasing the number of magnets. And, when the Hall IC is used as the magnetic detecting element in this way, by the hysteresis characteristic of the Hall IC itself, a gap distance can be set smaller as compared with the Hall element, and detection accuracy can be improved.

And, since it is sufficient by detecting a quantity of magnetic flux without identifying the magnetic polarity, it can be configured by using another element, e.g., an MR element (magnetic resistance element), utilizing a galvano magnetic effect as the magnetic detecting element.

As described above, since this embodiment does not use the contact type sensor using a potentiometer but the non-contact type magnetic detecting element as the sensor for detecting the rotation angle, the life of the sensor can be made long.

And, a cost can be reduced because a relatively expensive potentiometer is not required.

Besides, when such a structure is accommodated into a magnetic shielding case, a magnetic noise from the motor for travelling can be prevented, so that the reliability of the sensor can be improved.

Now, description will be made of a running speed sensor which utilizes the torque sensor of the driving force auxiliary device and is used for controlling running.

Figure 30:
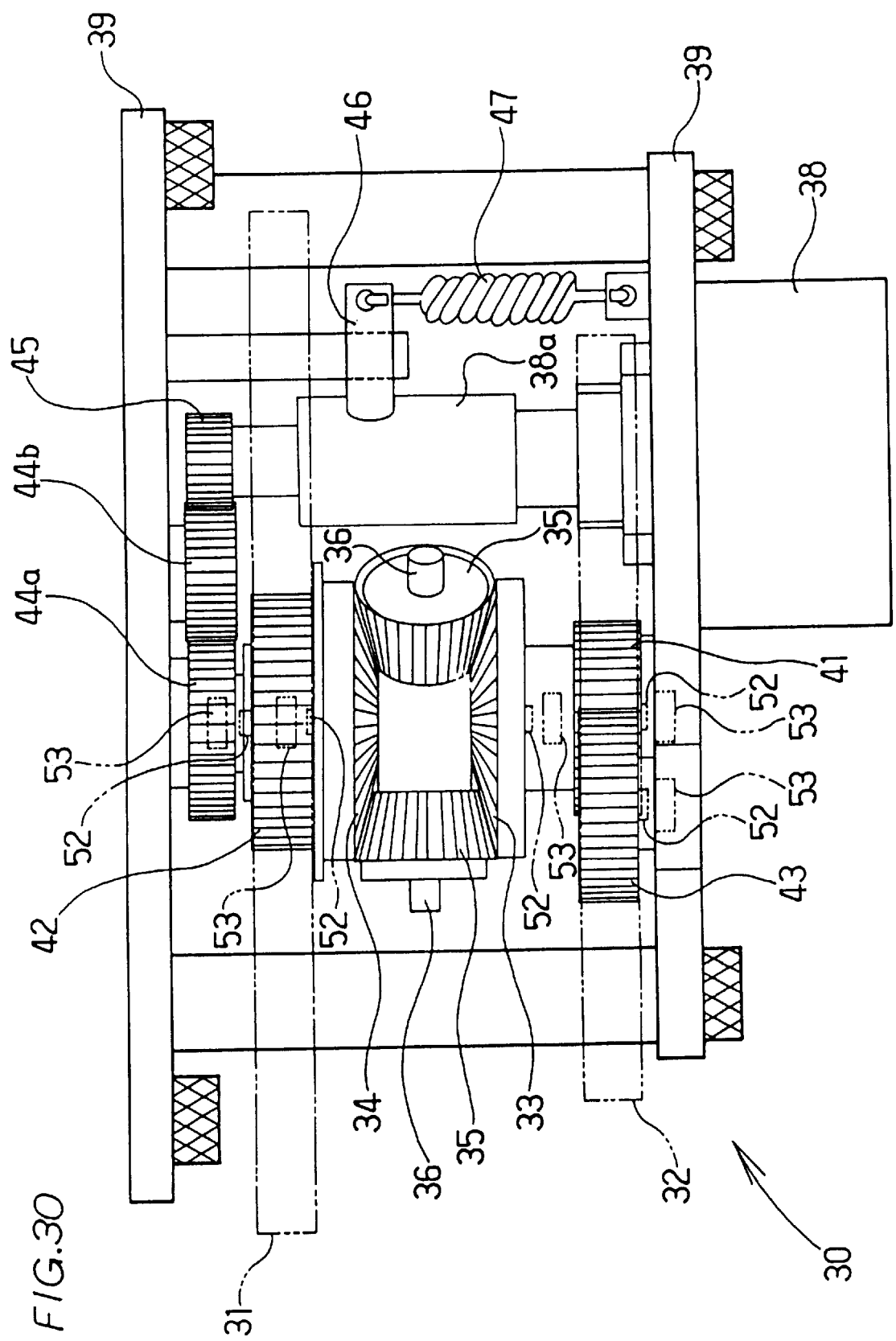
FIG. 30 is a plan view of a torque sensor showing where a magnet and a magnetic detecting element are disposed according to an embodiment of the speed sensor of the invention.

The speed sensor in this embodiment is configured by embedding the magnet 52 on the side and in the neighborhood of the first rotor 14 (first rotor member 31), the second rotor 15 (second rotor member 32) as shown in FIG. 17, or near the periphery of any of the gears 33, 34, 41, 42, 43 on the input side of the torque sensor 30 as shown in FIG. 30, and fixing the magnetic detecting element 53 to a position in the neighborhood of the side corresponding to this magnet 52; the output terminal of this magnetic detecting element 53 is connected to the control circuit.

Figure 31:
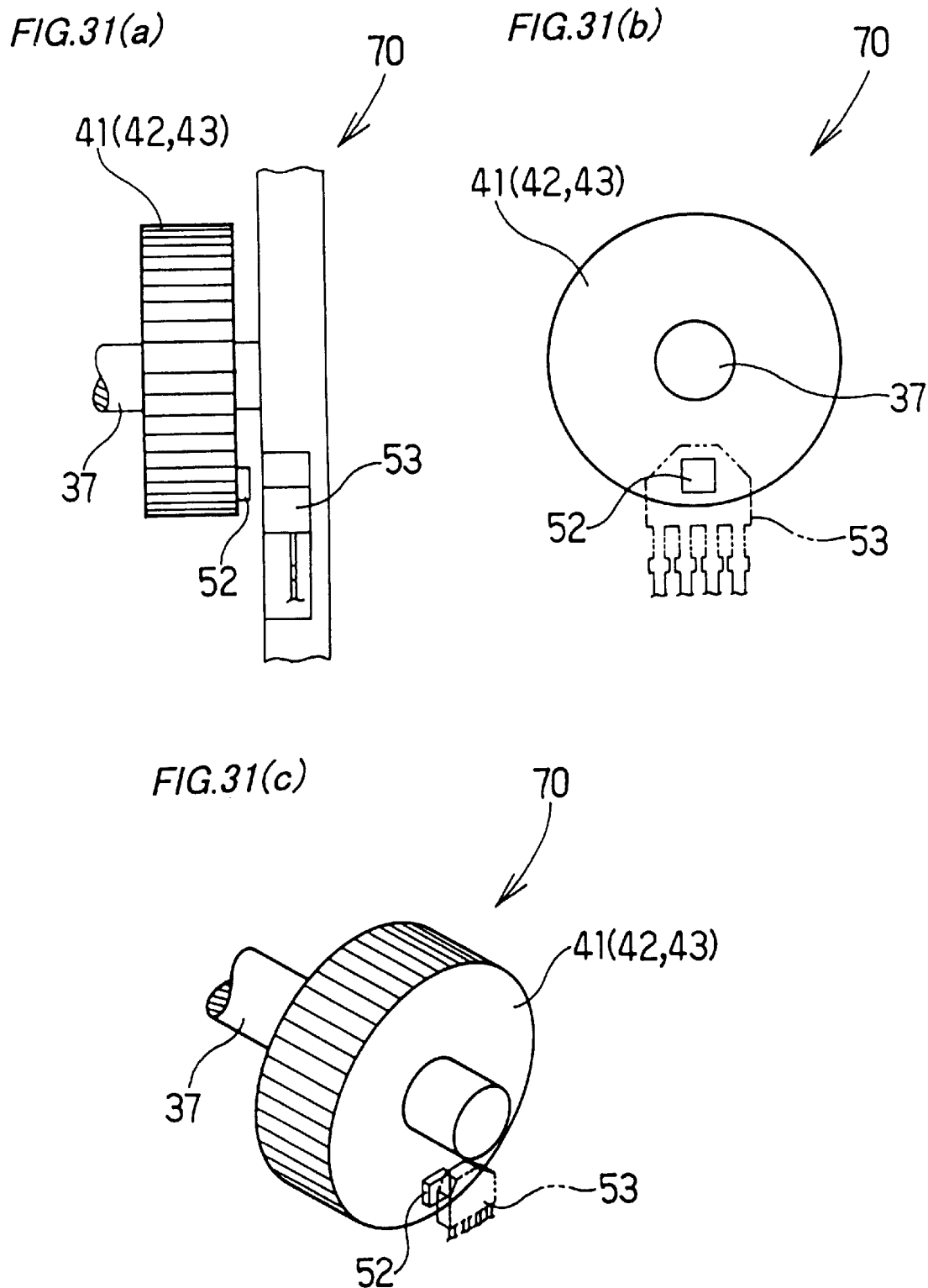
FIG. 31 illustrates the speed sensor of the embodiment disposed on the torque sensor, wherein (a) is a side view, (b) is a front view, and (c) is a schematic general perspective view.

Accordingly, in the case of the speed sensor which is disposed on any of the gears 33, 34, 41, 42, 43 on the input side of the torque sensor 30, as shown in FIG. 31, the magnet 52 which rotates to move as such a gear rotates passes by the portion where the magnetic detecting element 53 is disposed, and it is magnetically detected to measure the rotating speed of the gear, and the running speed of the vehicle can be calculated by the control circuit taking into account the gear ratio of the transmission route from the gear to the rear wheel 5 and the diameter of the rear wheel. And, in this case, a time difference between a certain count timing and the next count timing may be measured to calculate the rotating speed, or it may be calculated from the number of counts in a predetermined duration.

And, since the respective gears are rotated at a speed increased by respective gear ratios, the speed can be detected with high resolving power. Specifically, to detect the speeds of the first and second rotor 14, 15, which are rotating at a relatively low speed, with high resolving power, it is necessary to dispose a plurality of magnets 52 at predetermined intervals on the periphery and the cost is raised. But, when the magnet is disposed on any of the gears on the side of the torque sensor 30, sufficient accuracy can be secured even by a single magnet because the speed is increased, thus the number of magnets can be reduced and also the cost.

By measuring the rotating speed of either the first or second rotor 14, 15, the running speed while driving by human power is judged, but it becomes more accurate by determining the actual running speed based on the rotating speed from the second rotor which is directly connected to the rear wheel 5. Specifically, it is preferable to dispose the speed sensor on the second rotor 15 or either the gears 34, 42 of the torque sensor 30 connected thereto.

And, a generally available Hall element or Hall IC may be used as the magnetic detecting element.

In the same manner as in the previous embodiment, a magnet circuit may be configured with the magnet and the magnetic detecting element disposed at both ends of the yoke and a magnetic piece for shielding the magnetic flux on the rotor side. Thus, the same effect can also be obtained.

As described above, the speed sensor of this embodiment uses the non-contact type magnetic detecting element instead of a contact type sensor as the sensor for detecting the rotating speed, and the life of the sensor can be made long.

And, when disposed on the gear on the input side of the torque sensor, the speed can be detected with high resolving power because the rotation of this gear is increased. And, sufficient accuracy can be secured by a single magnet and also a cost can be reduced because of the same reasons.

Now, description will be made of another speed sensor with reference to FIG. 32 and FIG. 33.

The speed sensor in this embodiment is a sensor for detecting the rotation position of the motor which is previously disposed for controlling the rotation of the motor.

This motor M is a general brushless DC motor and its output is controlled by chopper controlling effected by the motor drive circuit. And, since this type of brushless motor controls the flow of current to the exciting coils of various phases by detecting the rotation position of the rotor, a magnet piece to be detected for determining the rotation position of the rotor is applied to the end face of the rotor, the magnetic detecting element is disposed in the neighborhood of a rotating track of the magnet piece, and the magnetic of the magnet piece is detected by the magnetic detecting element to determine the rotation position of the rotor.

Figure 32:
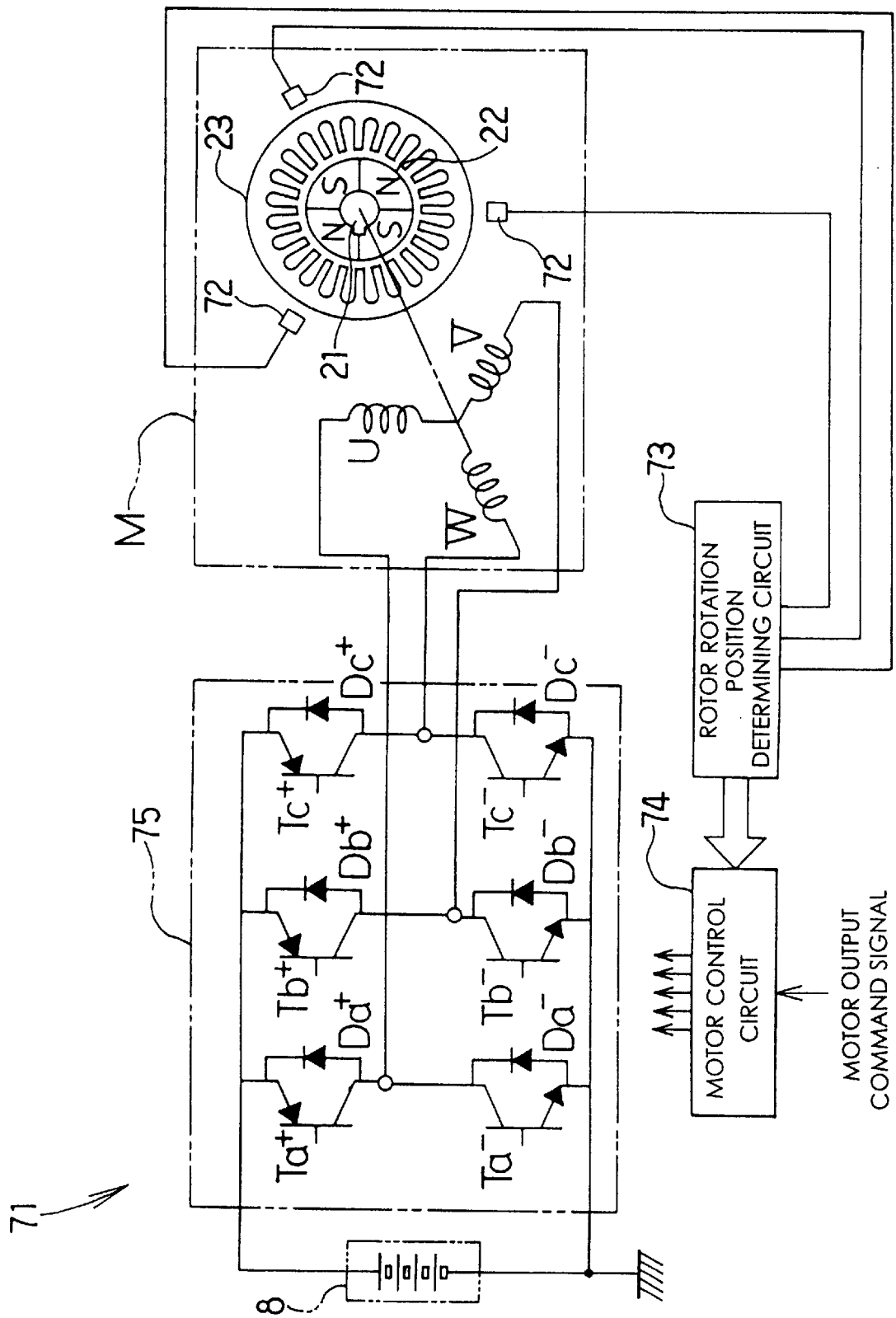
FIG. 32 is a circuit diagram showing a schematic structure of a brushless DC motor according to the embodiment of the speed sensor of the same embodiment.

Specifically, as shown in FIG. 32, a motor drive circuit 71 which flows a current to control the motor M comprises magnetic detecting elements 72 disposed on the motor M, a rotor rotation position determining circuit 73 for detecting a rotation position of a rotor 22 based on detection signals for the position of the rotor core 22 from these magnetic detecting elements 72, a motor control circuit 74 which determines a switching timing and electrifying time of the respective exciting coils of the stator core 23 based on a judging signal from the determining circuit 73 and a motor output command signal from the control circuit, transistors Ta$^+$, Tb$^+$, Tc$^+$ on P side to which various reflux diodes Da$^-$, Db$^-$, Dc$^-$, and Ta$^-$, Tb$^-$, Tc$^-$ on N side to which various reflux diodes Da$^-$, Db$^-$, Dc$^-$ are connected; and it also has a switching circuit 75 on which a switch is formed by combining one pair of the P side transistor and the N side transistor to change the flow of current to a desired exciting coil. And, the motor control circuit 74 operates to switch the switching circuit 75 as predetermined, a three-phase direct current is flown successively to two windings selectively among windings of respective phases to generate a magnetic field for rotating, and the rotor core 22 is rotated by this magnetic field.

Specifically, based on the detection signals from the respective magnetic detecting elements 72, the position determining circuit 73 determines the rotation position of the rotor 22, and based on the judging signal from the position determining circuit 73, the motor control circuit 74 decides commutation timing of the exciting coils U, V, W of respective phases. Then, based on each commutation timing, the switching operation signal is sent to the respective transistors of the switching circuit 75, and electric current is supplied to the exciting coils of the respective phases U, V, W with appropriate commutation timing. And, by such repeated operations, the exciting coils U, V, W which are always positioned ahead of the rotating direction with respect to the rotor 22 are excited to keep the rotation of the rotor 22, and the motor M operates to rotate and output.

Figure 33:
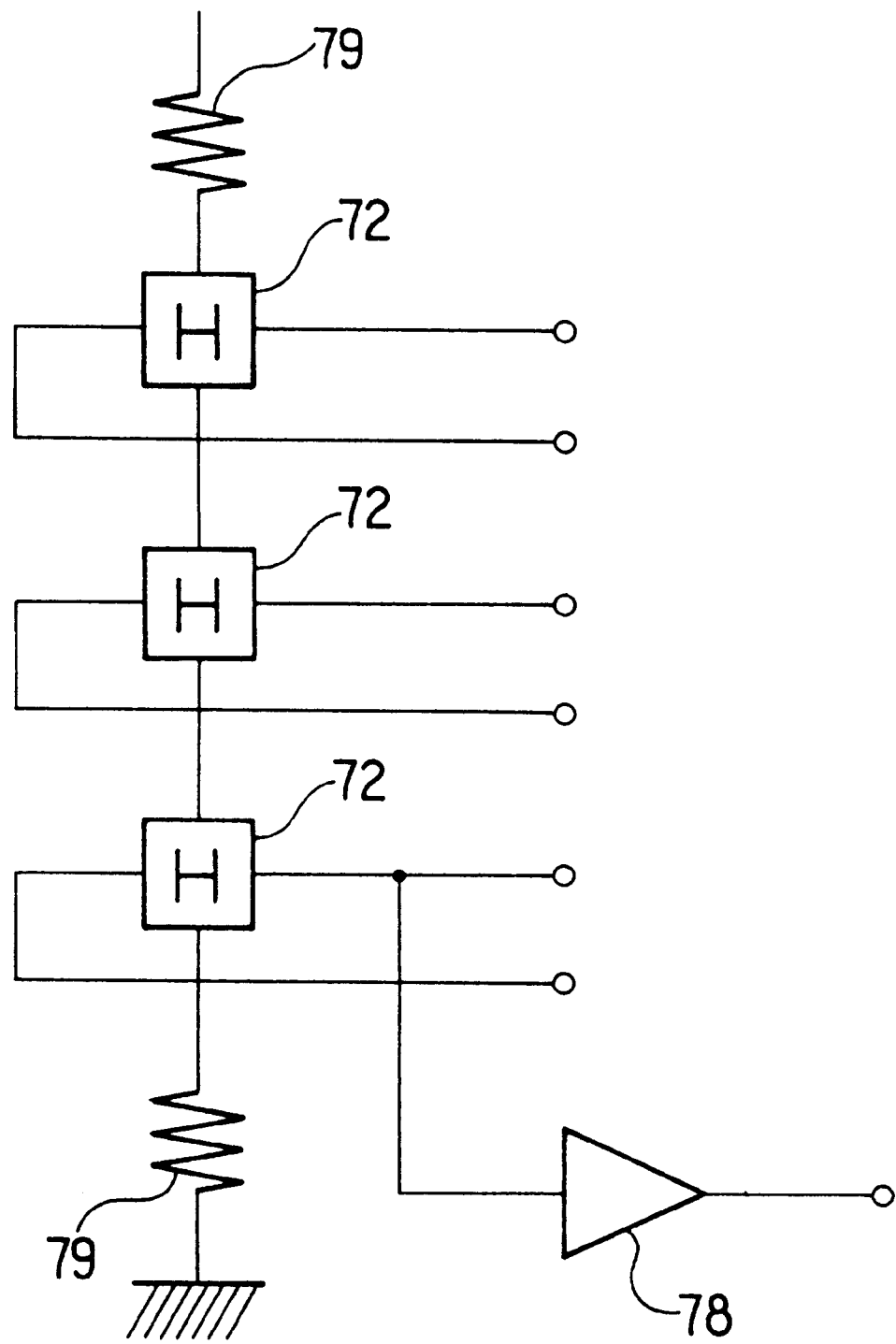
FIG. 33 is a circuit diagram showing a schematic structure according to the speed sensor of the embodiment.

As shown in FIG. 33, the speed sensor in this embodiment processes the output signal of one of the magnetic detecting elements 72 to use as a speed signal for controlling to switch the flow of current to the respective exciting coils of this brushless motor. Specifically, the input terminal of an amplifier 78 is connected to one output terminal of one of the magnetic detecting elements 72, and the output terminal of this amplifier 78 is connected to the control circuit. And, a Hall element and Hall IC are used for the magnetic detecting element 72. Reference numeral 79 denotes a resistor which sets a predetermined supply voltage for the magnetic detecting elements 72.

Therefore, the rotating speed of the motor shaft 21 can be determined by measuring a frequency of the signal from the Hall element, and based on such determination, a reduction gear ratio of the gears and the like on the transmission route from the motor M to the rear wheel 5 is taken into account, and the running speed of the electric bicycle 1 can be calculated. This is effected, for example, by detecting only a pulse of the signal of a certain Hall element and counting it.

When the motor is not operating, running control is made according to a predetermined initial value at the beginning when running is started or the start of pushing the pedals, at which time no detection signal is obtained.

And, the processing of the detected speed signal is variable depending on a combination of the number of poles and the number of exciting coils per turn.

As described above, by the speed sensor in this embodiment, when a brushless motor is used as the running motor, the rotation position detecting means which is previously disposed for controlling the rotation of the motor can also be used as the speed sensor, so that the speed sensor can be configured without requiring the addition of a circuit instrument, and it can be made compact and the cost can be reduced.

And, this rotation position detecting means is a non-contact type and excels in durability, so that it also has the same effect in durability as the speed sensor.

This embodiment has been described in connection with the bicycle, but the invention can also be applied to lighter vehicles such as a boat which is driven by human power.

Now, description will be made of a vehicle speed detecting mechanism to be used for the driving force auxiliary device.

The vehicle speed detecting means related to the vehicle speed detecting mechanism of the invention is shown in FIG. 23 and FIG. 34 to FIG. 37.

Figure 19:
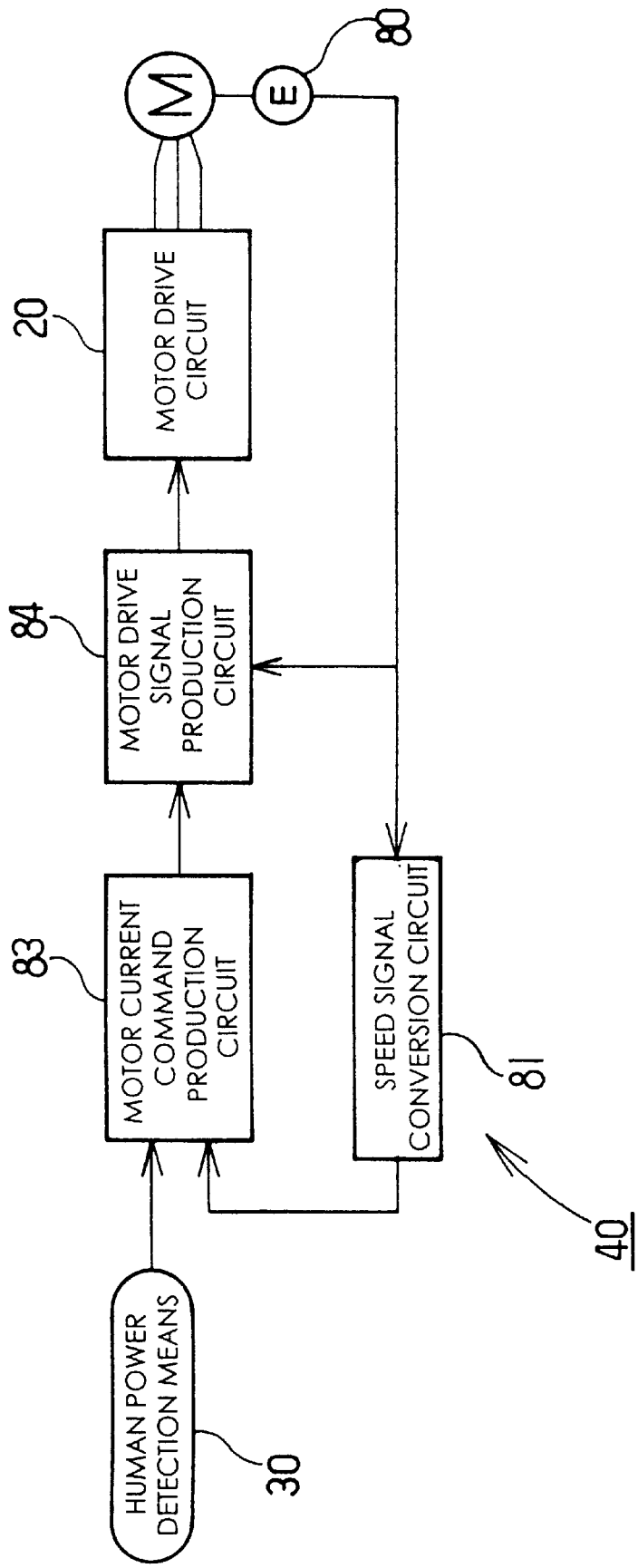
FIG. 19 is a block diagram illustrating a motor-assisted control system of the embodiment.

In this embodiment, the vehicle speed detecting means 40 comprises a rotor rotation position detecting means 90 which is previously provided on the brushless motor M and a speed signal conversion circuit 91 as shown in FIG. 19, a rotor rotation position signal from the rotor rotation position detecting means 90 is converted by the speed signal conversion circuit 91 to obtain a speed signal. Specifically, the rotor rotation position detecting means 90 operates always to detect and determine a rotation position of the motor rotor 22 at some moment, and time during which the rotor rotates to the next rotation position is measured, so that the rotating speed of the rotor can be determined easily. Therefore, as described above, as the rotor rotation position detecting means 90 in this embodiment, a plurality of Hall elements X, Y, Z which are disposed to face the rotor 22 are used, and time intervals of the rotor rotation position detection signals from these Hall elements X, Y, Z are measured to detect the rotating speed of the motor rotor, namely the running speed of the bicycle.

Specifically, to control the rotation of the motor, the rotation position of the rotor is determined by the Hall elements X, Y, Z disposed in the neighborhood of the motor rotor to effect commutation of the exciting coils of various phases. Therefore, when the motor M operates, the rotation position signal of the rotor can always be obtained. And, when the motor is operating, the motor shaft 21 to which the rotor is fixed is connected to the wheel (rear wheel 5) through the reduction mechanism and the like, and by measuring the rotating speed of the motor, the running speed of the bicycle can be determined taking into account the reduction gear ratio from the motor M to the rear wheel 5 and the diameter of the rear wheel 5.

Figure 23:
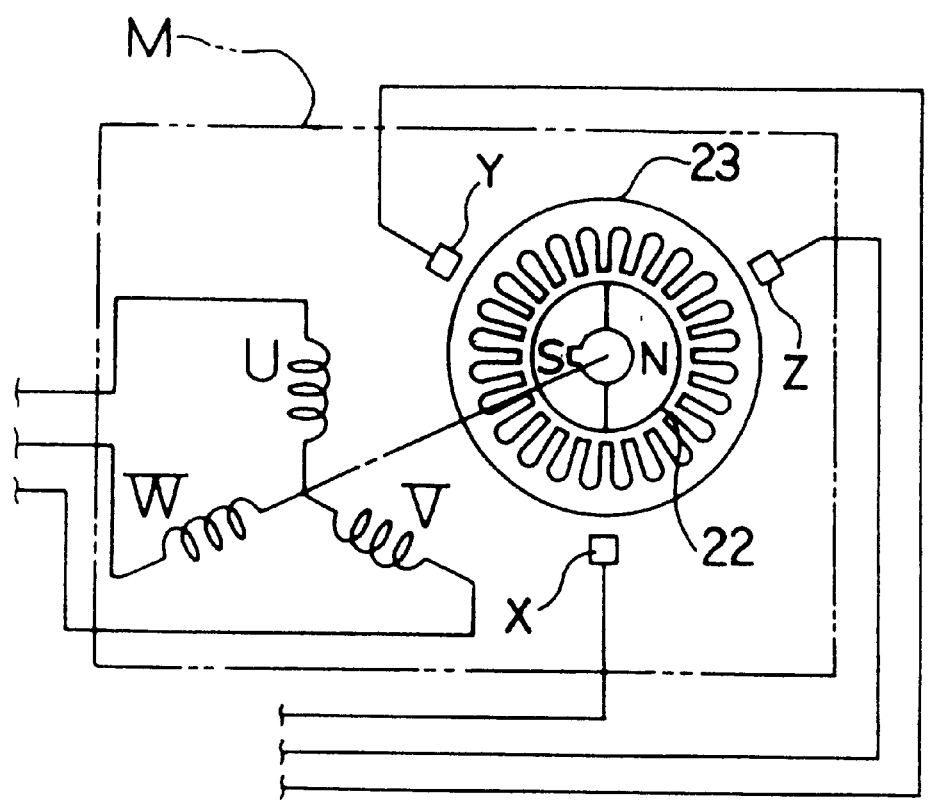
FIG. 23 is a concept explanatory view briefly showing a DC brushless motor used for the power unit of the embodiment.

As shown in FIG. 23, the motor M in this embodiment has two split permanent magnets fixed in the circumferential direction onto the outer periphery of the rotor rotated electromagnetically, and they are magnetized to N and S poles. The rotor rotation position detecting means 90 for detecting the rotation position of the rotor 22 comprises the three Hall elements X, Y, Z which are disposed in the neighborhood of the rotor, these Hall elements X, Y, Z are disposed at equal intervals of 120 degrees in the circumferential direction, and detection signals corresponding to the N and S poles of the rotor magnets facing the respective Hall elements X, Y, Z are separately output from the respective Hall elements X, Y, Z. Therefore, when the rotor 22 is rotating at a constant speed, the rotation position signals of the rotor 22 output from these Hall elements X, Y, Z have the phase advanced or delayed by 60 degrees with respect to the rotating cycle.

Figure 34:
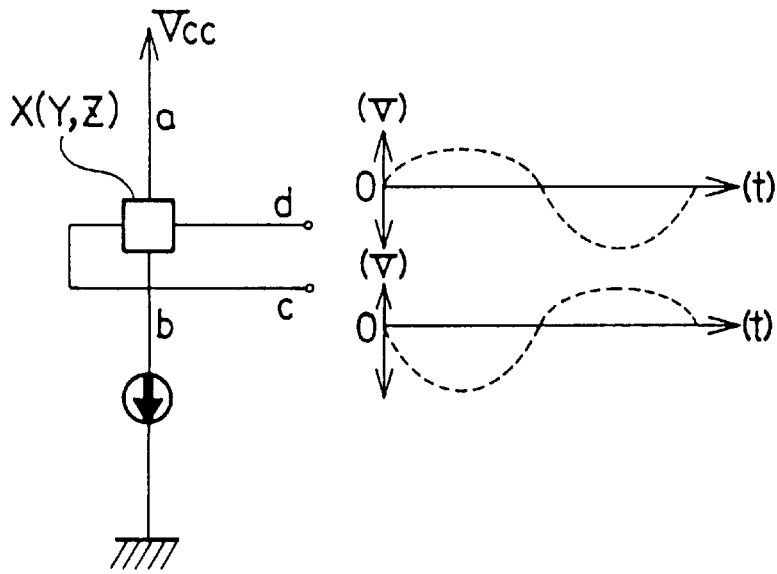
FIG. 34 shows the detected output waveforms of an actual Hall element according to a first embodiment, wherein (1) shows a Hall element and a waveform diagram showing detected waveforms output from a and b terminals of the Hall element corresponding to the rotor rotations, and (2) shows a Hall element to which a waveform shaping circuit is added and a shaped output waveform diagram.
Figure 34:
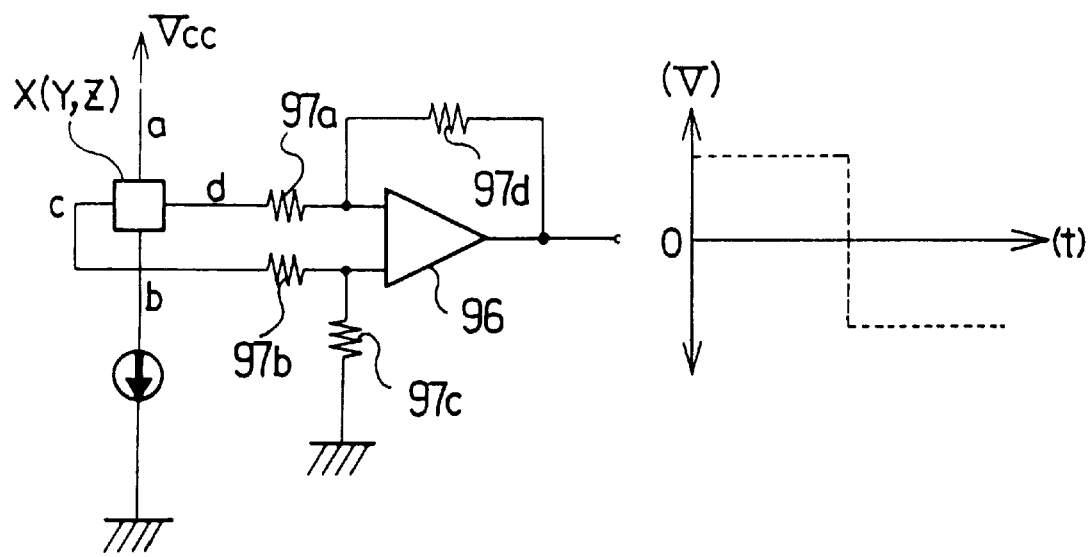

And, as shown in FIG. 34(1), detection voltages output from output terminals c and d of the Hall element X (Y, Z) have a mutually opposite phase, and the Hall element X (Y, Z) has the maximum output voltage peak with respect to the magnetic flux having a reversed polarity. For example, when it is assumed that N polarity is negative, if the magnetic flux with the N polarity acts on the Hall element X (Y, Z), a maximum negative detection output is obtained from the output terminal c of the Hall element X (Y, Z), and if the magnetic flux with the S polarity acts on the Hall element, a maximum negative detection output is obtained from the output terminal d of the Hall element X (Y, Z).

Therefore, as shown in FIG. 34(2), the output terminals c and d of the Hall element X (Y, Z) are connected to a differential amplification circuit mainly using an op-amp 96, output waveforms outputted with changes from the output terminals c and d as the rotor rotates are converted into rectangular waves corresponding to the rotation of 180 degrees at an electrical angle of the rotor and outputted by this differential amplification circuit.

Specifically, the op-amp 96 of the differential amplification circuit has its positive input terminal connected to the positive output terminal of the Hall element X (Y, Z) through a first resistor 97a, the negative input terminal connected to the negative output terminal of the Hall element X (Y, Z) through a second resistor 97b and its negative input terminal grounded through a third resistor 97c, and the output terminal of the op-amp 96 connected to the positive input terminal through a negative feedback resistor 97d. And, the first resistor 97a and the second resistor 97b are set to a same first resistance value, and the third resistor 97c and the negative feedback resistor 97d are set to a same second resistance value. And, a predetermined amplification ratio is set between the first resistance value and the second resistance value. Therefore, the voltage between the output terminals of the Hall element X (Y, Z) can be amplified and outputted by the differential amplification circuit configured as described above.

Figure 35:
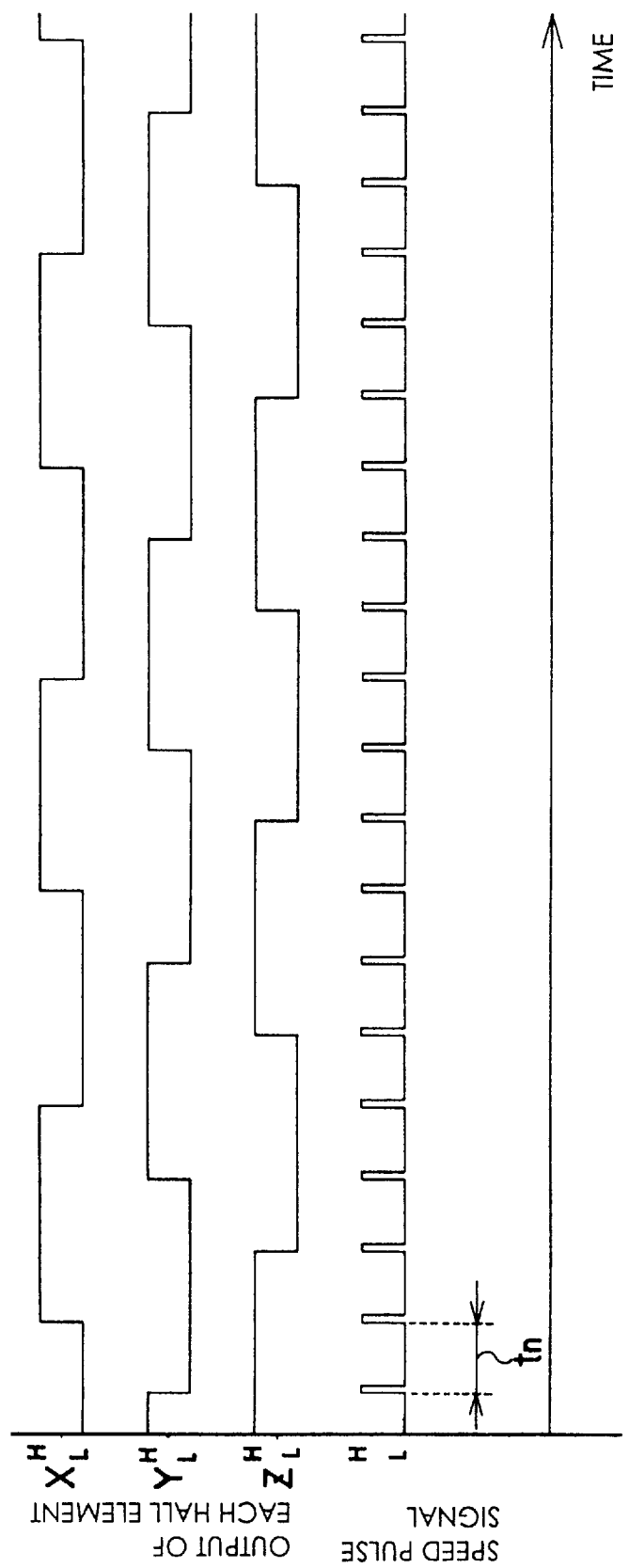
FIG. 35 is a time chart illustrating the relation between a speed pulse signal and output signals detected by the respective Hall elements.

As shown at the upper half of FIG. 35, when the rotor rotates 180 degrees in an electrical angle with the boundary of magnetic poles of the magnets fixed to the rotor as the starting point with respect to the respective Hall elements X, Y, Z, the outputs of the Hall element are alternately switched between a high-level signal and a low-level signal.

And, the rotation position of the rotor can be determined accurately by detecting that the outputs of the respective Hall elements X, Y, Z are switched for each of the Hall elements X, Y, Z. And, by processing to convert these signals, timing that the rotor 22 rotates 60 degrees in an electrical angle can be detected, and by measuring a time interval tn when the edge appears shown in the drawing, the rotating speed of the rotor 22, namely the motor rotating speed, can be detected.

Figure 36:
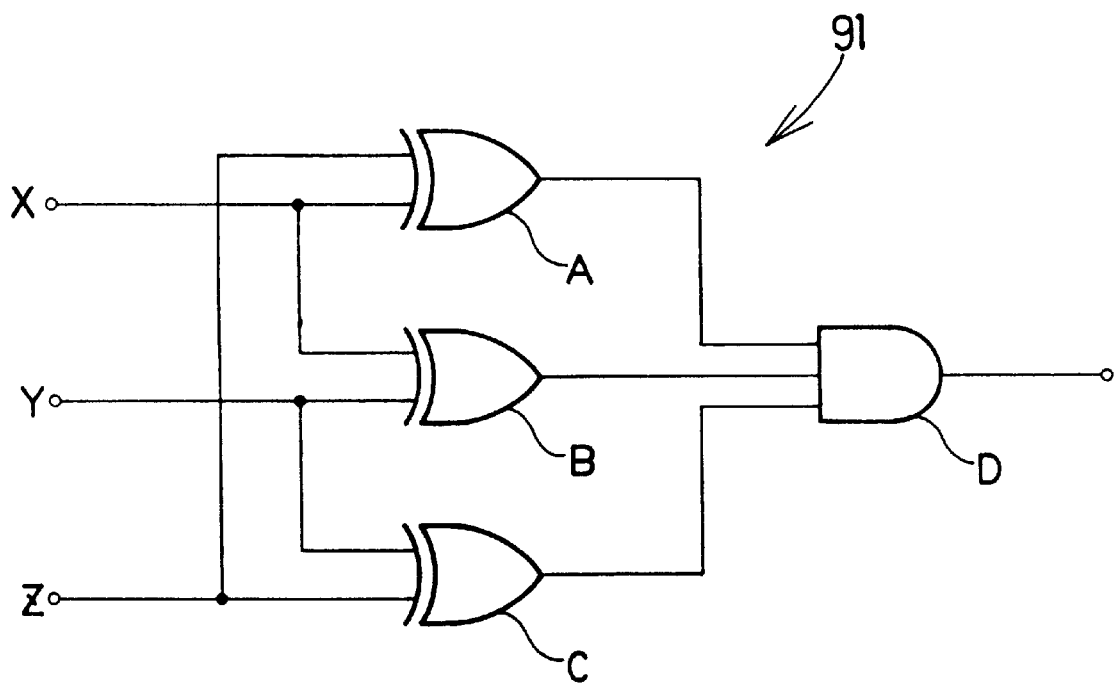
FIG. 36 is a circuit diagram showing an example of a circuit for converting the output signals of the respective Hall elements into a speed signal.

The speed signal conversion circuit 91 is to convert the output signals of these Hall elements X, Y, Z, which are converted into the rectangular waves, into a speed signal. And, as shown in FIG. 36, the speed signal conversion circuit 91 comprises first, second and third exclusive OR logic elements A, B, C which respectively have one input terminal connected to the output terminals of Hall elements X, Y, Z which are magnetic detecting elements and the other input terminal connected to the output terminals of other Hall elements X, Y, Z, and an AND logic element D input terminal of which are connected to the output terminals of these logical terminals A, B, C. The speed signal conversion circuit 91 converts the detection signal output from each magnetic detecting element and outputs a pulse signal whenever the rotor 22 turns 60 degrees in an electrical angle.

Input terminals of these exclusive OR logic elements A, B, C are connected to the output terminals of predetermined different Hall elements X, Y, Z. Specifically, one input terminal of the first exclusive OR logic element A is directly connected to the output terminal of the Hall element X, and the other input terminal is connected in parallel to the output terminal of the Hall element Z. And, one input terminal of the second exclusive OR logic element B is directly connected to the output terminal of the Hall element Y, and the other input terminal is connected in parallel to the output terminal of the Hall element X. Besides, one input terminal of the third exclusive OR logic element C is directly connected to the output terminal of the Hall element Z, and the other input terminal is connected in parallel to the output terminal of the Hall element Y.

A delay circuit (not shown) which is set to a sufficiently short delay time is disposed on wirings directly connected to the Hall elements X, Y, Z of the exclusive OR logic elements A, B, C. Therefore, when an output signal level of one of the Hall elements X, Y, Z is switched, the outputs of all exclusive OR logic elements A, B, C are in a high state during the delay time from the moment of switching.

And, the output terminals of these exclusive OR logic elements A, B, C are connected to the input terminal of the AND logical terminal D. Therefore, the AND logic element D has a logical judgment made and outputs a high-state signal only when a high-state signal is outputted from the exclusive OR logic elements A, B, C at the same time.

Therefore, as shown at the bottom in FIG. 35, by the speed signal conversion circuit 91 configured as described above, a pulse signal which keeps a high level for a predetermined period can be obtained as the rotor 22 rotates with a point of time, when the high-level signal or low-level signal outputted from the respective Hall elements X, Y, Z is switched to the other level signal, as a trigger.

Specifically, it is seen in FIG. 37 that when the output states of the respective Hall elements X, Y, Z change, the outputs from the respective exclusive OR logic elements A, B, C change accordingly. But, since all OR logic elements keep the high state during a predetermined delay time, a speed pulse signal can be outputted from the subsequent AND logic element B.

For example, as shown at the leftmost row in the drawing, when the output of the Hall element X keeps the low level, the output of the Hall element Z keeps the high level, and the output of the Hall element Y is changed from the low level to the high level, the output of the first exclusive OR logic element A keeps the high signal state, the output of the second exclusive OR logic element B changes from the high level to the low level after a predetermined delay time, and the output of the exclusive OR logic element C is immediately changed from the low level to the high level.

Accordingly, during this predetermined delay time, the high-level signal is outputted from all exclusive OR logic elements A, B, C, comparison of the AND logic element D is set up, a high-level signal is outputted from the AND logic element D, and after the elapse of the predetermined delay time, the output from the AND logic element D restores to the low-level signal state.

As a result, every time the rotor turns 60 degrees, a pulse signal can be obtained with leading and trailing edges of the detection signals outputted from the respective Hall elements X, Y, Z as the trigger.

And, by measuring the pulse generation time interval tn of the pulse signal thus converted and shown at the bottom in FIG. 35, the motor rotating speed, namely the running speed of the bicycle, can be obtained. Namely, the time interval tn can be measured by the timer function built in the control circuit 19, and if this time interval tn is long, the vehicle speed is relatively low, and the vehicle speed increases as this time interval tn becomes short.

Now, description will be made of the control of auxiliary driving in the power unit 11 of the electric bicycle.

Figure 38:
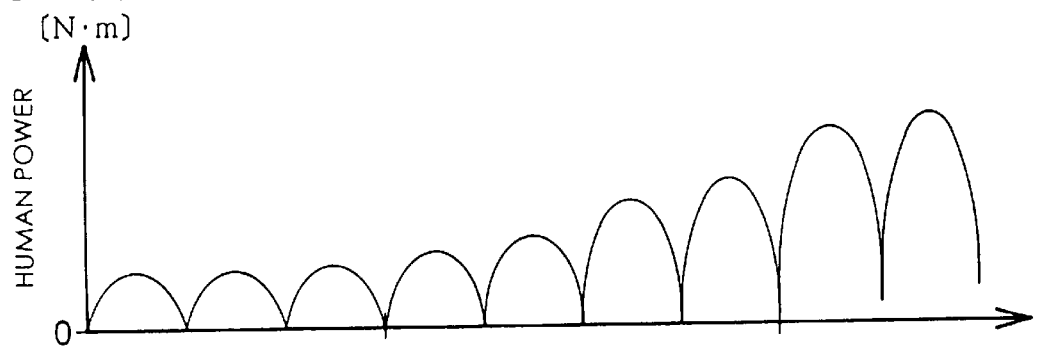
FIG. 38 illustrates motor-assisted operation control of the electric bicycle of the embodiment, wherein (1) is a graph showing an input state of human power at respective travel speed ranges, (2) is a graph showing the relation between respective speeds and a motor-assisted ratio, (3) is a graph showing the relation between human power and motor-assisted output at respective speed ranges, and (4) is a graph showing the relation between human power and a combined driving force consisting of human power and motor-assisting output at respective speed ranges.
Figure 38:
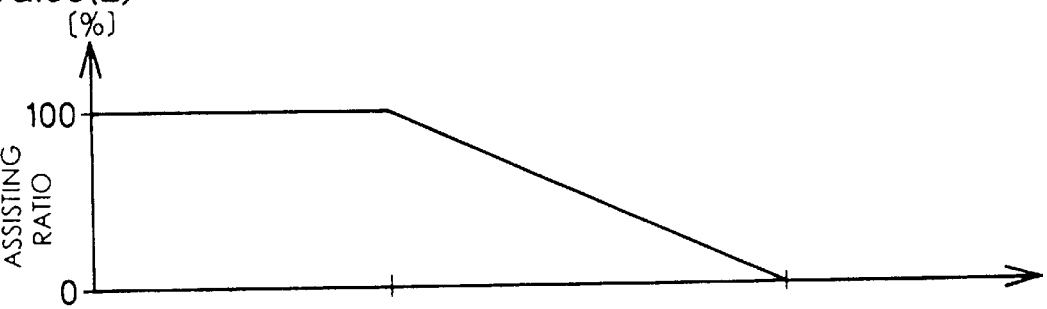
Figure 38:
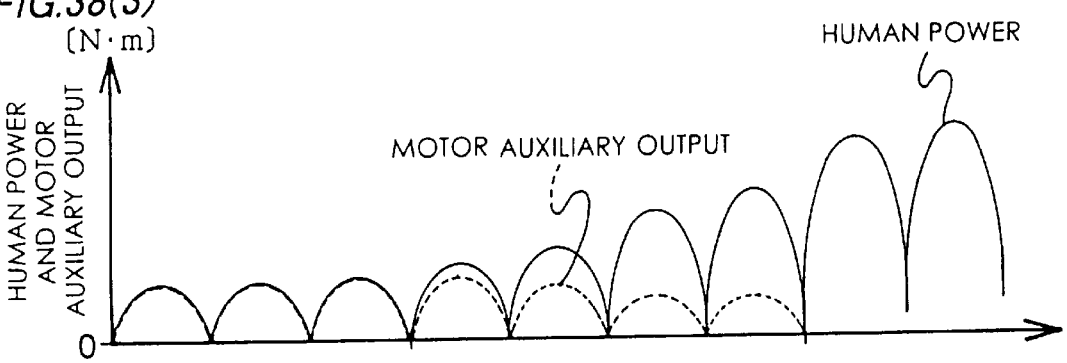
Figure 38:
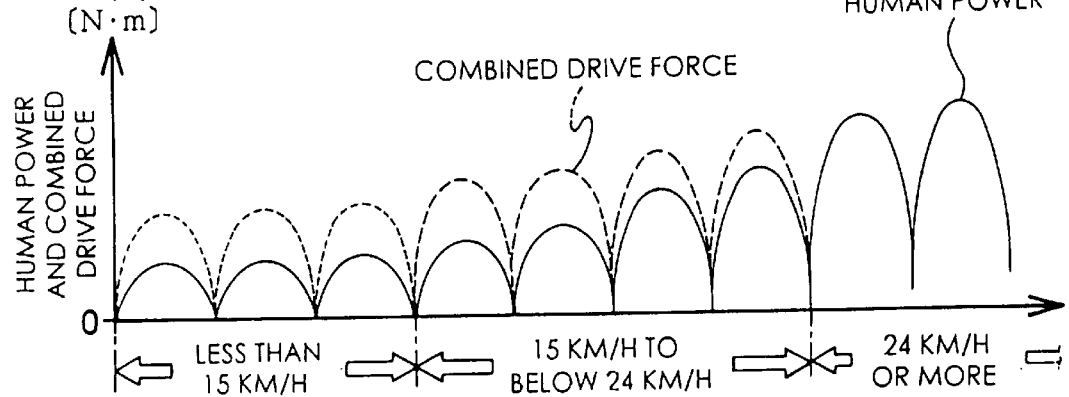

When human power is applied to the electric bicycle, the motor operates to assist the human power. In this case, as shown in FIG. 38(1), human power varies to respective running speed ranges for the bicycle. This entry of the human power driving force shows a pulse wave form which is not constant and has strong and week points because the entry is made by the leg power of the rider intermittently.

And, with the operation of the motor, the rotor rotation position detecting means 90 outputs a rotor rotation position detection signal. Then, the rotor rotation position detection signal is converted into the speed pulse signal by the speed signal conversion circuit 91, and the vehicle speed is detected. And, based on the vehicle speed value, a motor current command forming circuit 93 determines an auxiliary ratio for assisting the human power by the motor output (see FIG. 38(2)). Then, this determined auxiliary ratio is multiplied with the human power detection value detected by the torque sensor 30 to decide an actually required motor auxiliary output (see FIG. 38(3)). And, a motor current command value which makes the motor M output the motor auxiliary output is determined, and this command value is outputted to a motor driving signal forming circuit 94.

If the motor is in a stopped state when the motor starts the auxiliary movement, a predetermined auxiliary ratio is determined.

Based on the current command value and the rotor rotation position detection signal, the motor driving signal forming circuit 94 forms a motor driving signal, and this motor driving signal is outputted to the motor drive circuit 20.

And, based on this motor driving signal, the motor drive circuit 20 controls to flow an electric current to supply the power to the motor M.

As a result, the human power entered by the rider and the motor auxiliary output appropriate for the vehicle speed at the time are outputted from the motor M, and the motor auxiliary output is added to the human power (see FIG. 38(4)).

The rotor rotation position detecting means 90 which also serves as the vehicle speed detecting means is not limited to the one described above but may be any conventionally used detecting means.

For example, there may be used a rotor rotation position detecting means which has a detecting disc which is coaxially fixed to the rotor and alternately magnetized to N and S poles in the circumferential direction, and a magnetic sensor using a Hall element in the neighborhood of the detecting disc. In this case, a fine rotation pulse signal can be obtained as the rotor rotates, resolving power as the measuring device can be enhanced to improve detecting accuracy, and speed detecting accuracy can be improved.

And, as the rotor rotation position detecting means, a photo-interrupter type may be used. Specifically, this photo-interrupter type rotor rotation position detecting means comprises a circular-shaped detecting disc which rotates in synchronization with the rotor, a light emitting diode, and a photo-transistor which is disposed with the detecting disc between it and the light emitting diode and receives light. And, a plurality of slits are formed at prescribed positions on the outer periphery of the detecting disc. Therefore, when the detecting disc rotates with the rotation of the rotor to the position where the slit is formed, light from the light emitting diode reaches the photo-transistor through the slit formed on the detecting disc, and the detection signal is outputted from the photo-transistor. Thus, it is determined that the rotor has rotated to reach the position where the slit is formed.

By measuring the time interval of the rotation position signal to be obtained from this photo-interrupter type rotor rotation position detecting means, the speed signal can be obtained.

Therefore, in this case, the rotation position detecting means detects optically the slits which rotates in the circumferential direction with the rotation of the detecting disc disposed on the rotor, so that an analog/digital converter is not needed, and the circuit structure can be simplified. And, since this detecting means utilizes an optical detecting method, it is not adversely affected by electromagnetic noises from surroundings, and when it operates, it is electromagnetically clean and does not disperse electromagnetic noises to surroundings, so that it can be incorporated into the motor. In other words, even when it is disposed in the neighborhood of the motor coil or the like, a rotating magnet field during the motor operates is not disturbed, so that the motor can be made compact.

Besides, it can also be applied when a general optical type or magnetic type speed FG (frequency generator) is used as the rotation position detecting means, and this speed FG is designed to output a very fine pulse train with the rotation of the rotor. And, in this case, as a method to obtain a speed signal from the detection signal of the speed FG, a method for processing in an analog fashion, namely a method which converts the detection signal into an analog voltage by an F/V converter (frequency/voltage converter) and uses it as speed information based on the voltage level, or a method for digitally counting, namely a method which counts the number of pulses generated in a certain unit time and uses the quantity of the counted number as speed information, can be used as required.

Furthermore, it can be applied by the same manner to a position sensorless/brushless DC motor of a sensorless type which utilizes a back electromotive force which is produced in the exciting coils with the rotations of the rotor to determine a rotor rotation position and to obtain a commutation signal for the exciting coils of the next pattern.

And, in addition to the above-described detecting pattern, it can be applied to a rotor rotation position detecting means which is provided with a sensor which outputs a single detection pulse every time the rotor makes one turn. And, a sensor which is used for purposes other than the rotor rotation position detecting means can also be used as the speed sensor by converting its detection signal if it has a detecting function.

As described above, for the electric bicycle in this embodiment, an auxiliary driving device sufficiently compact as a whole can be obtained by rationally arranging the human power driving means for transmitting human power, the brushless DC motor for assisting human power under predetermined conditions, and main components such as a torque sensor, and accommodating them into a single-body case.

Specifically, since a small and light-weight motor is accommodated in parallel with the crank shaft within the case, the rotation driving force from the motor to the crank shaft can be transmitted and added smoothly without changing the direction of transmission, the space between both rotating shafts is effectively used to appropriately arrange the motor speed reduction mechanism, and the torque sensor is incorporated as a part of the driving force transmission mechanism to eliminate the space required for the torque sensor, and as a result, the auxiliary driving device optimum for the electric bicycle can be obtained.

And, since the brushless DC motor excelling in durability and reliability is used as the motor for assisting the human power running, durability and reliability of the bicycle can also be secured satisfactorily.

Furthermore, since the rotation position detecting means which is previously disposed on the brushless DC motor is also used as the speed sensor for the running motor, a dedicated speed sensor and attached circuit equipment and wiring for such equipment can be eliminated in configuring the speed sensor, and it is not necessary to secure the space for arranging the dedicated speed sensor and to work for wiring, thus the space can be saved and the cost can be reduced. In other words, the rotor position detection signal outputted from the rotor rotation position detecting means is converted as required, so that the speed signal can be obtained readily.

This rotation position detecting means excels in reliability as a main component part of the motor and a non-contact detecting type excelling in durability, so that it has also the same effects of high durability and reliability as the speed sensor.

And, since the vehicle speed detecting means for detecting the running speed is safely accommodated in the motor case, it is not exposed directly to adverse affects from external natural atmosphere such as rain and wind or those such as dust and mud arising while the vehicle is running, and possibility of losing reliability such as error detection or shortening the life of the device can be avoided.

Similarly, since the rotor rotation position detecting means which is a conventional main component part is also used as the speed sensor for the brushless motor, it can be used for the brushless motor extensively. In other words, it can be used for the motor regardless of its size, for example, for a light-weight compact motor, and easily used by simply adding a circuit for converting the detection signal of the position detecting means into the speed value.

This embodiment has been described in connection with the bicycle, but the invention can also be applied to lighter vehicles such as a boat which is driven by human power.

Description will be made of a first embodiment of the torque sensor zero point adjusting mechanism of the driving force auxiliary device of the invention with reference to FIG. 39 and FIG. 42.

The zero point adjusting mechanism in this embodiment adopts and holds a torque value detected by the torque sensor as a zero value when the power is turned on to start the operation of the electric bicycle and uses this held zero value to compensate the detected human power torque value at present until the power is turned off.

Figure 39:
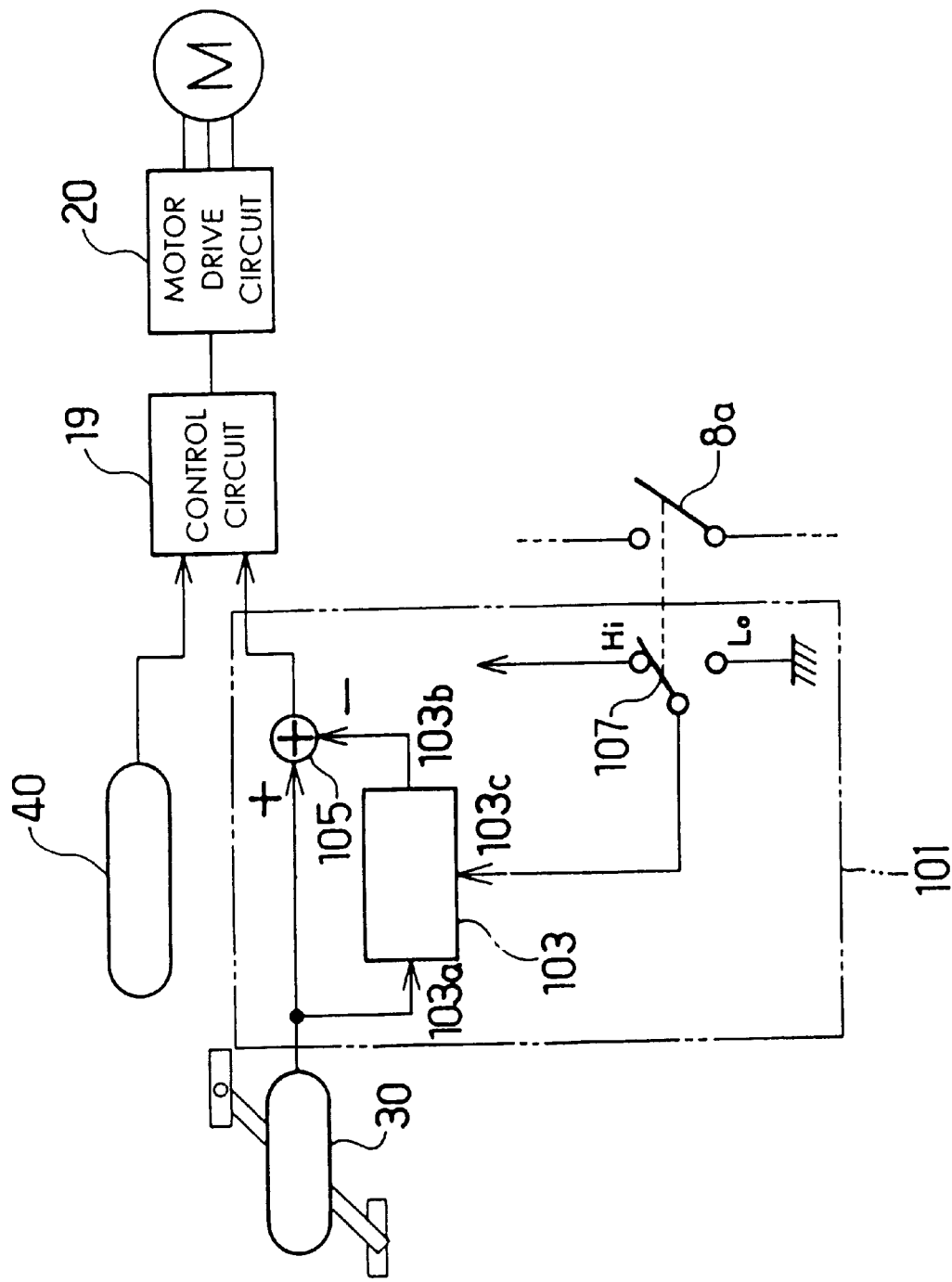
FIG. 39 is a circuit block diagram showing the structure of a first embodiment related to the torque sensor zero adjusting mechanism of the invention.

As shown in the circuit block diagram of FIG. 39, this zero point adjusting mechanism comprises a circuit 101 which is disposed between the output terminal of the torque sensor 30 connected to the human power transmission system to detect human power entered through the pedals and one input terminal of the control circuit 19. As described above, the vehicle speed detecting means 40 is connected to the other input terminal of this control circuit 19, and the motor drive circuit 20 which is connected to the motor M for assisting the human power to control the motor output is connected to its output terminal. And, this circuit 101 holds the human power torque value outputted from the torque sensor 30 when the power is turned on, determines this human power torque value as a zero point compensation value, uses the zero point compensation value to compensate the human power torque values detected afterwards, and enters the compensated human power torque value into the control circuit 19.

Specifically, the circuit 101 for achieving the zero point adjusting mechanism comprises a zero point holding circuit 103 which has its input terminal 103a connected to a line branched from the signal line which is connected from the output terminal of the torque sensor 30 to the control circuit 19, an adder-subtracter 105 which is connected in series at a point closer to the motor than to a branch point of the signal line and has an output terminal 103b of the zero point holding circuit 103 connected, and an on/off type interlock switch 107 which is interlocked with a hold input terminal 103c of the zero point holding circuit 103 and interlocked with a power switch 8a.

And, the human power torque value outputted from the torque sensor 30 when the power is turned on is held as the zero value by the zero point holding circuit 103, the held zero point value is subtracted from a subsequent detection signal outputted from the torque sensor 30 by the adder-subtracter 105 for compensating, and the compensated human power torque value signal Tn is entered the control circuit 19 to control the output of the motor M.

The zero point holding circuit 103 has the input terminal 103a connected in parallel to the output terminal of the torque sensor 30, the output terminal 103b connected to the adder-subtracter 105, and the hold input terminal 103c connected to the interlock switch 107 interlocked with the power switch 8a; according to the input condition of the hold input terminal 103c, holds and outputs the entered signal or outputs the entered signal as it is.

And, the interlock switch 107 with its output terminal connected to the hold input terminal 103c of the zero point holding circuit 103 operates to changeover in association with the on or off operation of the power switch 8a by the user, thereby outputting a high-level signal or a low-level signal. Specifically, this interlock switch 107 is connected to the power source of a predetermined voltage when the power switch 8a is turned off, to enter the high-level signal into the hold input terminal 103c. On the other hand, when the power switch 8a is turned on, the interlock switch 107 releases the connection with the power source and is connected to the terminal on the ground side to enter the low-level signal to the hold input terminal 103c.

Besides, the zero point holding circuit 103 is configured to make an edge operation to perform a predetermined operation when the input condition of the hold input terminal 103c changes and has only an edge which changes from the high level to the low level as an operation trigger. Specifically, the zero point holding circuit 103 outputs the signal entered the input terminal 103a from the output terminal 103b as it is when the input condition of the hold input terminal 103c is at a high level and when the input condition changes from the high level to the low level, the signal entered the input terminal 103a of the zero point holding circuit 103 immediately before the change from the high level to the low level is held as the zero value in the zero point holding circuit 103, and this held signal is continuously outputted from the output terminal 103b.

As a result, the zero point holding circuit 103 holds the detection signal detected and outputted by the torque sensor 30 at the moment when the power switch 8*a* is turned on, and continues to output the holding detection signal from the output terminal 103*b* until the power switch 8*a* is turned off.

And, the motor M is controlled based on a torque signal Tn compensated with this held zero point value.

Specifically, the output terminal of the torque sensor 30 is connected to the positive input terminal of the adder-subtracter 105, the output terminal of the zero point holding circuit 103 is connected to the negative input terminal of the adder-subtracter 105, and the output terminal of the adder-subtracter 105 is connected to the control circuit 19.

Therefore, the held zero point value is subtracted from the output signal outputted from the torque sensor 30 by this adder-subtracter 105 to become the compensated torque signal Tn. And, the motor auxiliary output for assisting the human power is decided based on the torque signal Tn and the detection values of various sensors, to control the drive of the motor M.

Now, description will be made of the operation of the torque sensor zero point adjusting mechanism formed of the circuit 101.

Figure 40:
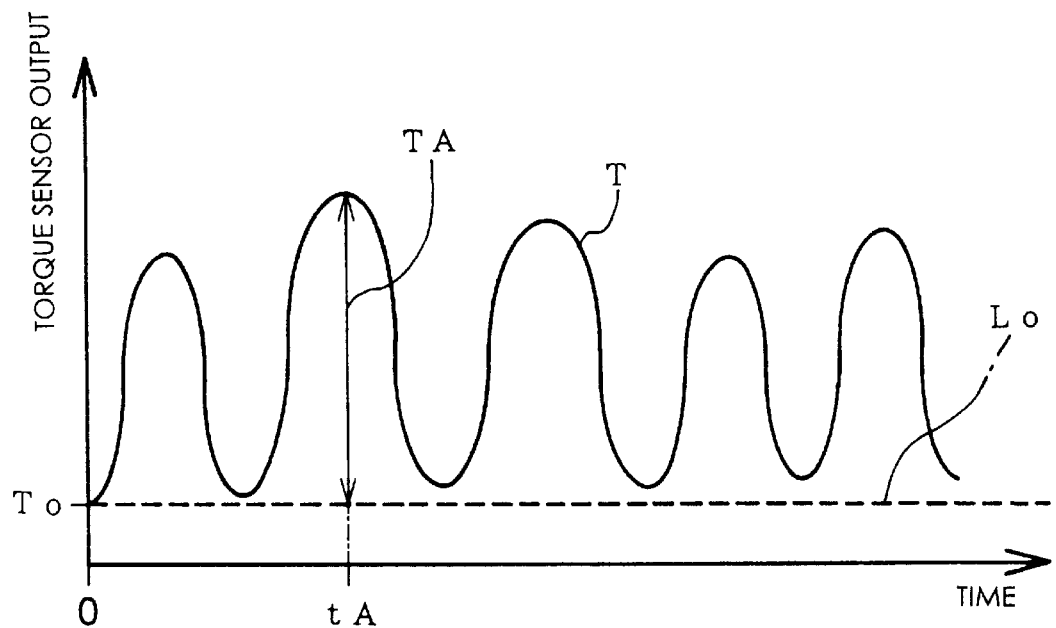
FIG. 40 is a graph showing the operation of the torque sensor zero adjusting mechanism according to a first embodiment of the torque sensor zero adjusting mechanism of the invention.

FIG. 40 shows a signal wave which is obtained by the torque sensor mounted on the bicycle which detects and outputs the human power driving force entered by the user through the pedals.

As described above, this torque sensor is set to make the output operation so that the output voltage varies in proportion to the magnitude of the human power driving force entered by the user through the pedals, when the human power driving force increases, the output voltage rises proportionally, and when the human power driving force lowers, the output voltage lowers proportionally.

And, since the magnitude of the human power driving force which can be entered through the pedals by the user is variable depending on the rotation angle position of the pedals, the human power driving force detected by the torque sensor while running becomes always a torque sensor signal waveform T which is pulsating even when the human power is continuously entered through the pedals.

Besides, it is assumed that the power switch 8*a* is turned on to start the operation of the human power auxiliary device at t=0 in FIG. 40, and at the moment, the human power driving force by the user is not entered the electric bicycle through the pedals.

And, the torque sensor output voltage T0 at t=0 is held by the torque sensor zero point adjusting mechanism and it is determined as zero point value L0.

Therefore, the human power driving force value detected by the torque sensor from this moment and later is corrected by the zero point value L0 held by the torque sensor zero point adjusting mechanism.

Specifically, when t=tA for example, the human power driving force value used for motor control is a value obtained by subtracting T0 which is held as the zero point value L0 from the output voltage of the torque sensor at the time, namely TA.

Figure 41:
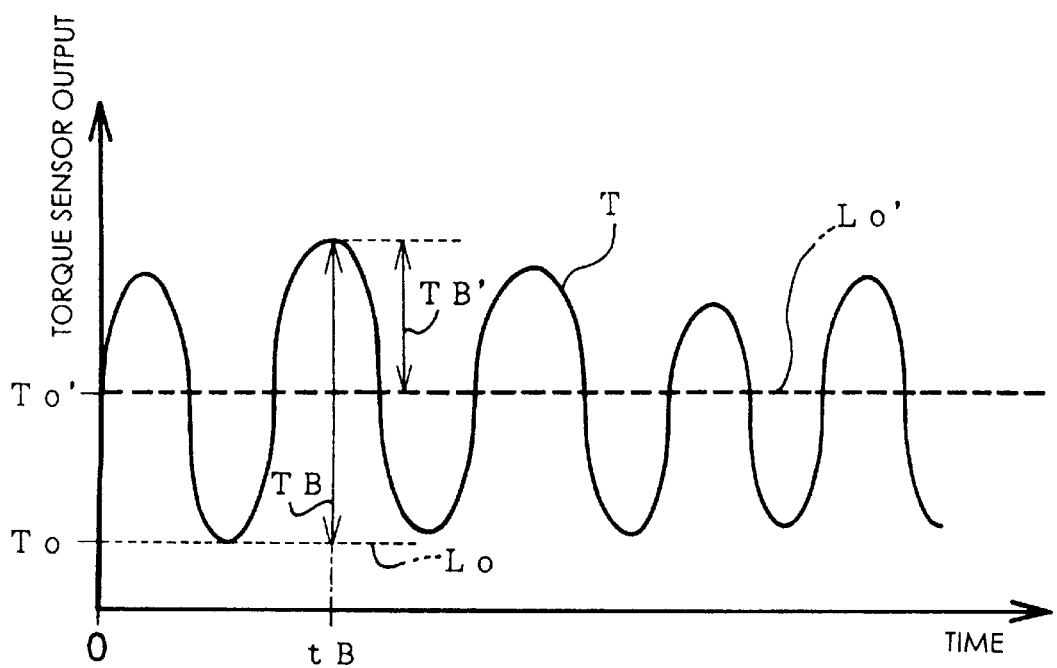
FIG. 41 is a diagram showing the operation of the torque sensor zero adjusting mechanism according to a first embodiment of the torque sensor zero adjusting mechanism of the invention.

FIG. 41 is an explanatory diagram of the operation when the power is turned on with some human power applied by the user intentionally at t=0.

In this case, the output voltage T0' from the torque sensor with the human power at t=0 applied is held as the zero point value L0', which is used for compensation.

Therefore, as the human power driving force when t=tB, the value TB' obtained by subtracting T0' with the zero point value L0' from the voltage value of the torque sensor at the time is outputted, and this value TB' is used for the motor control.

In this case, however, as more accurate zero point value L0, there is an output voltage T0 of the torque sensor which is lower than it, and by subtracting this T0 from the output voltage of the torque sensor when t=tB, correct human power driving force TB is obtained.

Therefore, TB' to be outputted becomes smaller than actual value TB, but since the electric bicycle is so configured that the driving force having the same magnitude as the human power driving force detected here is added for compensation by the motor, the motor driving force for assisting the human power becomes small, and the electric bicycle can be prevented from falling in a risky state, such as running without being controlled.

Besides, even when the user turns on the power with the human power applied to some extent, the zero point value is set in the same way and the electric bicycle can be prevented from falling in a dangerous state. In other words, in a conventional zero point compensating mechanism, in response to a relatively high human power, a relatively large motor assistance is added suddenly, so that a running balance during running is lost, and if the electric bicycle is stationary, it may start suddenly. But, this embodiment can prevent such situations because the operations are performed as described above.

In this type of electric bicycle, however, the mechanical structure of the torque sensor locks or wiring for sending the detection signal of the human power torque causes a short, possibly leading to the occurrence of a trouble that a signal indicating the entry of human power torque is always outputted. In such a case, as shown in FIG. 42(*a*), the human power detection value (indicated by the broken line) detected by the torque sensor becomes a constant value regardless of the input state of the human power torque (indicated by the solid line).

As a result, auxiliary output is continuously outputted from the driving force auxiliary means and a predetermined motor auxiliary output is always added, so that the electric bicycle is not in the state that the human power is assisted but in the state that it runs by itself contrary to the user's will. Especially, when a stationary electric bicycle is in such a troubled state and the human power assisting operation is started, the electric bicycle starts suddenly regardless of whether the user is on it or not. Therefore, this violates the conceptual control of the electric bicycle, the bicycle may start to move suddenly, the brakes do not operate properly, resulting in very dangerous states in view of safety.

And, even when such a trouble does not occur, if the smooth operation of the torque sensor is hindered, the motor's auxiliary drive control is not performed smoothly, and the user's comfortable feeling of running may be degraded by the assisted driving.

For example, when a movable mechanical part in the torque sensor is in a semi-fixed state (a movable part or various movable members on the route to the pertinent movable part are in a state of slowed mechanical moving such as shifting/rotating), the movable part can not follow quickly the reduction of the human power entered, causing a problem that the human power detection value is different from reality. Specifically, if the human power torque lowers but the movable part cannot follow to return to the initial position where the human power torque has not been entered and the next human power torque is entered while the movable part is still on its way back to the initial position, the human power detection value detected by the torque sensor has a sawtooth waveform which does not lower to below a certain value as shown by the broken line in FIG. 42(b), the electric bicycle runs partly by itself and the auxiliary output of a sawtooth form is added from the auxiliary driving means. Therefore, the user has a feeling of strangeness.

Figure 42A:
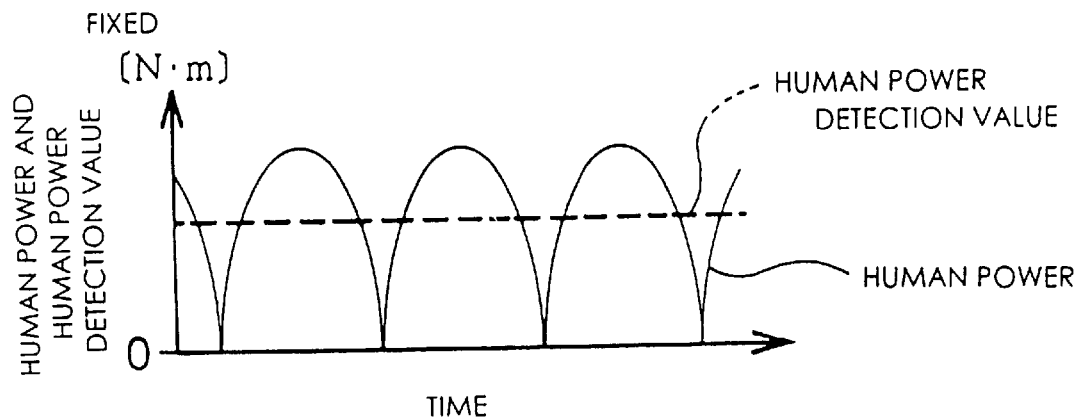
FIG. 42 illustrates mechanically defective states caused in the torque sensor used for a general electric bicycle, showing graphs of the relation between the human power and detected values in a state (a) that a movable part of a detection mechanism is stuck, a semi-stuck state (b), and a state (c) that a foreign material is caught in the detection mechanism.
Figure 42B:
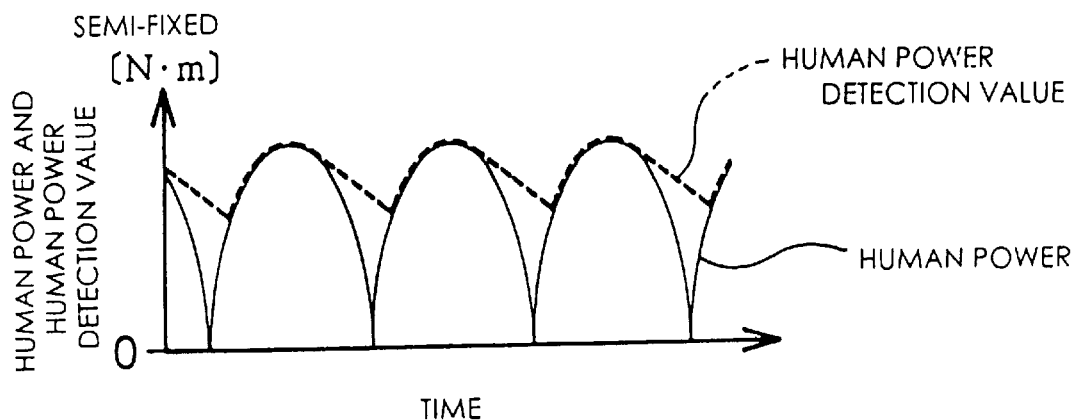
Figure 42C:
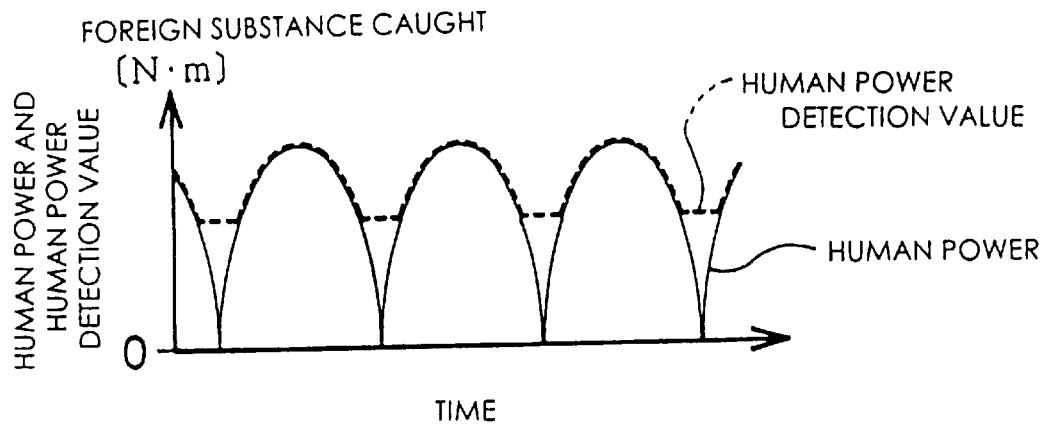

Even when the torque sensor operates smoothly, if a foreign substance is caught in mechanically movable parts and a movable part cannot completely return to the initial position where the human power torque has not been entered because the human power torque lowers, the human power detection value outputted by this torque sensor does not lower to below a certain value as indicated by the broken line in FIG. 42(c), and the same trouble takes place. And, in such a case, even when the user stops entering the human power torque, the human power detection value from the torque sensor does not lower to below a certain value, resulting in the same state as indicated by FIG. 42(a), and the vehicle runs by itself.

But, since this embodiment makes always the zero point setting at the start of operation for the torque sensor which has such a mechanical trouble, the electric bicycle can be prevented from running by itself, and a feeling of strangeness can be decreased though the human power assisting ratio is lowered.

Specifically, even when a predetermined human power value is always outputted from the torque sensor due to a mechanical or wiring trouble of the torque sensor, since this embodiment adopts a predetermined human power value as the zero point value, the human power value which is used for the human power assisting control corrected by the zero point value becomes zero, and the motor assistance is not performed, so that the self-running can be prevented without fail. Therefore, since the self-running can be prevented, a sudden start can be prevented in the same way, and the braking during running is not disturbed, thus safety can be secured satisfactorily.

And, even when a movable mechanical part in the torque sensor is in a semi-fixed state and the human power value of a sawtooth waveform which does not lower to below a certain value is outputted from the torque sensor, at least the minimum value is adopted in the same manner as the zero point value among the sawtooth waveforms, so that self-running can be prevented without fail, safety can be secured, a motor assisting ratio with respect to the sawtooth waveform is lowered, thus a feeling of strangeness can be decreased.

Besides, when a foreign substance is caught in mechanically movable parts of the torque sensor and the human power value of a mountain waveform not lowering to below a predetermined value is outputted from the torque sensor, at least the minimum value is adopted as the zero point value from the mountain waveforms, so that self-running can be prevented without fail, safety can be secured, a motor assisting ratio with respect to the mountain waveform is lowered, thus a feeling of strangeness can be decreased.

As described above, according to the first embodiment of the torque sensor zero point adjusting mechanism of the driving force auxiliary device, when the power is turned on for the first time to start the operation of the electric bicycle, the human power torque value first detected by the torque sensor is adopted as the zero point compensation value, so that the electric bicycle can be prevented from self-running and the cost can be reduced.

Specifically, without using a mechanical adjusting mechanism or electrical adjusting element as the torque sensor zero point adjusting mechanism, and without adjusting at the time of assembling, adjustment is automatically performed when the power is turned on every time the electric bicycle is started to operate.

Therefore, a value detected when the torque sensor has operated for the first time is adopted as the zero point compensation value. This zero point compensation value is used to compensate the human power torque detected by the torque sensor, safety against illegal modification to effect self-running can be improved. Specifically, even if the mechanically movable parts of the torque sensor are always fixed at the position state entered by the human power to modify, a wrong input position state is reset as the zero point position by the zero point adjusting mechanism of this embodiment. Therefore, the bicycle can be prevented from running by itself.

And, since a dedicated mechanical adjusting mechanism or electrical adjusting element is not required, the number of parts can be decreased and the cost for parts can be reduced, the adjusting step in assembling is not needed and the number of steps can be decreased, and productivity can be improved. And, the assembling cost can be reduced and cost efficiency can be improved.

Besides, even if the properties of the torque sensor were changed with time, automatic zero point adjustment is performed every time the bicycle is started to use, and any adverse effect due to the changes with time can be avoided. Similarly, since the user or the like is not required to readjust, handling can be made easily.

Furthermore, even if the torque sensor itself has a mechanical trouble, it is possible at least to prevent the electric bicycle from running by itself or running without being controlled. Specifically, even when a wiring or mechanical trouble is caused in the torque sensor and the detection value from the torque sensor does not lower to below a predetermined value regardless of the entered state of the human power, at least this predetermined value or more can be adopted as the zero point adjusting value. Therefore, the electric bicycle can be prevented from running by itself without fail, and since its self-running against the user's will can be prevented, safety can be secured satisfactorily and completeness of the electric bicycle can be enhanced.

And, even if the user operates to turn on the switch for starting the human power assistance with a relatively large human power entered at the driver's will or in error, this relatively large human power at the start is adopted as the zero point value, the application of sudden large motor assisting drive is prevented, and the electric vehicle is prevented from making a sudden acceleration or sudden start, enabling to improve safety.

Now, description will be made of a second embodiment of the torque sensor zero point adjusting mechanism of the drive force auxiliary device with reference to FIG. 43 and FIG. 44. The zero point adjusting mechanism in this embodiment is the achievement of the functional operation of the adjusting mechanism in the first embodiment by a software program. The torque sensor zero point adjusting mechanism in this embodiment digitizes the human power value signal detected by the torque sensor, and the digitized human power value signal is compensated by a microprocessor using the processing program having the same function as in the first embodiment.

Figure 43:
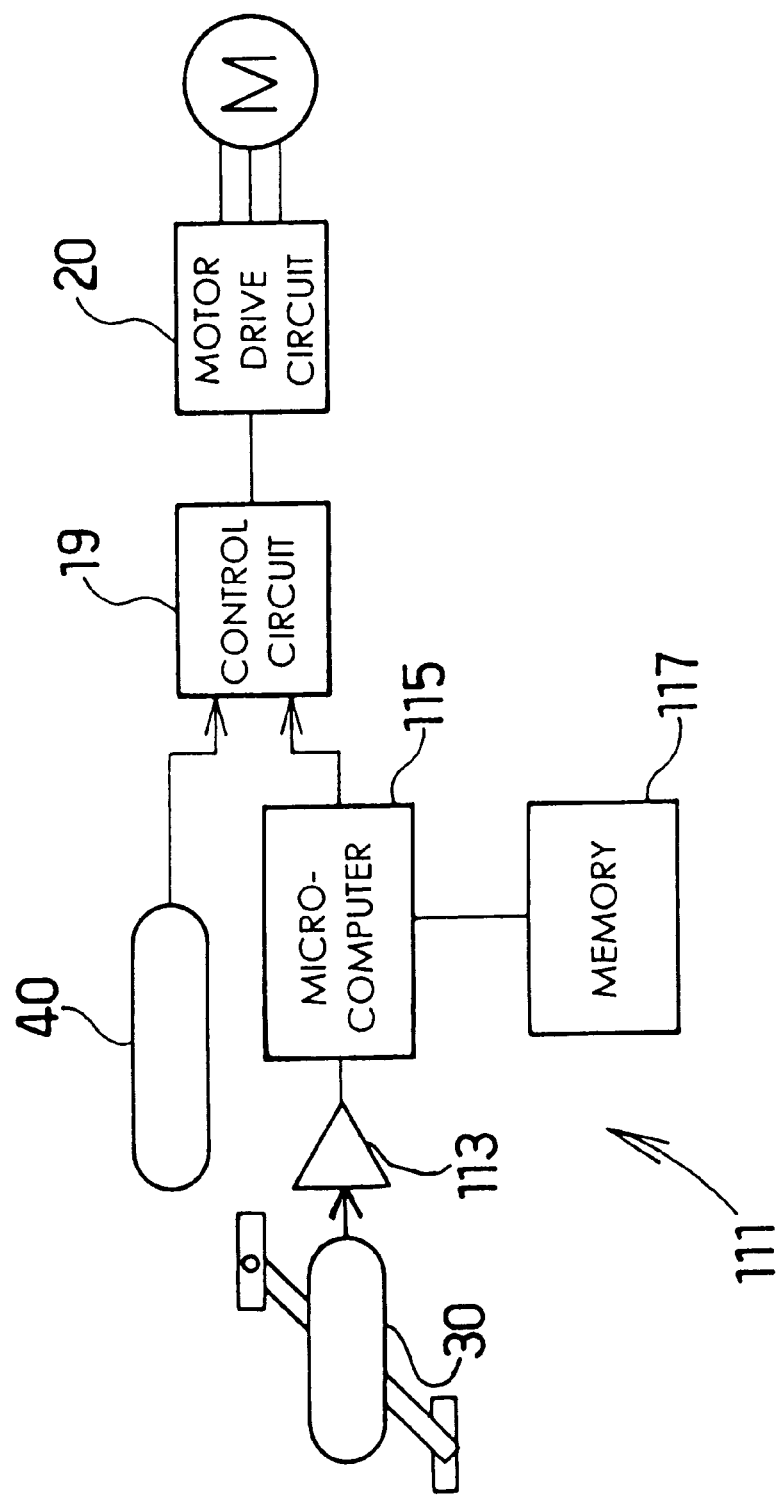
FIG. 43 is a circuit block diagram showing the structure of a second embodiment of the torque sensor zero adjusting mechanism of the invention.

Specifically, as shown in the circuit block diagram of FIG. 43, a circuit 111 for making the adjusting operation by this software, in the same manner as in the first embodiment, is disposed between the torque sensor 30 and the control circuit 19, and when the power switch 8a (not shown) is turned on, its operation is started.

This circuit 111 comprises an A/D converter 113 which is connected to the output terminal of the torque sensor 30, a microprocessor 115 which is connected to the output terminal of the A/D converter 113, and a memory 117 which is connected to the microprocessor 115. And, the output terminal of the microprocessor 115 is connected to the control circuit 19 which controls the auxiliary output of the motor M.

The A/D converter 113 converts the analog detection signal outputted from the torque sensor 30 into a digital signal and enters it into the microprocessor. In other words, the detection signal of the torque sensor 30 has a voltage at a level corresponding to the human power torque, this voltage is converted by the A/D converter 113 into a digital signal which is expressed in a numerical value by a predetermined number of quantized bits, enabling to process in a programing fashion.

And, this microprocessor 115 is a microprocessor having a general predetermined calculating performance, and this microprocessor has I/O ports to receive an external signal and to output the processed signal outwards and connected to the memory 117 through a special memory bus line.

In addition, this memory 117 comprises a read only memory in which the processing program of this embodiment is stored in advance and a random access memory which holds variable data of variables for program computation.

Therefore, the human power value signal detected and outputted from the torque sensor 30 is converted into a digital signal by the A/D converter, then entered into the microprocessor 115. This microprocessor 115 uses a program or data stored in the memory 117 to compensate the digitized human power value signal, and based on the compensated human power value signal, the control circuit 19 controls the motor auxiliary output.

Figure 44:
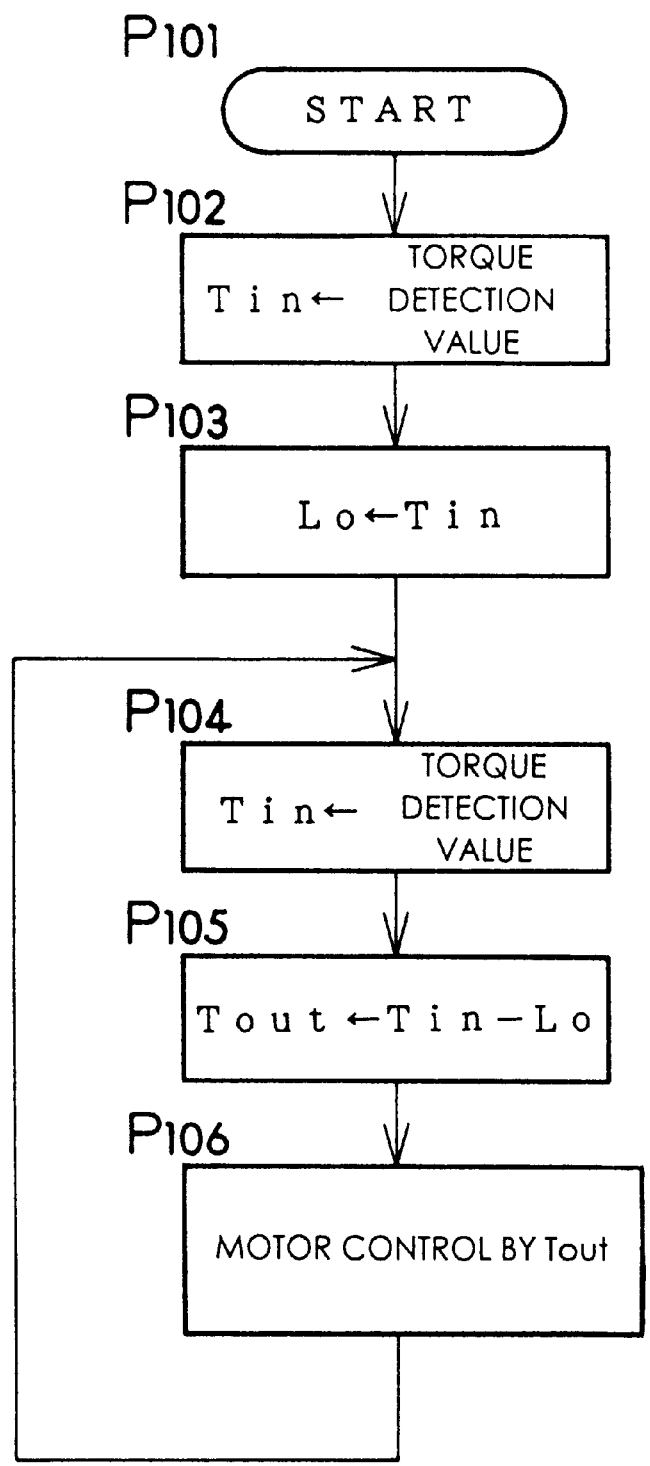
FIG. 44 is a flowchart used in a program for achieving the operation of the second embodiment of the torque sensor zero adjusting mechanism of the invention.

FIG. 44 is a flowchart showing the operation of a program to perform the zero point adjustment by the circuit shown in FIG. 43.

The microprocessor 115 shown in FIG. 43 executes the program operation according to the flowchart shown in FIG. 44 to perform the zero point adjusting operation in the same manner as the circuit shown in FIG. 43.

In step P101 of the flowchart shown in FIG. 44, when the user turns on the power switch 8a to start the human power auxiliary device, the circuit of the torque sensor zero point adjusting mechanism is in an operating state at the same time, and the program is started to be executed.

In other words, immediately after turning on the power, the initializing process comprising step P102 and step P103 is performed.

First, a human power torque value Tin just after turning on the power detected by the torque sensor 30 is obtained in step P102.

Then, the obtained human power torque value Tin is held as the zero point value in variable L0 in step P103.

And, subsequent steps P104 to P106 are in a main loop for compensating the detected human power torque value by the zero point value L0 held at the start of operation, and this program continues this loop processing until the power is turned off by the user.

In step P104, the human power torque value Tin detected by the torque sensor 30 at the present time is obtained.

Then, in step P105, the zero point value L0 is subtracted from the human power torque value Tin, and the compensated torque output value Tout with the zero point value L0 as a reference value is calculated.

Lastly, in step P106, the output control of the motor M is performed based on the compensated torque output value Tout and various sensor values, and the process returns to step P104.

When the microprocessor has been used as the running control circuit of the electric bicycle and still has an allowance in processing performance, it may be configured to have this microprocessor for performing the processing of this embodiment. And, this can also be applied to fourth, sixth and eighth embodiments in which the circuit structures to be described afterwards are achieved by a software program. Therefore, wiring and circuit structures can be simplified, and it is advantageous in view of a required space, reliability and costs.

As described above, the zero point adjusting mechanism in this embodiment has the same effects as the first embodiment and digitizes the human power signal detected by the torque sensor and compensates in the same way the digitized human power signal by a software program, thereby capable of flexibly dealing with in case of a design change or a change in human power assisting ratio.

Specifically, if a size or a motor output of the bicycle is changed, the motor output can be controlled appropriately by simply changing the program without modifying the attached circuit.

And, since such a program is stored in the read only memory to make it difficult to read or change the program and data, protection against illegal modifications for self-running can be improved further more.

Description will be made of a third embodiment of the torque sensor zero point adjusting mechanism of the drive force auxiliary device with reference to FIG. 45 and FIG. 46.

The zero point adjusting mechanism in this embodiment keeps always to compare the held zero point value and the human power torque value detected at the present time, and if the human power torque value is smaller than the previous zero point value, adopts this human power torque value as the zero point value for the torque sensor.

In the same manner as in the first embodiment, this zero point adjusting mechanism is achieved by a circuit. A circuit 121 comprises by adding mainly a comparator 123, which compares the previous zero point value held in the zero point holding circuit 103 and the present human power torque value as a candidate for a new zero point value and lets the zero point holding circuit 103 perform the holding operation newly, to the circuit 101 in the first embodiment as shown in FIG. 45.

When the power is turned on to start the operation of the electric bicycle and this circuit, in the same way as in the first embodiment, the detection value detected by the torque sensor immediately after turning on the power is held as the zero point value by the zero point holding circuit 103, and this initial detection value is temporarily used for controlling. And, this is applied to a fifth embodiment and a seventh embodiment to be described afterwards.

Figure 45:
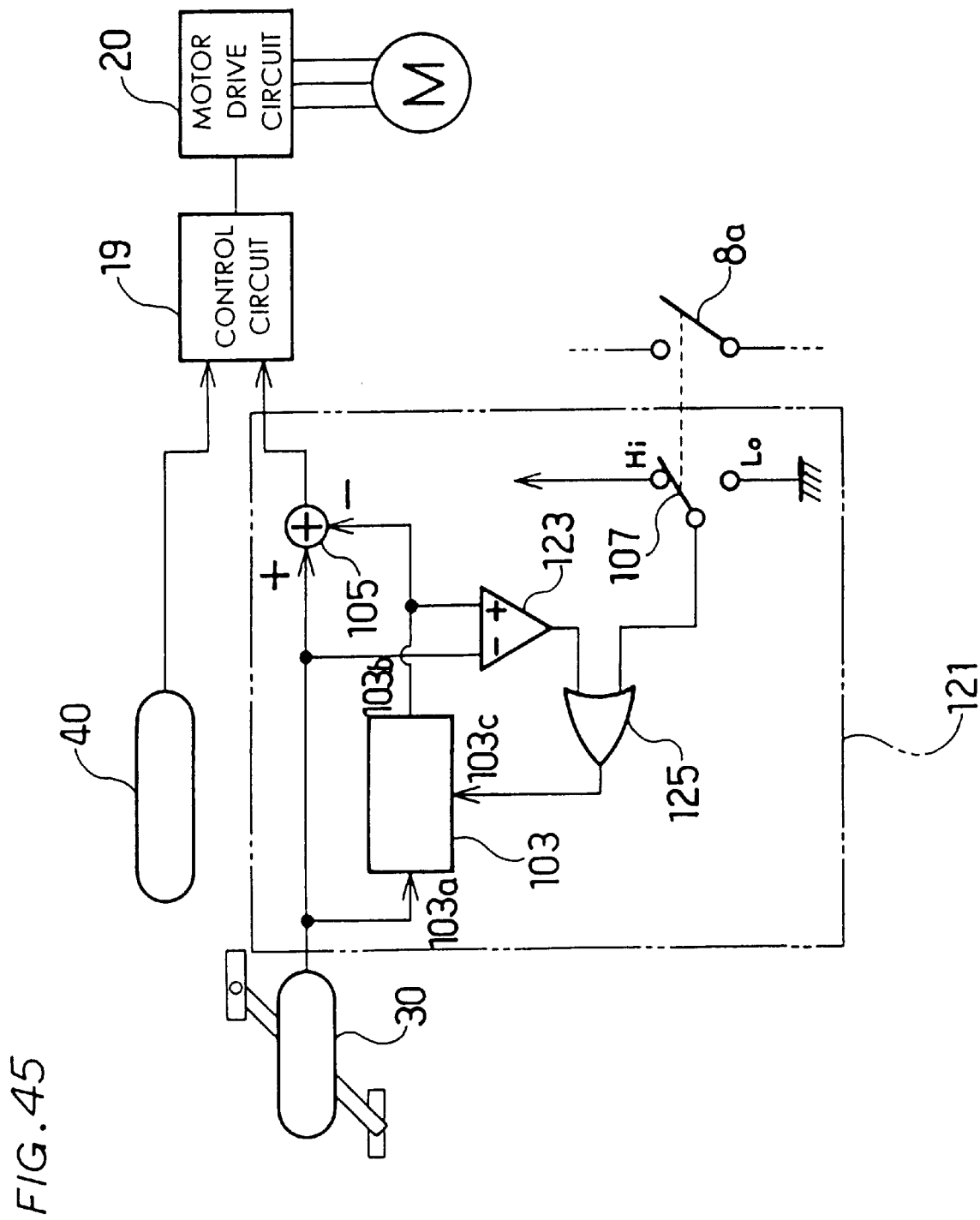
FIG. 45 is a circuit block diagram showing the structure of a third embodiment of the torque sensor zero adjusting mechanism of the invention.

The circuit 121 shown in FIG. 45 comprises the zero point holding circuit 103, the adder-subtracter 105, and the interlock switch 107 arranged in the same manner as the circuit structure shown in FIG. 39, to which added are the comparator 123 and an OR logic element 125 which combines the operation signal from the comparator 123 and the operation signal from the interlock switch 107 into a single operation signal.

And, a signal to be entered into the hold input terminal 103c of the zero point holding circuit 103 is newly added and produced by comparing the human power torque value signal from the torque sensor 30, namely the human power torque value signal to be entered into the input terminal 103a of the same zero point holding circuit 103 and the output signal from the zero point holding circuit 103 are compared by the comparator 123.

The negative input terminal of the comparator 123 is connected to a signal line connected to the control circuit 19 from the output terminal of the torque sensor 30, and this connected point is determined to be at the midpoint between a branch point on the same signal line for branching to the input terminal 103a of the zero point holding circuit 103 and the adder-subtracter 105 disposed on the same signal line. And, the positive input terminal of the comparator 123 is connected to the mid point of the connection line for connecting the output terminal 50 of the zero point holding circuit 103 and the negative input terminal of the adder-subtracter 105. Besides, the output terminal 123a of the comparator 123 is connected to one of the input terminals of the OR logic element 125.

And, similarly, the output terminal of the interlock switch 107 interconnected with the power switch 8a is connected to the other input terminal of the OR logic element 125, and the output terminal of the OR logic element 125 is connected to the hold input terminal 103c of the zero point holding circuit 103. This OR logic element 125 performs the OR logical comparison between the output signal of the comparator 123 and the output signal of the interlock switch 107 to enter a single operation signal into the zero point holding circuit 103.

And, when a reference value entered into the positive input terminal is larger than or equal to a comparison value entered into the negative input terminal, comparison by this comparator 123 does not hold, and the comparator 123 outputs a high-level signal from its output terminal. On the other hand, when the input value of the positive input terminal is smaller than the input value of the negative input terminal, the comparison holds, and the comparator outputs a low-level signal from its output terminal.

Therefore, as the output operation of the comparator 123, when the torque sensor 30 detects newly and the human power torque value same as one entered into the input terminal 103a of the zero point holding circuit 103 is larger than (or equal to) the zero point value already held by the holding circuit 103 and outputted from the output terminal 103b, a high-level signal for keeping the operation is outputted, and when it is smaller, a signal changing from a high level to a low level to perform a holding operation newly is outputted to the holding circuit 103.

And, as to the associated operation of the zero point holding circuit 103, after the power is turned on and until the power switch 8a is turned off and until a hold signal for resetting the zero point value is newly entered, the detection signal held in the zero point holding circuit 103 is outputted from the output terminal 103b. And, when the power is turned on, this zero point holding circuit 103 holds as the zero point value the detection signal detected and outputted by the torque sensor 30 at the moment the power switch 8a is turned on, in the same way as in the first embodiment.

Specifically, when the power is turned on, the comparator 123 continues to output the low-level signal, but the interlock switch 107 outputs a signal which varies from the high level to the low level when the power switch 8a is turned on, and these signals are entered into the OR logic element 125. Therefore, the signal variable from high to low levels outputted from the interlock switch 107 is outputted from the OR logic element 125 according to the OR logic, and this signal is entered into the hold input terminal 103c of the zero point holding circuit 103. And, the zero point holding circuit 102 operates to hold.

In addition, it may be configured that the zero point holding circuit 103 holds a previously determined value at the start of operation by turning on the power.

And, after turning on the power, when the detection value from the torque sensor 30 is larger than the zero point value held by the zero point holding circuit 103, the zero point holding circuit 103 continues to output the zero point value which it holds, and when the detection value from the torque sensor 30 is smaller than the zero point value held by the zero point holding circuit 103, the detection value from the torque sensor 30 is newly held as the zero point value.

In this resetting operation of the zero point value, the comparator 123 compares and determines that the detection value from the torque sensor 30 is smaller than the zero point value being outputted from the zero point holding circuit 103. And, the output signal from the comparator 123 is changed from the high level to the low level and outputted. Then, since the low-level signal is continuously entered from the interlock switch 107 to one of the input terminals of the OR logic element 125 which is connected to the lower part of the comparator 123, the output signal from the comparator 123 becomes main, and the signal which changes from the high level to the low level is outputted from the OR logic element 125 to the hold input terminal 103c of the zero point holding circuit 103. As a result, the zero point holding circuit 103 operates to hold the detection value which is being entered from the torque sensor 30 into the input terminal 103a as a new zero point value, and this reset zero point value is outputted from the zero point holding circuit 103 and used for compensation.

By the operation described above, the detection signal from the torque sensor 30 is compensated, and the zero point value to be used for calculating the torque value signal Tn can be always determined to be the minimum output value obtained from the torque sensor 30.

Now, description will be made of the operation of the torque sensor zero point adjusting mechanism formed of the circuit 121 described above.

Figure 46:
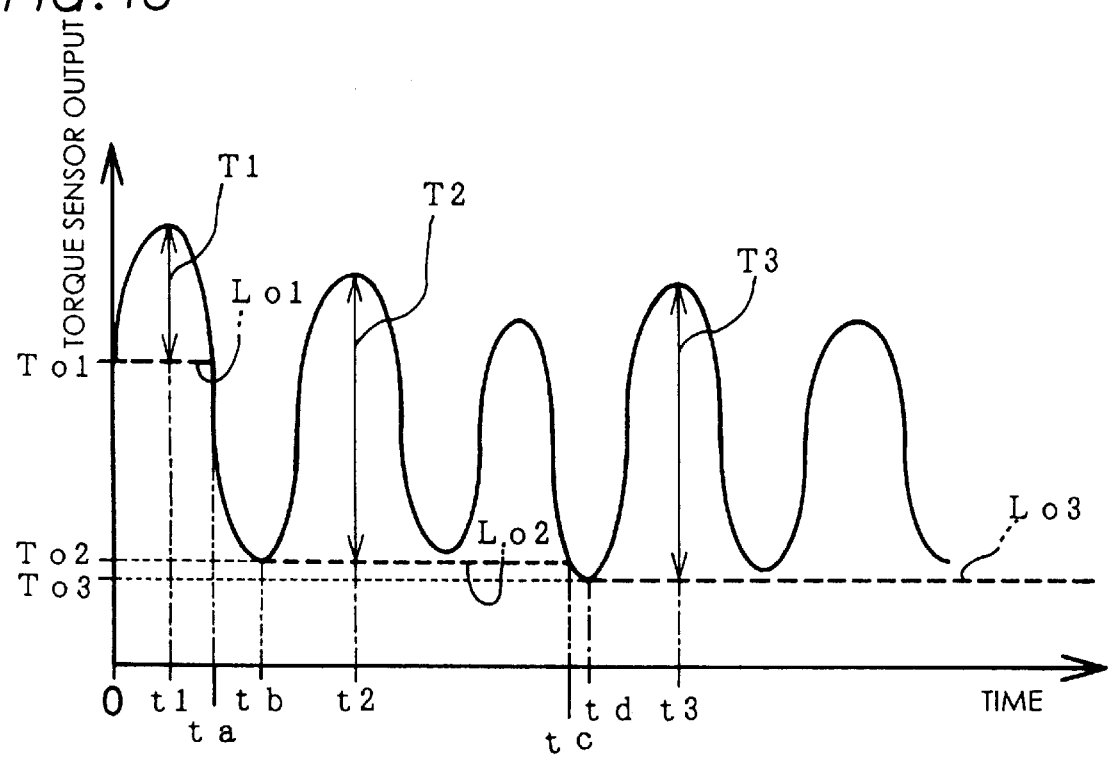
FIG. 46 is a graph illustrating the operation of the torque sensor zero adjusting mechanism according to the third embodiment of the torque sensor zero adjusting mechanism.

FIG. 46 shows the waveform of a signal outputted from the torque sensor which has detected the human power entered by the user through the pedals in the same way as in the first embodiment. While the human power auxiliary device is operating, the minimum value of the output voltage of the torque sensor is always kept and adopted as the zero point value to perform the correction processing.

Specifically, when time t=0, the power switch 8a for starting the operation of the human power auxiliary device is turned on, and the human power of the user has been entered into the electric bicycle through the pedals, and the input condition of the human power shall be that the rotation position of the pedals is in the neighborhood of a substantially horizontal position and in the state that the human power input is increasing to the maximum value.

And, output voltage value T01 of the torque sensor just after turning on the power is held, and this value T01 is used for correction as the zero point value L01 when t=t0 to ta.

Specifically, when t=t1 for example, the human power drive force is a value T1 obtained by subtracting the zero point value L01 from the detection voltage detected and outputted by the torque sensor.

This T1 is a small value as compared with an actual human power drive force, but when t=ta to tb, the output voltage of the torque sensor continues to lower to below the zero point value L01 and renewed successively. When t=tb at the lowest point, an output voltage value T02 is newly stored and held as a new zero point value L02, and this zero point value L02 is used for correction. Therefore, the human power drive force at t=t2 is T2.

This T2 is also a value smaller than the actual human power drive force, but the output voltage of the torque sensor continues to lower to below the zero point value L02 at t=tc to td, and when t=td again, output voltage value T03 is re-held as a zero point value L03, and this zero point value L03 is used for correction. Therefore, the human power drive force at t=t3 becomes T3, and after that, the output voltage of the torque sensor does not lower to below the held zero point value L03, and L03 is determined as a final zero point value.

Accordingly, the detection accuracy and reliability of the torque sensor can be improved by adopting a more accurate zero point value, and according to the improvement of such elements, performance of controlling running of the electric bicycle itself can also be improved.

As described above, by the zero point adjusting mechanism in this embodiment, the same effects as in the first embodiment can be obtained, and among the human power torque values detected by the torque sensor in action, the minimum value is adopted as a new zero point value, so that a more accurate zero point value can be obtained and running control as the electric bicycle can be optimized. For example, even if the zero point value adopted at the time of initially turning on the power is incorrect, it can be renewed to a more accurate zero point value by comparing the zero point value with the minimum detection value detected by the torque sensor later.

And, in case that the torque sensor has a mechanical trouble and malfunctions, safety can be secured satisfactorily, and in this case, even when the user remedies the trouble without turning off the power, a zero point value which corresponds to the torque sensor which operated properly can be newly set automatically, and handling can be improved. In other words, when the torque sensor is mechanically in a semi-fixed state or its follow-up operation to return to the no-entry state is delayed, a self-running state can be prevented without fail, and when such a trouble in the torque sensor is remedied naturally or at will, the zero point value is reset automatically.

Now, description will be made of a fourth embodiment of the torque sensor zero point adjusting mechanism of the drive force auxiliary device with reference to FIG. 47. In the same way as in the second embodiment, the zero point adjusting mechanism in this embodiment is the achievement of the functional operation of the adjusting mechanism in the third embodiment by a software program.

In this embodiment and a sixth embodiment and an eighth embodiment to be described afterwards use the same circuit as the one shown in FIG. 43 and used in the second embodiment, and its description will be omitted.

Figure 47:
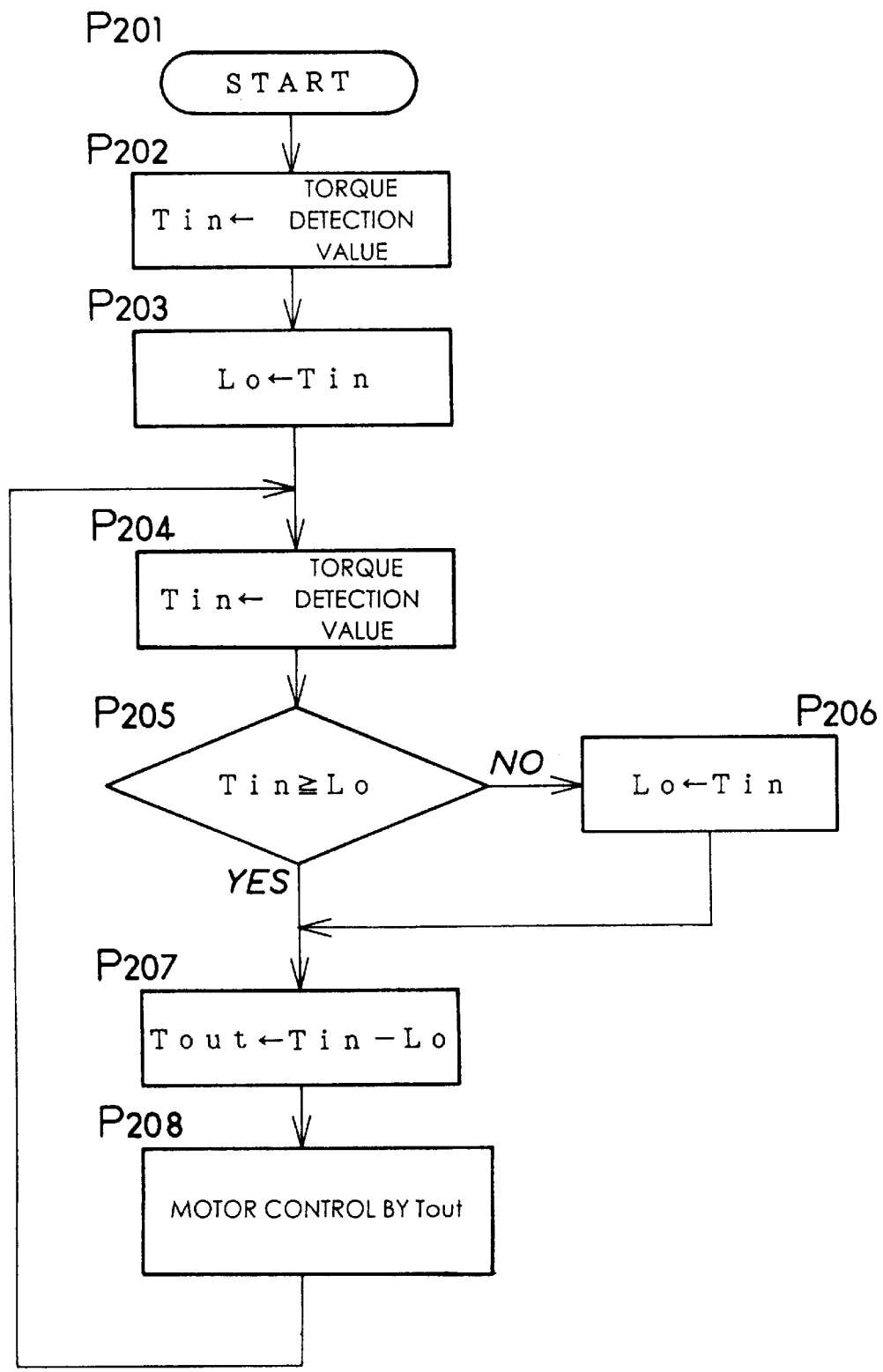
FIG. 47 is a flowchart used in a program for achieving the operation of a fourth embodiment of the torque sensor zero adjusting mechanism of the invention.

FIG. 47 is a flowchart showing the steps of a software needed in achieving the circuit of the structure shown in FIG. 45 by using the circuit shown in FIG. 43.

In step P201 shown in FIG. 47, when the user turns on the power switch 8*a* to start the human power auxiliary device, the circuit of the torque sensor zero point adjusting mechanism is in an operating state at the same time, and this program is started to be executed.

When the power is turned on, the initializing process is made in the same way as in the second embodiment. The torque input value Tin just after turning on of the power is obtained in step P202. And, the obtained Tin is held as the zero point value in variable L0 in step P203.

And, subsequent steps P204 to P208 are in a main loop for determining whether the zero point value L0 held at the operation start shall be reset newly and correcting the detected human power torque value by the zero point value L0 held or renewed, and this program continues this loop processing until the power is turned off by the user or the like.

In step P204, the human power torque value Tin at the time it is detected by the torque sensor is obtained.

Then, in step P205, the zero point value L0 being held and the newly detected human power torque value Tin are compared, and it is determined whether the zero point value L0 is renewed or not.

In other words, when the human power torque value Tin is equal to or larger than the zero point value L0, it is decided that the zero point value L0 is not renewed, and the process goes to step P207.

And, when the human power torque value Tin is smaller than the zero point value L0, it is decided that the zero point value L0 is renewed, and the process goes to step P206. In step P206, the human power torque value Tin is held and renewed as a new zero point value L0, and the process goes to step P207.

In step P207, the zero point value L0 which is held or renewed in the same way as the previous embodiment is subtracted from the human power torque value Tin, and the corrected torque output value Tout with the zero point value L0 as a reference is calculated.

Lastly, in step P208, the output control of the motor M is performed based on the corrected torque output value Tout and various sensor values, and the process returns to step P204.

As described above, the zero point adjusting mechanism in this embodiment has the same effects as the third embodiment and achieves the processing contents of the third embodiment by a software program in the same way as the second embodiment, so that even if various conditions are changed, it is possible to flexibly apply by simply changing the program.

Now, description will be made of a fifth embodiment of the torque sensor zero point adjusting mechanism of the drive force auxiliary device with reference to FIG. 48 and FIG. 49.

The zero point adjusting mechanism in this embodiment holds a plurality of minimum values among detection values outputted from the torque sensor in a predetermined period, and adopts the average of them as the zero point value of the torque sensor.

Figure 48:
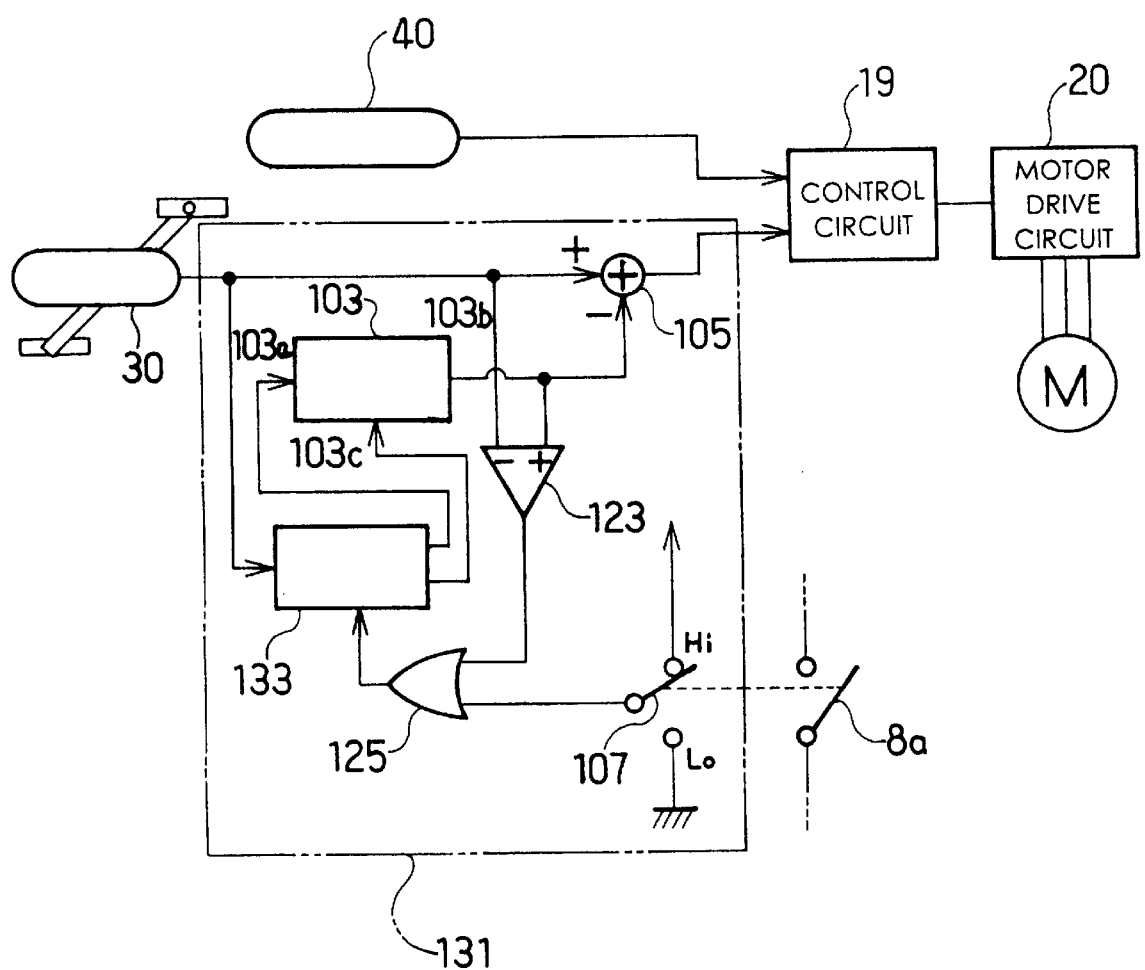
FIG. 48 is a circuit block diagram showing the structure of a fifth embodiment of the torque sensor zero adjusting mechanism of the invention.

As shown in FIG. 48, a circuit 131 for achieving this zero point adjusting mechanism comprises by adding to the circuit structure of the third embodiment an arithmetic unit 133 which stores and holds a predetermined number of minimum values which become a candidate for a zero point value compared and determined by the previous comparator and calculates the average of these stored and held plurality of minimum values.

The circuit 131 shown in FIG. 48 comprises the zero point holding circuit 103, the adder-subtracter 105, the interlock switch 107, the comparator 123 and the OR logic element 125 arranged in the same manner as the circuit 121 shown in FIG. 45, and next to the OR logic element 125 there is added the arithmetic unit 133 which stores and holds the minimum values among the detection values detected and outputted by the torque sensor 30 based on the hold operation signal outputted from the OR logic element 125, calculates the average of these stored and held plurality of minimum values, outputs the average value to the zero point holding circuit 103 and also outputs a command to the zero point holding circuit 103 to let it perform the holding operation.

This arithmetic unit 133 has an operation input terminal which receives the arithmetic operation signal, a data input terminal which receives a detection value to be calculated, an operation output terminal which outputs a command signal to make the zero point holding circuit 103 operate to hold, and a data output terminal which outputs a calculated value to be held by the zero point holding circuit 103.

And, the operation input terminal of the arithmetic unit 133 is connected to the output terminal of the OR logic element 125, its data input terminal is connected to a line branched from the signal line connected from the output terminal of the torque sensor 30 to the control circuit 19, its operation output terminal is connected to the hold input terminal of the zero point holding circuit 103, and its data output terminal is connected to the input terminal of the zero point holding circuit 103.

In this embodiment, the input terminal of the zero point holding circuit 103 is connected to the data output terminal of the arithmetic unit 13 and not connected to the output line of the torque sensor 133.

And, this arithmetic unit 133 is designed to start the arithmetic output operation when the input state of its operation input terminal changes from a high level to a low level. And, the arithmetic output operation of the arithmetic unit 133 first stores and holds the value entered into the data input terminal, counts the number of the stored and held values, and when the number reaches a predetermined level, totals these stored and held values, and divides the total value by the number of data to obtain the average value. The arithmetic unit 133 outputs the calculated average value from its data output terminal, and also outputs from the operation output terminal a command signal to make the zero point holding circuit 103 perform the holding operation. And, when the number of data exceeds a prescribed level, the arithmetic unit 133 stops at least the commanding operation from the operation output terminal.

Therefore, in the same way as in the third embodiment, when the detection value from the torque sensor 30 is larger than the zero point value previously held in the zero point holding circuit 103, the zero point holding circuit 103 continues outputting its zero point value. But, when the detection value from the torque sensor 30 is smaller than the zero point value previously held in the zero point holding circuit 103, this detection value is stored and held by the arithmetic unit 133 until the number reaches a predetermined level, the average value of the detection values is calculated, and the average value is newly held as a zero point value.

And, since the predetermined period is determined to be a period for obtaining the minimum values obtainable from the torque sensor 30 become a predetermined number, so that according to the running conditions of the electric bicycle, this predetermined period is variable. Specifically, when the electric bicycle runs at a relatively low speed and the pedal input cycle by the user is long, the period until the predetermined number of minimum values is obtained becomes long. But, when the electric bicycle runs at a high speed and the pedal input cycle is short, the period until the predetermined number of minimum values is obtained becomes short. Therefore, when the electric bicycle is running at a high speed or accelerating, the zero point value is determined in a relatively short time, and running control can be made stably according to the running conditions.

By the operation described above, the zero point value at the time of calculating the torque value signal Tn by correcting the detection signal from the torque sensor 30 can be made the average value calculated from the predetermined number of minimum output values outputted from the torque sensor 30.

After starting the operation by turning on the power switch 8a, the detection value of the torque sensor 30 immediately after turning on the power is adopted as the zero point value, and after that, this zero point value is used until minimum values are obtained for a predetermined quantity. Therefore, since this initial detection value is used as the zero point value, the same effects as in the first embodiment can be obtained, and control does not become unstable when the auxiliary control is started, and stable running of the electric bicycle can be secured. And, this initially adopted zero point value is not included in data for calculating the average number or the number of data.

Description will be made of the operation of the torque sensor zero point adjusting mechanism formed of the circuit described above.

It is assumed that the number of data for controlling is two in this operation description.

Figure 49:
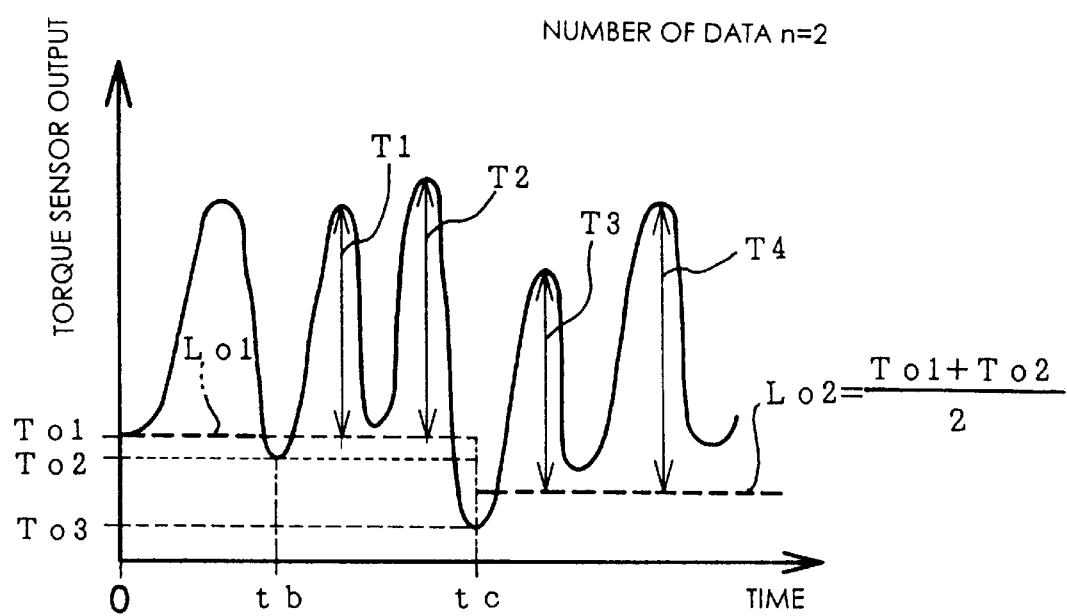
FIG. 49 is a graph illustrating the operation according to the fifth embodiment of the torque sensor zero adjusting mechanism of the invention.

As shown in FIG. 49, when the user turns on the power switch 8a, the human power auxiliary device is started to operate, the output voltage value of the torque sensor immediately after the power is turned on is stored and held as the zero point value L01, and this zero point value L01 is used for correction of the detection value Tn outputted by the torque sensor until a new zero point value is reset.

And, when the detection value T02 from the torque sensor is smaller than the zero point value L01 at tb, it is counted as the number of data, and the detection value T02 is stored.

And, when the detection value T03 from the torque sensor is smaller than the zero point value L01, it is counted as the number of data, and the detection value T03 is stored.

Besides, when a total of the number of data becomes a predetermined quantity (2), the average value of the stored detection values T02, T03 is calculated, and this average value is adopted as a new zero point value L02. Then, this zero point value L02 is used to correct the detection value Tn detected by the torque sensor until the human power assisting control is stopped.

Thus, a more accurate zero point value is adopted to correct the human power detection value, so that the detection accuracy and reliability of the torque sensor can be improved, and performance of controlling the running of the electric bicycle itself can also be improved owing to the improvement of such elements.

In this embodiment, the period in which the predetermined number of minimum values are obtained from the torque sensor was determined to be the predetermined period, which was variable according to the running conditions. But, the predetermined period may be fixed or set variable according to other elements. For example, the former fixed type means that time is directly counted by a timer to determine whether the predetermined time has passed. And the latter variable case means that the rotating speed of a predetermined member provided on the human power transmission system of the electric bicycle is counted to determine whether the predetermined time has passed, or the time or count number is increased or decreased according to the remained capacity of the battery. Besides, selection may be made automatically or by the user at will from such counting methods for the predetermined period.

As described above, the zero point adjusting mechanism in this embodiment can provide the same effects as the third embodiment and further improve the accuracy of the zero point value by holding a plurality of minimum values from the detection values outputted from the torque sensor during the previously determined period and adopting their average value as the zero point value of the torque sensor.

In other words, the average value which becomes a candidate for the zero point value is calculated from the plurality of minimum values obtained from the torque sensor and this average value is determined as the zero point value, so that the adverse effects of errors which may be contained in the respective minimum values can be reduced.

Description will be made of a sixth embodiment of the torque sensor zero point adjusting mechanism of the drive force auxiliary device with reference to FIG. 50.

In the same way as in the second embodiment, the zero point adjusting mechanism in this embodiment achieves the functional operation of the adjusting mechanism in the fifth embodiment by a software program.

Figure 50:
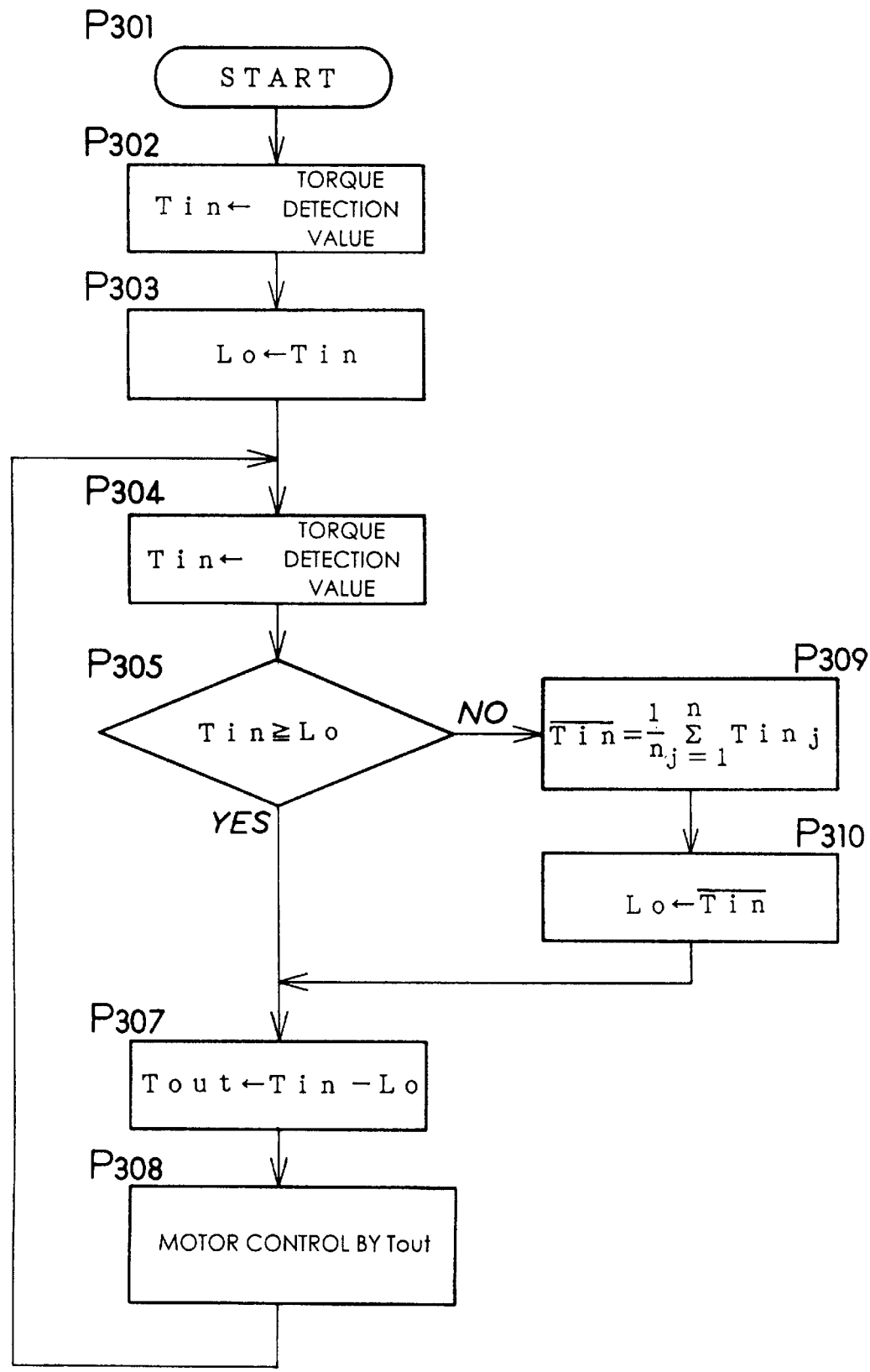
FIG. 50 is a flowchart used in a program for achieving the operation of a sixth embodiment of the torque sensor zero adjusting mechanism of the invention.

FIG. 50 is a flowchart showing the processing of software needed to achieve the circuit shown in FIG. 48 by the circuit shown in FIG. 43.

In step P301 shown in FIG. 50, when the user turns on the power switch 8a to start the human power auxiliary device, the circuit of the torque sensor zero point adjusting mechanism is in an operating state at the same time, and this program is started to be executed.

When the power is turned on, the initializing process is performed in the same way as in the second embodiment. The torque input value Tin just after turning on of the power is obtained in step P302. And, the obtained Tin is held as the zero point value in variable L0 in step P303.

And, subsequent steps P304 to P310 are in a main loop for determining whether the zero point value L0 held at the operation start shall be reset newly and correcting the detected human power torque value by the zero point value L0 held or renewed, and this program continues this loop processing until the power is turned off by the user or the like.

In step P304, the human power torque value Tin at the time it is detected by the torque sensor is obtained.

Then, in step P305, the zero point value L0 being held and the newly detected human power torque value Tin are compared, and it is determined whether the zero point value L0 is renewed or not.

In other words, when the human power torque value Tin is equal to or larger than the zero point value L0, it is decided that the zero point value L0 is not renewed, and the process goes to step P307.

And, when the human power torque value Tin is smaller than the zero point value L0, it is decided that the zero point value L0 is renewed, and the process goes to the renewal process consisting of step P309 and step P310.

In step P309, the number of human power torque values Tin selected by the decision is counted as data number value n, and the obtained human power torque values Tin are totaled. This total value is divided by the data number value to obtain the average value Tin.

When the number of counted data exceeds a predetermined quantity, the computation of the average value in step P309 is not performed.

And, this computation is continued when the human power assisting control is being performed, and the data number value n and the total number are stored and held in the memory. But, if the power source of the electric bicycle is turned off or the like and the human power assisting control is stopped, such data is erased.

And, in step P310, the calculated average value Tin is substituted in the zero point value L0, and the zero point value L0 is newly set.

And, in step P307, the zero point value L0 which was held or renewed in the same way as before is subtracted from this human power torque value Tin to obtain the torque output value Tout after the correction with the zero point value L0 as a reference.

Lastly, in step P308, the output of the motor M is controlled based on the corrected torque output value Tout and various sensor values, and the process goes back to step P304.

In this embodiment, the detection value below the previous zero point value obtained from the torque sensor is always stored and held, and their average value is determined as the zero point value. But, in the same way as in the fifth embodiment, when a previously determined period has elapsed, the step of determining its renewal may be skipped. And, this predetermined period may be fixed or set variable according to other elements in the same way as in the fifth embodiment, so that the same effects as in the fifth embodiment can be obtained.

As described above, the zero point adjusting mechanism in this embodiment can provides the same effects as in the fifth embodiment, and achieves the processing of the third embodiment by a software program in the same way as in the third embodiment, so that even when various conditions are changed, it is possible to flexibly apply by simply changing the program.

And, the minimum values which become a candidate for the zero point value and obtained from the torque sensor are calculated to obtain the average value, and the zero point value is renewed, so that the zero point value is prevented from being changed suddenly, and the human power assisting can be prevented from being changed suddenly. Thus, discomfort of the user can be avoided.

Figure 51:
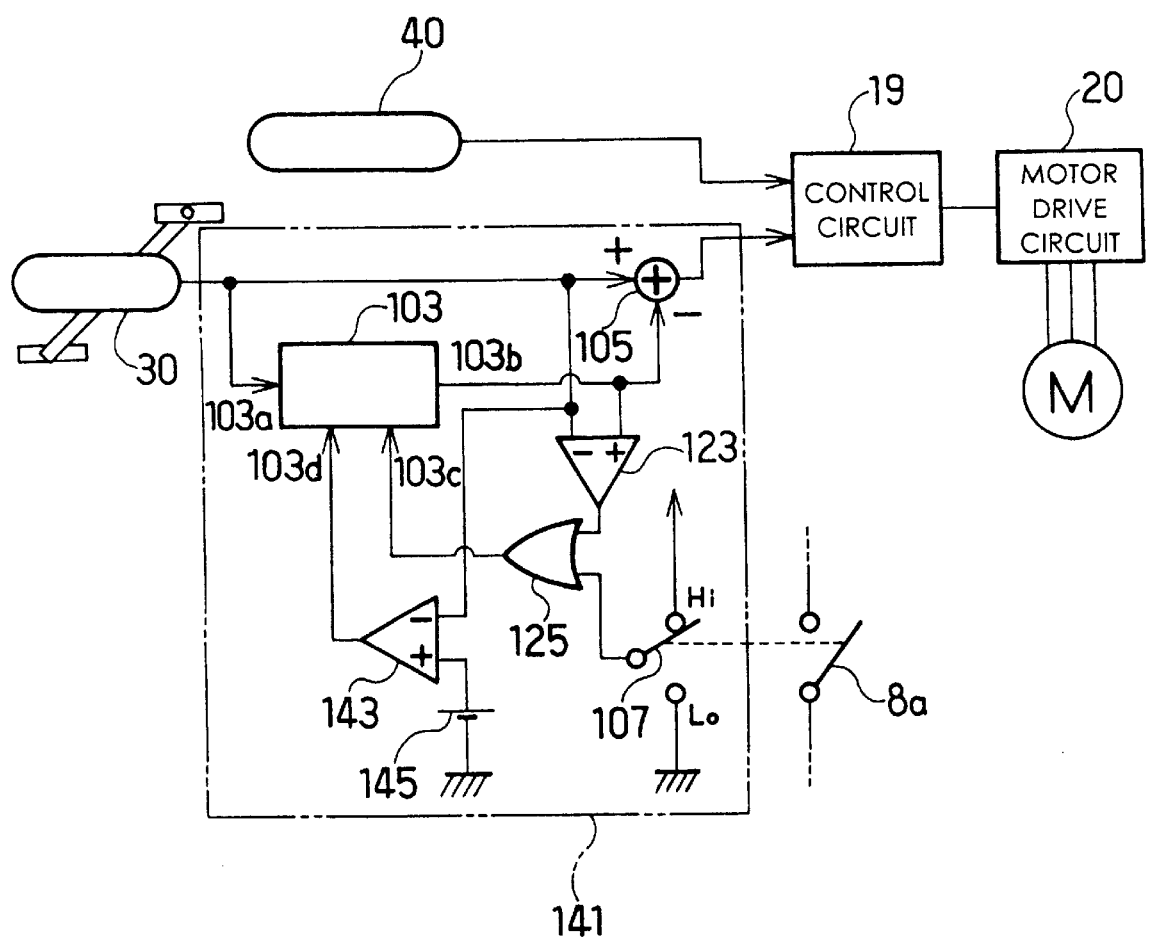
FIG. 51 is a circuit block diagram showing the structure of a seventh embodiment of the torque sensor zero adjusting mechanism of the invention.
Figure 52:
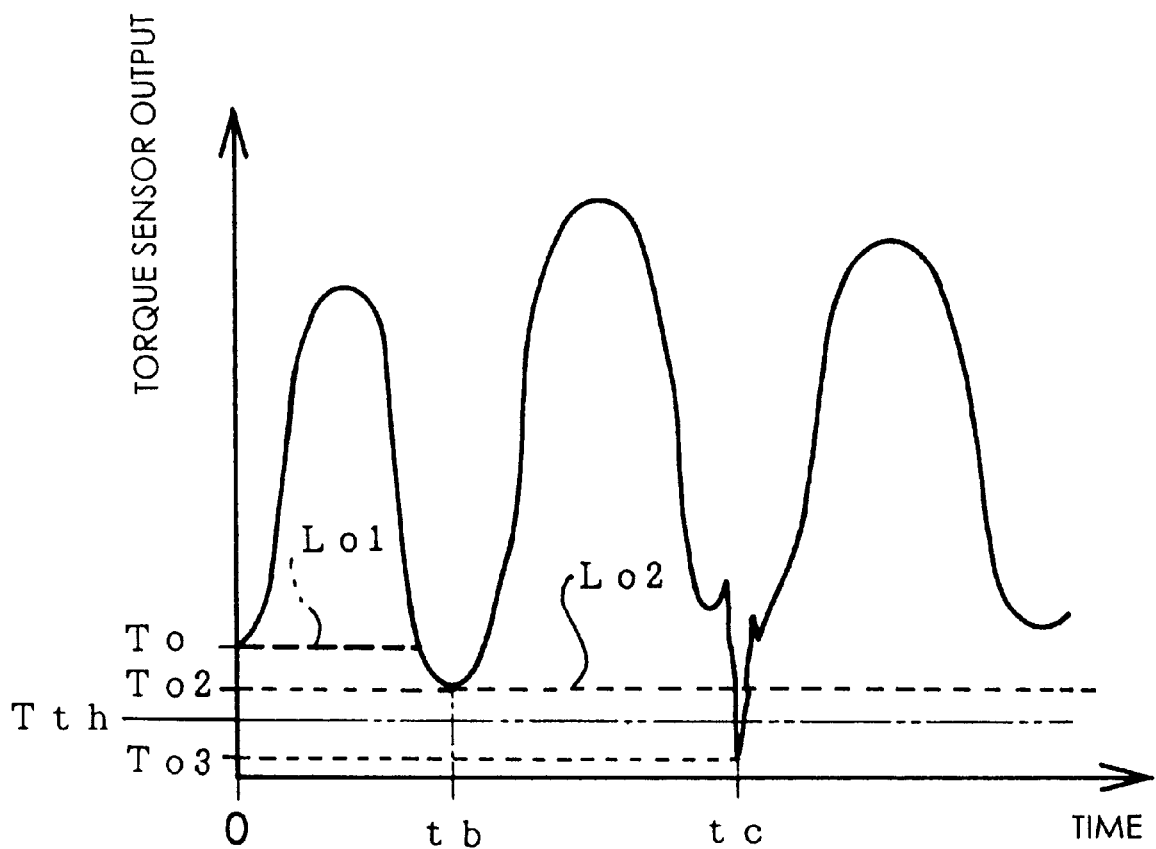
FIG. 52 is a graph illustrating the operation according to the seventh embodiment of the torque sensor zero adjusting mechanism of the invention.

Description of a seventh embodiment of the torque sensor zero point adjusting mechanism of the drive force auxiliary device with reference to FIG. 51 and FIG. 52.

In the same way as in the third embodiment, the zero point adjusting mechanism in this embodiment compares the held zero point value and the human power torque value detected at present, and when the human power torque value is smaller than the zero point value, this human power torque value is selected as a candidate for a new zero point value. In addition, only when this human power torque value exceeds a predetermined threshold value, it is adopted as the zero point value to reset the zero point value. In other words, if an impact is applied to the torque sensor due to the running conditions of the bicycle or a noise signal is mingled into the signal transmission system of the torque sensor, and the detection signal of an apparently wrong low value is obtained, then this signal is cut by the threshold value and compensated.

As shown in FIG. 51, a circuit 141 for achieving this zero point adjusting mechanism comprises by adding to the circuit 121 of the third embodiment a comparator 143 which compares the torque detection value which becomes a candidate for the zero point value and the threshold value.

Specifically, the circuit 141 shown in FIG. 51 comprises the zero point holding circuit 103, the adder-subtracter 105, the interlock switch 107, the comparator 123 and the OR logic element 125 arranged in the same way as the circuit 121 shown in FIG. 45; and the circuit 121 is added with the comparator 143 which has at its positive input terminal a power source 145 for applying a predetermined input voltage value.

The negative input terminal of the comparator 143 is connected to the connection line at the midpoint between the negative input terminal of the comparator 123 and the output line of the torque sensor 30, and its positive input terminal is connected to the power source 145 for setting the threshold value, and its output terminal is connected to a second hold input terminal 103d of the zero point holding circuit 103.

And, the power source 145 is formed to output a predetermined output voltage in accordance with a predetermined threshold value, and this threshold voltage is set to, for example, the minimum value of an expected spike-shaped noise.

Therefore, this comparator 143 holds comparison when the detection value outputted from the torque sensor is larger than the threshold value, and outputs the operation signal from its output terminal to the second hold input terminal of the zero point holding circuit 103.

The zero point holding circuit 103 has the same holding and output operations but is different from the above respective embodiments and has the first and second hold input terminals. This first hold input terminal is, in the same way as in the above respective embodiments, connected to the output terminal of the OR logic element 125, and the second hold input terminal is connected to the output terminal of the comparator 143. And, when the power is turned on, firstly the operation command is entered into the first hold input terminal, and the zero point holding circuit 103 operates to hold. After that, the holding operation is performed only when the operation command is entered into both hold input terminals.

Therefore, in the same way as in the third embodiment, the zero point holding circuit 103 continues to output the holding zero point value when the detection value from the torque sensor 30 is larger than the zero point value held in the zero point holding circuit 103. But, when the detection value (the inflection point of a quadratic curve in this embodiment) from the torque sensor 30 is smaller than the zero point value held in the zero point holding circuit 103, this detection value is further compared with a predetermined threshold value, and if this detection value is larger than the threshold value, the detection value from the torque sensor 30 is re-held as a new zero point value.

Now, description will be made of the operation of the torque sensor zero point adjusting mechanism formed of the above circuit.

As shown in FIG. 52, when the user turns on the power switch 8a, the human power auxiliary device is started to operate, the output voltage value of the torque sensor immediately after turning on the power is stored and held as the zero point value L01, and this zero point value L01 is used to compensate the detection value Tn outputted by the torque sensor until a new zero point value is reset.

For example, when t=tb and the output voltage value T02 of the torque sensor is smaller than the stored and held zero point value L01 and larger than the threshold value Tth, the output voltage value T02 is adopted to be stored and held as a new zero point value L02. After that, this zero point value L02 is used to compensate the detection value Tn.

And, when t=tc and a spike-shaped signal extended downwards to exceed the threshold value is outputted from the torque sensor, the output voltage value T03 of this signal is prevented from being adopted as a new zero point value L03.

Specifically, this spike-shaped signal extended downwards may occur if the running electric bicycle suffers from a sudden impact or disturbing noises are mingled into the circuit.

But, since the output voltage value T03 of this torque sensor is smaller than the stored and held zero point value and smaller than the threshold value in this embodiment, the output voltage value T03 is not adopted as a new zero point value L03 and the previous zero point value L02 is used for compensation.

In this embodiment, the held zero point value and the human power torque value detected at present are compared, and the human power torque value satisfying this comparison condition is compared with a predetermined threshold value. But, reversely, a previously determined threshold value may be compared with the human power torque value detected at present, and the human power torque value satisfying the comparison condition may be compared with the held zero point value.

And, the structure of this embodiment may be added to the fifth embodiment.

As described above, the zero point adjusting mechanism in this embodiment compares the held zero point value and the human power torque value detected at present, and only when the human power torque value is smaller than the zero point value and larger than the predetermined threshold value, adopts it as the zero point value. Therefore, control can be prevented from being affected adversely due to an abnormal signal resulting from a running condition and a circuit/wiring trouble, and reliability of the human power assisting control for the electric bicycle can be improved.

In other words, a torque signal having an abnormally low value due to a sudden impact during running can be cut, so that an inappropriate human power assisting control can be prevented from occurring.

And, even if a spike-shaped noise signal extending downwards is mingled into the circuit due to a disturbance noise or the like, malfunction can be prevented from occurring, and reliability can be improved.

Description will be made of an eighth embodiment of the torque sensor zero point adjusting mechanism of the drive force auxiliary device with reference to FIG. 53.

In the same way as in the second embodiment, the zero point adjusting mechanism in this embodiment achieves the functional operation of the adjusting mechanism of the seventh embodiment by a software program.

Figure 53:
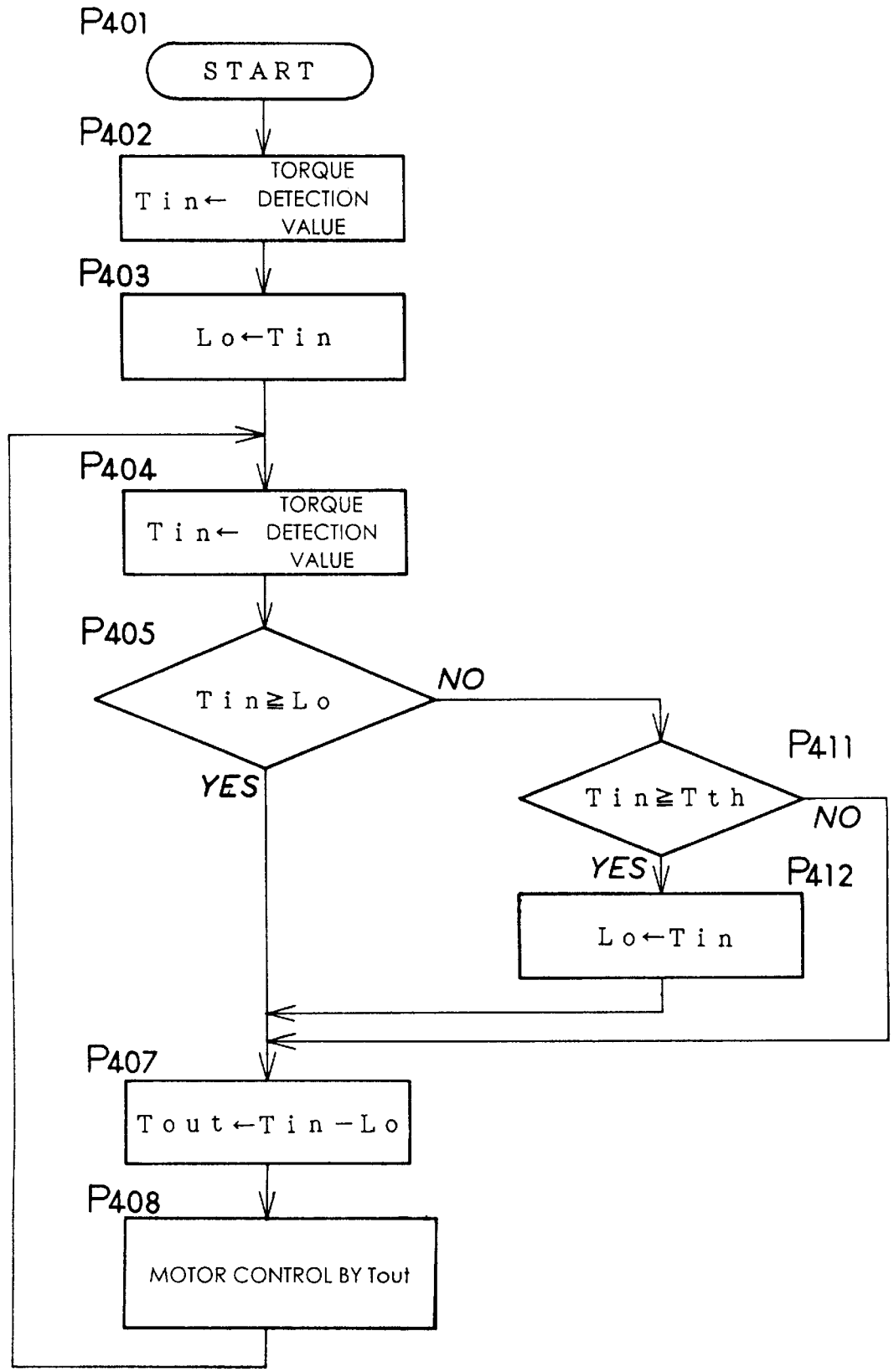
FIG. 53 is a flowchart used in a program for achieving the operation of an eighth embodiment of the torque sensor zero adjusting mechanism of the invention.
Figure 54:
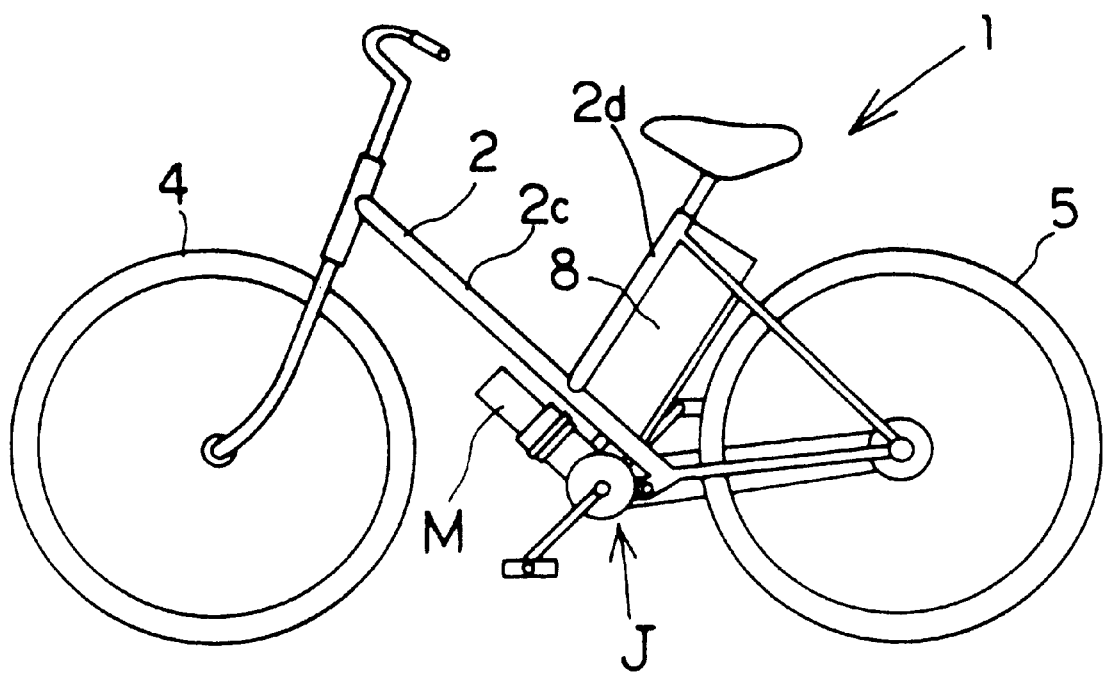
FIG. 54 is a general schematic structural view showing a conventional electric bicycle.
Figure 55:
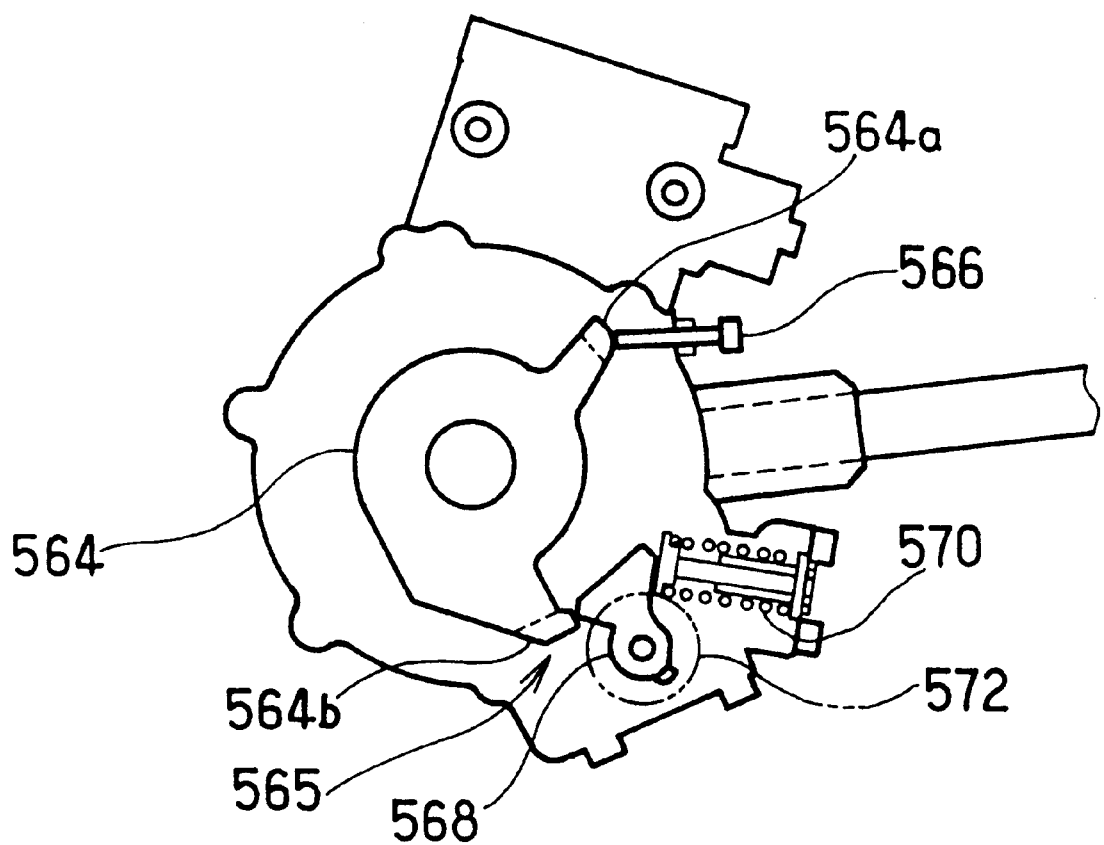
FIG. 55 is a sectional view showing the structure of a conventional torque sensor.

FIG. 53 is a flowchart showing the processing of software needed to achieve the circuit 141 shown in FIG. 51 by the circuit 111 shown in FIG. 43.

In step P401 shown in FIG. 53, when the user turns on the power switch 8a to start the human power auxiliary device, the circuit of the torque sensor zero point adjusting mechanism is in an operating state at the same time, and this program is started to be executed.

When the power is turned on, the initializing process is performed in the same way as in the second embodiment. The torque input value Tin just after turning on of the power is obtained in step P402. And, the obtained Tin is held as the zero point value in variable L0 in step P403.

And, subsequent steps P404 to P411 are in a main loop for determining whether the zero point value L0 held at the operation start shall be reset newly and correcting the detected human power torque value by the zero point value L0 held or renewed, and this program continues this loop processing until the power is turned off by the user or the like.

In step P404, the human power torque value Tin at the time it is detected by the torque sensor is obtained.

Then, in step P405, the zero point value L0 being held and the newly detected human power torque value Tin are compared, and it is determined whether the first condition for renewing the zero point value L0 is satisfied or not.

Specifically, when the human power torque value Tin is equal to or larger than the zero point value L0, it is determined that the first condition is not satisfied, the zero point value L0 is decided not to be renewed, and the process is advanced to step P407.

And, when the human power torque value Tin is smaller than the zero point value L0, it is determined that the first condition is satisfied and the zero point value L0 is renewed, and the process goes to the renewal process consisting of step P411 and step P412.

In step P411, the human power torque value Tin is compared with a previously determined threshold value Tth to determined whether a second condition for renewing the zero point value L0 is satisfied or not.

Specifically, it is determined that the second condition is not satisfied and the zero point value L0 is not renewed when the human power torque value Tin is smaller than the threshold value Tth, and the process goes to step P407.

And when the human power torque value Tin is equal to or larger than the threshold value Tth, it is determined that the second condition is satisfied and the zero point value L0 is renewed, and the process goes to step P411. In step P411, the human power torque value Tin is held and renewed as a new zero point value L0. And, the process goes to step P407.

And, in step P407, the zero point value L0 which was held or renewed in the same way as before is subtracted from this human power torque value Tin to obtain the torque output value Tout after the correction with the zero point value L0 as a reference.

Lastly, in step P408, the output of the motor M is controlled based on the corrected torque output value Tout and various sensor values, and the process goes back to step P404.

As described above, the zero point adjusting mechanism in this embodiment provides the same effects as in the seventh embodiment, and achieves the processing of the third embodiment by a software program in the same way as in the second embodiment, so that even when various conditions are changed, it is possible to flexibly apply by simply changing the program.

Industrial Applicability

The invention relates to a sensor which is provided with a magnet and a magnetic detecting element, and it is generally applied to detect input and output of a rotating mechanism, device or the like. And, the sensor of this invention is used for boats and lighter vehicles such as a bicycle and applied to a drive force auxiliary device which reduces a load on the human power drive force such as leg power. This drive force auxiliary device is provided with a zero point adjusting mechanism essential for detecting a speed and for a torque sensor, so that it is suitable for general equipment and devices which need delicate control.

What is claimed is:

1. A sensor provided with a magnet and a magnetic detecting element comprising:

a detection shaft, a detection disc which is fixed to the detection shaft, a magnetic piece which is fixed to the outer circumference edge of the detection disc, a yoke which is disposed to hold the magnetic piece in a predetermined shaped gap, and the magnet and the magnetic detecting element both fixed to the yoke, wherein the magnet and the magnetic detecting element are fixed with a predetermined distance between them, the magnetic piece passes through the predetermined shaped gap having the predetermined distance during the rotation of the detection disc, and the magnetic piece has a shape of a circular arc, the radius of the circular arc being increased or decreased gradually along the outer circumference edge of the detection disc.

2. A drive force auxiliary device, the drive force auxiliary device comprising:

human power drive means configured by disposing a drive force transmitting mechanism having first and second rotors on the outer periphery of a crank shaft to which leg power is transmitted, and the drive force transmitting mechanism includes a first one-way clutch and an elastic member for transmitting human power drive force, auxiliary drive means configured by disposing a motor and a reduction gear mechanism, and the drive force from the motor being added to the drive force transmitting mechanism on the outer periphery of the crank shaft through a second one-way clutch, a torque sensor for detecting by a rotation angle sensor a difference of rotations of the first and second rotors, which are disposed at the front and rear of a drive force transmitting route of the elastic member, wherein the rotation angle sensor comprises a detection shaft, a detection disc which is fixed to the detection shaft, a magnetic piece which is fixed to the outer circumference edge of the detection disc, a yoke which is disposed to hold the magnetic piece in a predetermined shaped gap, and the magnet and the magnetic detecting element both fixed to the yoke, wherein the magnet and the magnetic detecting element are fixed with a predetermined distance between them and the magnetic piece passes through the predetermined shaped gap having the predetermined distance during the rotation of the detection disc, and rotation caused by the difference of rotations of the first and second rotors is transmitted to the detection shaft of the rotation angle sensor.

3. The drive force auxiliary device according to claim 2 wherein an elastic member for rotational energizing is disposed to push to rotate a detection shaft of the rotation angle sensor in a direction that the rotation angle sensor shows zero value.

4. The drive force auxiliary device according to claim 2 wherein the rotationally energizing elastic member has a pre-pressure value which is at least larger than a total frictional torque of the torque sensor mechanism and the rotation angle sensor.

5. The drive force auxiliary device according to claim 2 wherein the rotation angle sensor has a magnet disposed on a rotor which produces a difference in rotations and a magnetic detecting element disposed at an appropriate position on the side of a stator in the neighborhood of the magnet.

6. The drive force auxiliary device according to claim 5 wherein the magnetic detecting element is a Hall element, and the Hall element is connected to a temperature compensating circuit for compensating an output voltage of the Hall element.

7. The drive force auxiliary device according to claim 5, wherein the magnetic detecting element is a Hall element, a Hall IC, or an MR element.

8. The drive force auxiliary device according to claim 2 wherein the rotation angle sensor comprises a detection disc which is fixed to the detection shaft, a magnetic piece which is fixed to the outer circumference edge of the detection disc, a yoke which is disposed to hold the magnetic piece in a square C-shaped gap open downwards, and a magnet and a magnetic detecting element respectively fixed to opposed ends of the yoke.

9. The drive force auxiliary device according to claim 2, wherein the rotation angle sensor is accommodated in a case provided with a magnetic shield.

10. The drive force auxiliary device according to claim 2, wherein the torque sensor is configured to detect a difference of rotations between the first rotor and the second rotor which are disposed at the front and rear of the drive force transmitting route of the elastic member; and a speed sensor is configured by embedding a magnet on the side and in the neighborhood of the outer periphery of the rotor member of the human power drive means or the torque sensor and fixing a magnetic detecting element to a position in the neighborhood of the side corresponding to this magnet.

11. The drive force auxiliary device according to claim 2 wherein the torque sensor is configured to detect by a sensor a difference of rotations between the first rotor and the second rotor which are disposed at the front and rear of the drive force transmitting route of the elastic member, and
   the motor is a brushless motor which includes a magnet piece on the end face of the rotor to be detected for determining the rotation position of the rotor so as to detect the rotation position of the rotor to control the flow of current to exciting coils of respective phases, a magnetic detecting element is disposed in the neighborhood of a rotating track of the magnet piece to be detected and the magnetic of the magnet piece to be detected is detected by the magnetic detecting element to determine the rotation position of the rotor, and
   a speed sensor is configured by connecting an input terminal of an amplifier to one of output terminals of the magnetic detecting element and connecting an output terminal of the amplifier to a control circuit.

12. The drive force auxiliary device according to claim 2 wherein a vehicle speed detecting mechanism comprises a torque sensor for detecting human power entered, a vehicle speed detecting means for detecting a running speed of the drive force auxiliary device, and an auxiliary power means using a motor; the torque sensor, the vehicle speed detecting means and the auxiliary power means are accommodated in a single case.

13. The drive force auxiliary device according to claim 2 wherein a vehicle speed detecting mechanism comprises a torque sensor for detecting human power entered, a vehicle speed detecting means for detecting a running speed of the drive force auxiliary device, and an auxiliary power means using a motor;
   the motor is provided with a rotor rotation position detecting means which detects a rotation position of the rotor to control commutation; and
   the vehicle speed detecting means detects a running speed of the drive force auxiliary device based on a rotation position signal obtained from the rotor rotation position detecting means.

14. The vehicle speed detecting mechanism of the drive force auxiliary device according to claim 13 wherein vehicle speed detecting means of the vehicle speed detecting mechanism detects a running speed based on a time interval of the occurrences of a rotor position signal obtained from the rotor rotation position detecting means.

15. The vehicle speed detecting mechanism of the drive force auxiliary device according to claim 13, wherein vehicle speed detecting means of the vehicle speed detecting mechanism detects a running speed based on the number of rotor position signals obtained from the rotor rotation position detecting means in a predetermined time.

16. The vehicle speed detecting mechanism of the drive force auxiliary device according to claim 13 wherein the rotor rotation position detecting means has a magnet piece to be detected for determining the rotation position of the rotor on the end face of the rotor, and a single magnetic detecting element or a plurality of magnetic detecting elements disposed at predetermined angled intervals in the neighborhood of the rotating track of the magnet piece to be detected; and the magnetic of the magnet piece to be detected is detected by the magnetic detecting element, thereby detecting the rotation position of the rotor.

17. A torque sensor zero point adjusting mechanism of the drive force auxiliary device according to claim 2 comprising a torque sensor which is connected to a human power transmission system to detect human power input and a zero point adjusting mechanism which corrects a human power detection value of the torque sensor by a zero point value,
   the zero point adjusting mechanism comprises holding means for holding an output value of the torque sensor and subtracting means for subtracting a value held by the holding means from the output value of the torque sensor, and
   wherein the initial output value from the torque sensor is held by the holding means when operation is made to start the drive force auxiliary device, the held value is determined as the zero point of the torque sensor, and the held value is always subtracted from the torque sensor output value by the subtracting means to obtain an output after the zero point adjustment.

18. The torque sensor zero point adjusting mechanism of the drive force auxiliary device according to claim 17, wherein after the operation of starting the drive force auxiliary device, when the output value from the torque sensor is smaller than the zero point value held by the holding means, the output value is adopted as a new zero point value.

19. The torque sensor zero point adjusting mechanism of the drive force auxiliary device according to claim 17, wherein when the output value from the torque sensor is smaller than the zero point value held b the holding means in a predetermined period after the operation of starting the drive force auxiliary device, a plurality of minimum values are stored and held, an average value of the plurality of minimum values is calculated, and the resulted average value is adopted as a new zero point value.

20. The torque sensor zero point adjusting mechanism of the drive force auxiliary device according to claim 17, wherein when the output value from the torque sensor is smaller than the zero point value held by the holding means and larger than a previously determined threshold value after the operation of starting the drive force auxiliary device, the output value is adopted as a new zero point value.

21. The torque sensor zero point adjusting mechanism of the drive force auxiliary device according to any one of claims 17 through 20, wherein the holding means or the subtracting means is made of hardware such as an analog circuit.

22. The torque sensor zero point adjusting mechanism of the drive force auxiliary device according to any one of claims 17 through 20, wherein the holding means or the subtracting means is achieved by a software program using a microprocessor and a memory.

\* \* \* \* \*